(12) United States Patent
Hylak et al.

(10) Patent No.: US 12,373,081 B2
(45) Date of Patent: Jul. 29, 2025

(54) DEVICES, METHODS AND GRAPHICAL USER INTERFACES FOR CONTENT APPLICATIONS

(71) Applicant: Apple Inc., Cupertino, CA (US)

(72) Inventors: Benjamin Hylak, San Francisco, CA (US); Aaron M. Burns, Sunnyvale, CA (US); Nathan Gitter, Cupertino, CA (US); Jordan A Cazamias, San Francisco, CA (US); Alexis H. Palangie, Palo Alto, CA (US); James J. Owen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/738,865

(22) Filed: Jun. 10, 2024

(65) Prior Publication Data

US 2024/0329797 A1 Oct. 3, 2024

Related U.S. Application Data

(63) Continuation of application No. 18/146,380, filed on Dec. 25, 2022, now Pat. No. 12,039,142, which is a
(Continued)

(51) Int. Cl.
*G09G 5/00* (2006.01)
*G06F 3/01* (2006.01)
(Continued)

(52) U.S. Cl.
CPC .......... *G06F 3/04815* (2013.01); *G06F 3/011* (2013.01); *G06F 3/017* (2013.01);
(Continued)

(58) Field of Classification Search
CPC .......... G06F 3/011; G06F 3/013; G06F 3/017; G06F 3/04815; G06F 3/0482;
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 0816983 A2 | 1/1998 |
| EP | 1530115 A2 | 5/2005 |

(Continued)

OTHER PUBLICATIONS

Corrected Notice of Allowability received for U.S. Appl. No. 17/479,791, mailed on May 19, 2023, 2 pages.
(Continued)

*Primary Examiner* — Joe H Cheng
(74) *Attorney, Agent, or Firm* — Kubota & Basol LLP

(57) ABSTRACT

Devices, methods, and graphical interfaces for content applications displayed in an XR environment provide for an efficient and intuitive user experience. In some embodiments, a content application is displayed in a three-dimensional computer-generated environment. In some embodiments, different viewing modes and user interfaces are available for a content application in a three-dimensional computer-generated environment. In some embodiments, different interactions are available with content items displayed in the XR environment.

20 Claims, 27 Drawing Sheets

Related U.S. Application Data continuation of application No. PCT/US2021/038991, filed on Jun. 24, 2021.

(60) Provisional application No. 63/045,022, filed on Jun. 26, 2020.

(51) Int. Cl.
*G06F 3/04815* (2022.01)
*G06F 3/0482* (2013.01)
*G06F 3/04845* (2022.01)
*G06T 11/60* (2006.01)

(52) U.S. Cl.
CPC ........ *G06F 3/0482* (2013.01); *G06F 3/04845* (2013.01); *G06T 11/60* (2013.01); *G06T 2200/24* (2013.01)

(58) Field of Classification Search
CPC ............. G06F 3/04842; G06F 3/04845; G06F 3/0485; G06T 11/60; G06T 2200/24
See application file for complete search history.

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,078,310 A | 6/2000 | Tognazzini |
| 6,188,391 B1 | 2/2001 | Seely et al. |
| 6,310,610 B1 | 10/2001 | Beaton et al. |
| 6,690,387 B2 | 2/2004 | Zimmerman et al. |
| 7,015,894 B2 | 3/2006 | Morohoshi |
| 7,046,927 B2 | 5/2006 | Dalton et al. |
| 7,134,130 B1 | 11/2006 | Thomas |
| 7,184,064 B2 | 2/2007 | Zimmerman et al. |
| 7,706,579 B2 | 4/2010 | Oijer |
| 8,341,541 B2 | 12/2012 | Holecek et al. |
| 8,479,122 B2 | 7/2013 | Hotelling et al. |
| 8,593,558 B2 | 11/2013 | Gardiner et al. |
| 8,606,645 B1* | 12/2013 | Applefeld ............... G06Q 30/02 705/26.1 |
| 8,724,856 B1 | 5/2014 | King |
| 8,896,632 B2 | 11/2014 | Macdougall et al. |
| 9,189,611 B2 | 11/2015 | Wssingbo |
| 9,619,519 B1 | 4/2017 | Dorner |
| 9,646,340 B2* | 5/2017 | Kapur ...................... G06F 3/017 |
| 9,829,708 B1 | 11/2017 | Asada |
| 10,203,762 B2 | 2/2019 | Bradski et al. |
| 10,565,448 B2 | 2/2020 | Bell et al. |
| 10,678,403 B2 | 6/2020 | Duarte et al. |
| 10,732,721 B1 | 8/2020 | Clements |
| 10,755,487 B1* | 8/2020 | Snibbe ................... G06V 20/20 |
| 11,132,162 B2 | 9/2021 | Bar-zeev et al. |
| 11,182,964 B2 | 11/2021 | Palangie et al. |
| 11,348,316 B2 | 5/2022 | Burns et al. |
| 11,720,171 B2 | 8/2023 | Pastrana Vicente et al. |
| 11,768,546 B1 | 9/2023 | Poulos et al. |
| 12,141,849 B1* | 11/2024 | Kantamneni ...... G06Q 30/0643 |
| 2002/0065778 A1 | 5/2002 | Bouet et al. |
| 2002/0105530 A1* | 8/2002 | Waupotitsch ........ G02C 13/003 345/630 |
| 2003/0038754 A1 | 2/2003 | Goldstein et al. |
| 2004/0104806 A1 | 6/2004 | Yui et al. |
| 2005/0044510 A1 | 2/2005 | Yi |
| 2005/0175218 A1 | 8/2005 | Vertegaal et al. |
| 2006/0028400 A1 | 2/2006 | Lapstun et al. |
| 2006/0256083 A1 | 11/2006 | Rosenberg |
| 2007/0259716 A1 | 11/2007 | Mattice et al. |
| 2008/0181502 A1 | 7/2008 | Yang |
| 2009/0146779 A1 | 6/2009 | Kumar et al. |
| 2010/0177049 A1 | 7/2010 | Levy et al. |
| 2010/0208033 A1 | 8/2010 | Edge et al. |
| 2011/0098029 A1 | 4/2011 | Rhoads et al. |
| 2011/0156879 A1 | 6/2011 | Matsushita et al. |
| 2011/0175932 A1 | 7/2011 | Yu et al. |
| 2012/0075496 A1 | 3/2012 | Akifusa et al. |
| 2012/0124525 A1 | 5/2012 | Kang |
| 2012/0131631 A1 | 5/2012 | Bhogal et al. |
| 2012/0184372 A1 | 7/2012 | Laarakkers et al. |
| 2013/0027860 A1 | 1/2013 | Masaki et al. |
| 2013/0190044 A1 | 7/2013 | Kulas |
| 2013/0293456 A1 | 11/2013 | Son et al. |
| 2013/0300648 A1 | 11/2013 | Kim et al. |
| 2013/0300654 A1 | 11/2013 | Seki |
| 2014/0035913 A1* | 2/2014 | Higgins ............. G06Q 30/0641 345/420 |
| 2014/0049462 A1 | 2/2014 | Weinberger et al. |
| 2014/0068692 A1 | 3/2014 | Archibong et al. |
| 2014/0126782 A1 | 5/2014 | Takai et al. |
| 2014/0139426 A1 | 5/2014 | Kryze et al. |
| 2014/0168453 A1 | 6/2014 | Shoemake et al. |
| 2014/0247210 A1 | 9/2014 | Henderek et al. |
| 2014/0304612 A1 | 10/2014 | Collin |
| 2015/0082180 A1 | 3/2015 | Ames et al. |
| 2015/0128075 A1 | 5/2015 | Kempinski |
| 2015/0212576 A1 | 7/2015 | Ambrus et al. |
| 2015/0331240 A1 | 11/2015 | Poulos et al. |
| 2015/0370323 A1 | 12/2015 | Cieplinski et al. |
| 2016/0005106 A1* | 1/2016 | Giraldez ............. G06Q 30/0277 705/27.2 |
| 2016/0026243 A1 | 1/2016 | Bertram et al. |
| 2016/0188181 A1 | 6/2016 | Smith |
| 2016/0357266 A1 | 12/2016 | Patel et al. |
| 2017/0236332 A1 | 8/2017 | Kipman et al. |
| 2017/0308163 A1 | 10/2017 | Cieplinski et al. |
| 2018/0157332 A1 | 6/2018 | Nie |
| 2019/0018498 A1 | 1/2019 | West et al. |
| 2019/0279407 A1 | 9/2019 | Mchugh et al. |
| 2019/0332244 A1 | 10/2019 | Beszteri et al. |
| 2019/0362557 A1 | 11/2019 | Lacey et al. |
| 2020/0026349 A1 | 1/2020 | Fontanel et al. |
| 2020/0126301 A1 | 4/2020 | Kim et al. |
| 2020/0225746 A1 | 7/2020 | Bar-zeev et al. |
| 2020/0285314 A1 | 9/2020 | Cieplinski et al. |
| 2020/0371673 A1 | 11/2020 | Faulkner |
| 2021/0096726 A1* | 4/2021 | Faulkner ................. G06F 3/013 |
| 2021/0103333 A1 | 4/2021 | Cieplinski et al. |
| 2021/0303107 A1 | 9/2021 | Pla I Conesa et al. |
| 2022/0100270 A1 | 3/2022 | Pastrana Vicente et al. |
| 2022/0317776 A1 | 10/2022 | Sundstrom et al. |
| 2022/0365595 A1 | 11/2022 | Cieplinski et al. |
| 2023/0152889 A1 | 5/2023 | Cieplinski et al. |
| 2023/0325003 A1 | 10/2023 | Gitter et al. |
| 2023/0333646 A1 | 10/2023 | Pastrana Vicente et al. |
| 2023/0350537 A1 | 11/2023 | Hylak et al. |
| 2024/0290046 A1* | 8/2024 | Paul ..................... G06F 3/04845 |

FOREIGN PATENT DOCUMENTS

| | | |
|---|---|---|
| EP | 2551763 A1 | 1/2013 |
| EP | 3249497 A1 | 11/2017 |
| JP | 2000-163031 A | 6/2000 |
| JP | 2002-342033 A | 11/2002 |
| JP | 2006-295236 A | 10/2006 |
| JP | 2014-059840 A | 4/2014 |
| JP | 2014-099184 A | 5/2014 |
| JP | 2016-096513 A | 5/2016 |
| JP | 2019-175449 A | 10/2019 |
| WO | 2011/008638 A1 | 1/2011 |
| WO | 2015/195216 A1 | 12/2015 |

OTHER PUBLICATIONS

Final Office Action received for U.S. Appl. No. 14/531,874, mailed on Nov. 4, 2016, 10 pages.

Final Office Action received for U.S. Appl. No. 15/644,639, mailed on Sep. 19, 2019, 12 pages.

Final Office Action received for U.S. Appl. No. 17/202,034, mailed on May 4, 2023, 41 pages.

Final Office Action received for U.S. Appl. No. 17/816,314, mailed on Jan. 20, 2023, 11 pages.

(56) References Cited

OTHER PUBLICATIONS

International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/038991, mailed on Dec. 10, 2021, 7 pages.
International Search Report received for PCT Patent Application No. PCT/US2021/071518, mailed on Feb. 25, 2022, 7 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jul. 20, 2022, 38 pages.
Non-Final Office Action received for U.S. Appl. No. 17/479,791, mailed on May 11, 2022, 18 pages.
Non-Final Office Action received for U.S. Appl. No. 17/816,314, mailed on Sep. 23, 2022, 10 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 18/146,380, mailed on Mar. 11, 2024, 10 Pages.
Notice of Allowance received for U.S. Appl. No. 18/146,380, mailed on Nov. 20, 2023, 10 pages.
Supplemental Notice of Allowance received for U.S. Appl. No. 14/531,874, mailed on Jul. 26, 2017, 5 pages.
Bohn, Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Fatima et al., "Eye Movement Based Human Computer Interaction", 3rd International Conference On Recent Advances In Information Technology (RAIT), Mar. 3, 2016, pp. 489-494.
Grey, Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Simple Modal Window With Background Blur Effect, Available online at: <http://web.archive.org/web/20160313233427/https://www.cssscript.com/simple-modal-window-with-background-blur-effect/ >, Mar. 13, 2016, 5 pages.
Yamada, Yoshihiro, "How to generate a modal window with ModalPopup control", Available online at: <http://web.archive.org/web/20210920015801/https://atmarkit.itmedia.co.jp/fdotnet/dotnettips/580aspajaxmodalpopup/aspajaxmodalpopup.html >, Sep. 20, 2021, 7 pages (Official Copy Only).

\* cited by examiner

DEVICES, METHODS AND GRAPHICAL USER INTERFACES FOR CONTENT APPLICATIONS

CROSS-REFERENCE TO RELATED APPLICATIONS

This application is a continuation of U.S. application Ser. No. 18/146,380, filed on Dec. 25, 2022, now U.S. Pat. No. 12,039,142 B2, which is a continuation of International Application No. PCT/US2021/038991, filed Jun. 24, 2021, which claims the benefit of U.S. Provisional Application No. 63/045,022, filed Jun. 26, 2020, the contents of which are incorporated herein by reference in their entireties for all purposes.

FIELD OF THE DISCLOSURE

This relates generally to devices, methods, and graphical user interfaces for a content application displayed in an extended reality environment.

BACKGROUND OF THE DISCLOSURE

Computer-generated environments are environments where at least some objects displayed for a user's viewing are generated using a computer. Users may interact with applications displayed in an XR environment, such as a content applications.

SUMMARY OF THE DISCLOSURE

Some embodiments described in this disclosure are directed to devices, methods, and graphical interfaces for a content application displayed in an XR environment. Some embodiments described in this disclosure are directed to displaying and interacting with content items in a three-dimensional computer-generated environment. Some embodiments described in this disclosure are directed to different viewing modes and user interfaces for a content application in a three-dimensional computer-generated environment. These interactions and user interfaces provide a more efficient and intuitive user experience. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
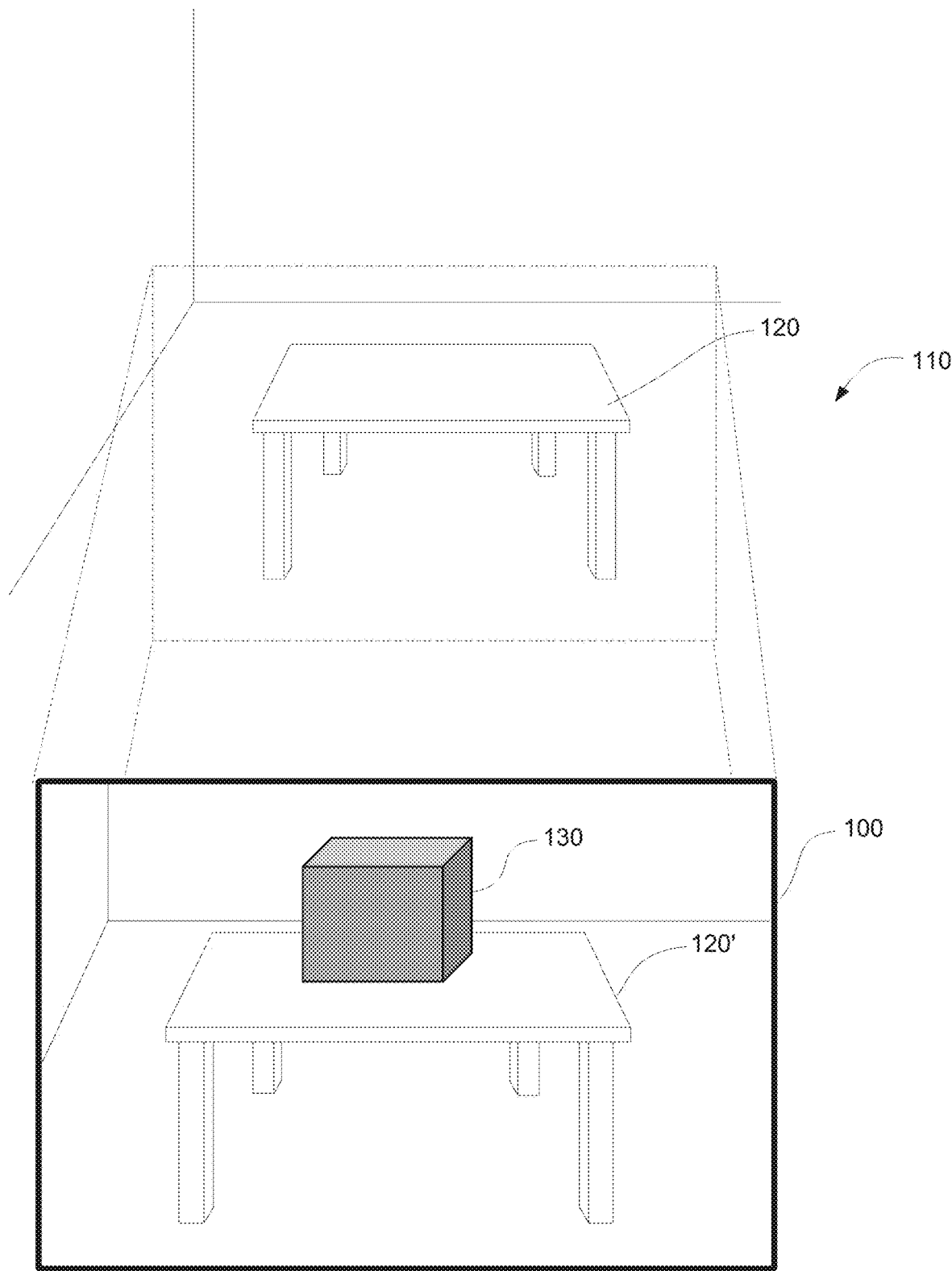
FIG. 1 illustrates an electronic device displaying an XR environment according to some embodiments of the disclosure.

In the description of embodiments herein, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like.

In some embodiments, the environment may be a wholly simulated environment and all the content displayed is virtual content. In some embodiments, the environment may be a wholly or partially simulated environment with representations of the physical environment (e.g., provided by image sensors and passed through to the display) and/or virtual content displayed to the user. In some embodiments, the environment may be presented to the user via an at least partially transparent display in which the physical environment is visible (without simulation) and in which partially simulated virtual content is displayed via the display. As used herein, presenting an environment includes presenting a physical environment, presenting a representation of a physical environment (e.g., displaying via a display generation component), and/or presenting a virtual environment (e.g., displaying via a display generation component). Virtual content (e.g., user interfaces, content items, etc.) can also be presented with these environments (e.g., displayed via a display generation component). It is understood that as used herein the terms "presenting"/"presented" and "displaying"/"displayed" are often used interchangeably, but depending on the context it is understood that when a physical environment is visible to a user without being generated by the display generation component, such a physical environment is presented to the user and not technically displayed to the user.

With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

FIG. 1 illustrates an electronic device 100 displaying an XR environment according to some embodiments of the disclosure. In some embodiments, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display an object 130 in the XR environment (e.g., represented by a cube illustrated in FIG. 1) that is not present in the physical environment 110, but is displayed in the XR environment positioned on (e.g., anchored to) the top of a computer-generated representation 120' of physical table 120. For example, object 130 can be displayed on the surface of the computer-generated representation 120' of physical table 120 in the XR environment displayed via device 100 in response to detecting the planar surface of table 120 in the physical environment 110. It should be understood that object 130 is a representative object and one or more different objects (e.g., of various dimensionality such as two-dimensional or three-dimensional objects) can be included and rendered in a three-dimensional XR environment. For example, the object can represent an application or a user interface displayed in the XR environment. In some examples, the application or user interface can include the display of content items (e.g., photos, video, etc.) of a content application. Additionally, it should be understood, that the three-dimensional (3D) environment (or 3D object) described herein may be a representation of a 3D environment (or three-dimensional object) displayed in a two-dimensional (2D) context (e.g., displayed on a 2D screen).

Figure 2:
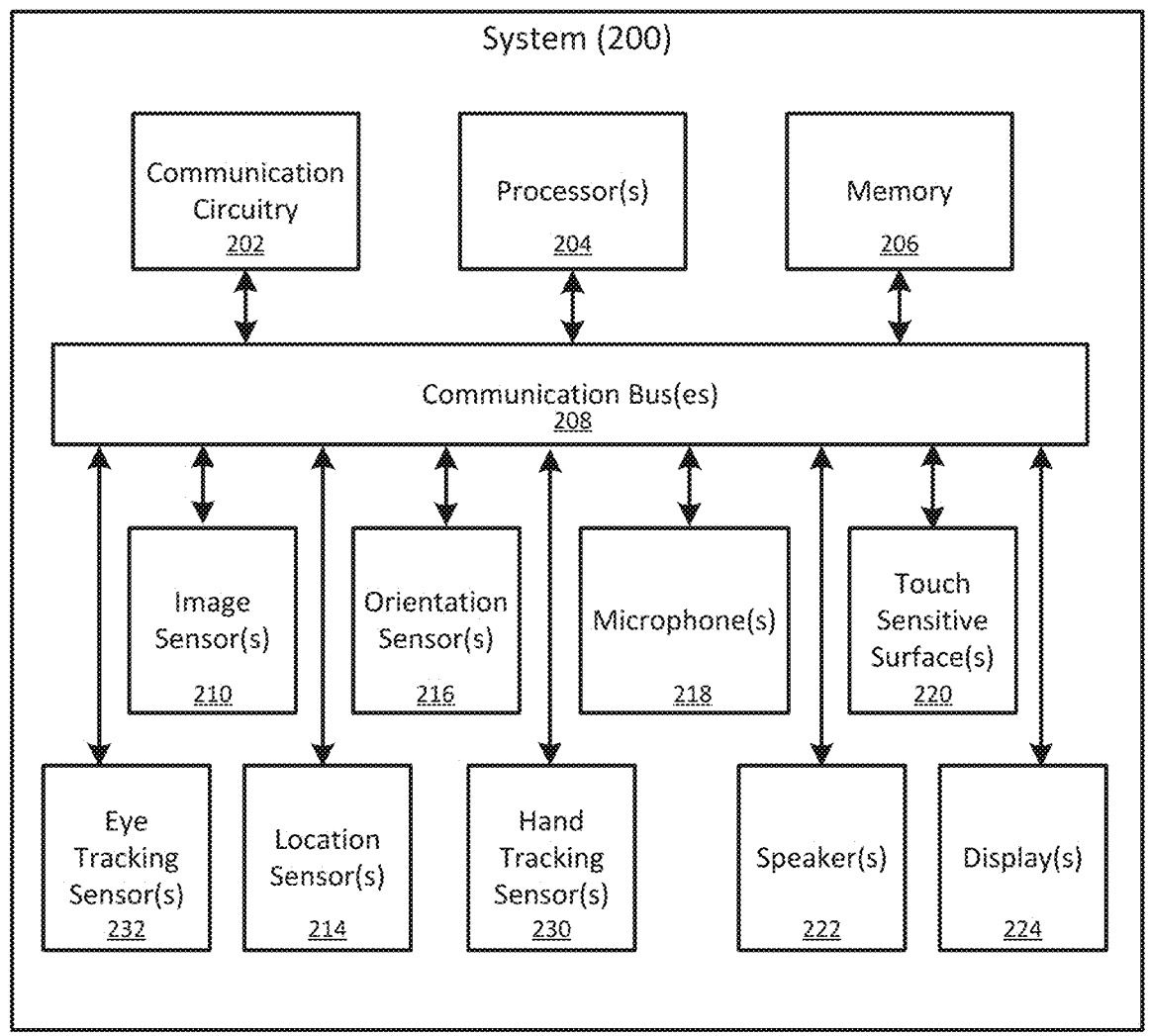
FIG. 2 illustrates a block diagram of an exemplary architecture for a system or device in accordance with some embodiments of the disclosure.

FIG. 2 illustrates a block diagram of an exemplary architecture for a system or device 200 in accordance with some embodiments of the disclosure. In some embodiments, device 200 enables one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback). In some embodiments, device 200 is a mobile device, such as a mobile phone (e.g., smart phone), a tablet computer, a laptop computer, a desktop computer, a head-mounted display, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, hand tracking sensor(s) 230, and/or eye tracking sensor(s) 232. These components optionally communicate over communication bus(es) 208 of device 200. In some embodiments, the user may interact with the user interface or XR environment via position, orientation or movement of one or more fingers/hands (or a representation of one or more fingers/hands) in space relative to the user interface or XR environment and/or via eye focus (gaze) and/or eye movement. In some embodiments, position/orientation/movement of fingers/hands and/or eye focus/movement can be captured by cameras and other sensors (e.g., motion sensors) described herein. In some embodiments, audio/voice inputs can be used to interact with the user interface or XR environment captured by one or more audio sensors (e.g., microphones) described herein.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 include one or more general processors, one or more graphics processors, and/or one or more digital signal processors. In some embodiments, memory 206 a non-transitory computer-readable storage medium (e.g., flash memory, random access memory, or other volatile or non-volatile memory or storage) that stores computer-readable instructions configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

In some embodiments, the display generation component(s) 224 can include an opaque display. In some embodiments, the display generation component(s) 224 can include a transparent or translucent display. A medium through which light representative of images is directed may be included within the transparent or translucent display. The display may utilize OLEDs, LEDs, μLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the physical environment. Image sensor(s) 210 also optionally include one or more infrared (IR) sensors, such as a passive or an active IR sensor, for detecting infrared light from the physical environment. For example, an active IR sensor includes an IR emitter for emitting infrared light into the physical environment. Image sensor(s) 210 also optionally include one or more cameras configured to capture movement of physical objects in the physical environment. Image sensor(s) 210 also optionally include one or more depth sensors configured to detect the distance of physical objects from device 200. In some embodiments, information from one or more depth sensors can allow the device to identify and differentiate objects in the physical environment from other objects in the physical environment. In some embodiments, one or more depth sensors can allow the device to determine the texture and/or topography of objects in the physical environment.

In some embodiments, device 200 uses CCD sensors, event cameras, and depth sensors in combination to detect the physical environment around device 200. In some embodiments, image sensor(s) 210 include a first image sensor and a second image sensor. The first image sensor and the second image sensor work in tandem and are optionally configured to capture different information of physical objects in the physical environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the physical environment. For example, device 200 uses image sensor(s) 210 to track the position and orientation of display generation component(s) 224 relative to one or more fixed objects in the physical environment.

In some embodiments, device 200 includes microphones(s) 218 or other audio sensors. Device 200 uses microphone(s) 218 to detect sound from the user and/or the physical environment of the user. In some embodiments, microphone(s) 218 includes an array of microphones (a plurality of microphones) that optionally operate in tandem, such as to identify ambient noise or to locate the source of sound in space of the physical environment.

Device 200 includes location sensor(s) 214 for detecting a location of device 200 and/or display generation component(s) 224. For example, location sensor(s) 214 can include a global positioning system (GPS) receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the physical environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the XR environment, relative to the display generation component(s) 224, and/or relative to another defined coordinate system. Eye tracking sensor(s) 232 are configured to track the position and movement of a user's gaze (eyes, face, or head, more generally) with respect to the physical or XR environment and/or relative to the display generation component(s) 224. In some embodiments, hand tracking sensor(s) 230 and/or eye tracking sensor(s) 232 are implemented together with the display generation component(s) 224. In some embodiments, the hand tracking sensor(s) 230 and/or eye tracking sensor(s) 232 are implemented separate from the display generation component(s) 224.

In some embodiments, the hand tracking sensor(s) 230 can use image sensor(s) 210 (e.g., one or more IR cameras, 3D cameras, depth cameras, etc.) that capture three-dimensional information from the physical including one or more hands (e.g., of a human user). In some examples, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the physical environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 200 is not limited to the components and configuration of FIG. 2, but can include fewer, other, or additional components in multiple configurations. A person using device 200, is optionally referred to herein as a user of the device.

Device 200 may supports a variety of applications that may be displayed in the XR environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a content application (e.g., a photo/video management application), a digital camera application, a digital video camera application, a web browsing application, a digital music player application, a television channel browsing application, and/or a digital video player application.

Figure 3A:
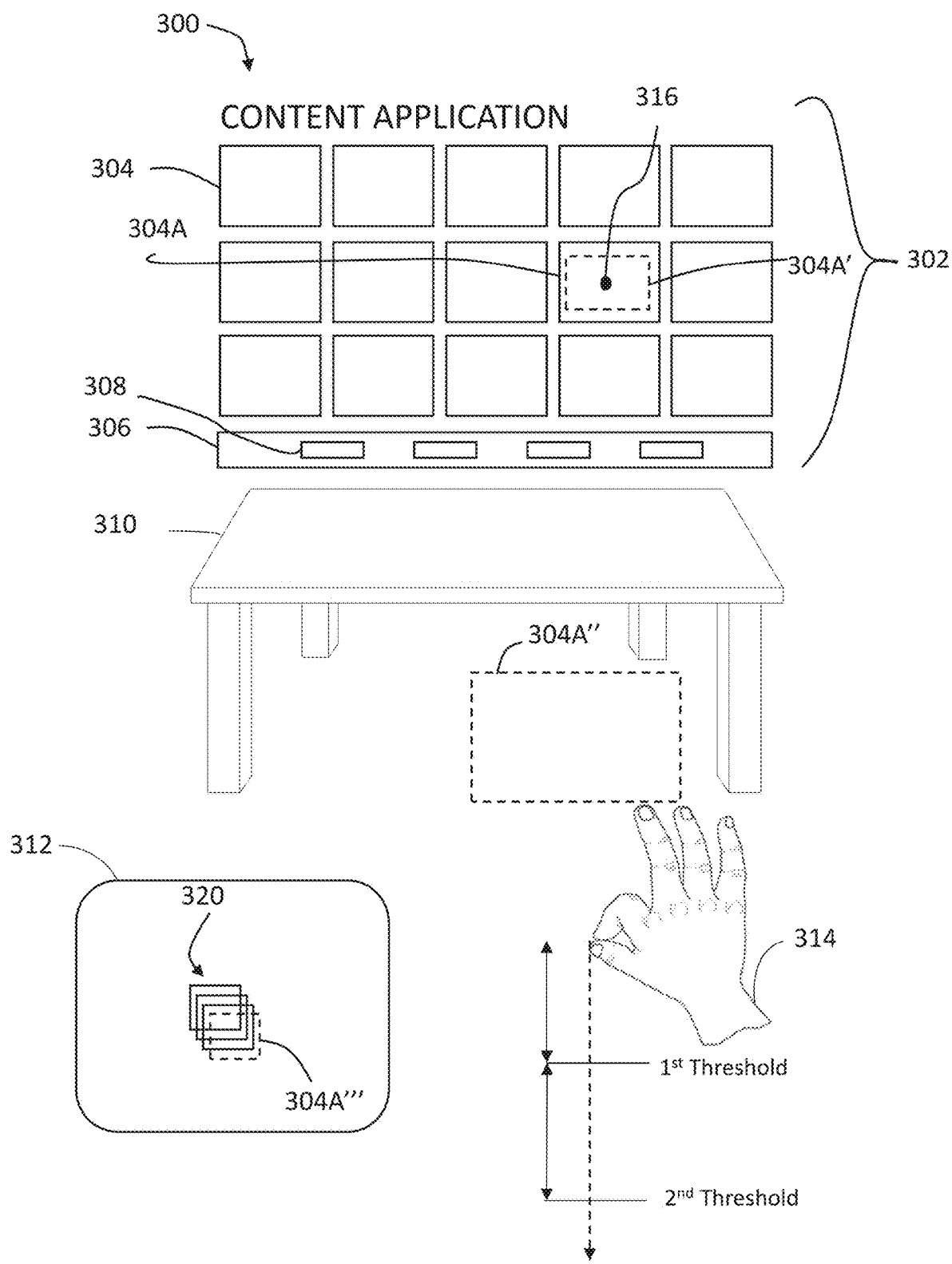
FIG. 3A illustrates an example view of an example computer-generated environment including one or more user interfaces according to some embodiments of the disclosure.

As described herein, an XR environment including various graphics user interfaces ("GUIs") may be displayed using an electronic device, such as electronic device 100 or device 200, including one or more display generation components. The XR environment can include one or more GUIs associated with an application, such as a content application. For example, a content application can display content items such as photos or videos, among other possible types of content. FIG. 3A illustrates an example view 300 of an example XR environment including one or more user interfaces according to some embodiments of the disclosure. View 300 of the XR environment is presented from the perspective of a user via the display-generation component (e.g., 224), such that the near region (e.g., foreground) in the XR environment corresponds to a region in physical proximity to the user and further regions (e.g., background) in the XR environment correspond to a region further from the user.

View 300 includes a content browsing user interface 302 for a content application. The content application includes one or more representations of item of content (e.g., text content, photo content, and/or video content) or content items displayed in content browsing user interface 302. In some embodiments, the content application can be a photo application, and content browsing user interface 302 includes photo content items and/or video content items. In some embodiments, content browsing user interface 302 includes a grid of content items 304 (e.g., arranged in rows and columns) or other arrangement of content items. In some embodiments, content browsing user interface 302 optionally includes one or more user interface elements 308 providing various functions (e.g., to search the plurality of content items, to filter the plurality of content items, to adjust a view or viewing mode of the plurality of content items, etc.). In some embodiments, the user interface elements 308 are disposed in a user interface element 306 (e.g., a window, container, pane, etc.). In some embodiments, the one or more user interface elements 308 are disposed below the plurality of content items without a container. In some embodiments, the one or more user interface elements 308 are not displayed or are displayed in a different region of the XR environment. In some embodiments, the title of the content application can be displayed above the content browsing user interface 302. In some embodiments, the title of the content application may not be displayed in the XR environment or may be displayed in a different region of the XR environment.

In some embodiments, the content browsing user interface 302 (and optionally user interface elements 308) are displayed anchored to a representation of a physical object. For example, the content browsing user interface 302 can be anchored to a computer-generated representation 310 of a physical table (e.g., corresponding to table 120 in FIG. 1). In some embodiments, the content browsing user interface 302 can be anchored to a computer-generated representation of a physical wall. In some embodiments, the content browsing user interface 302 can be floating in free-space in the XR environment.

In some embodiments, a user can interact with the content application via the content browsing user interface 302 in the XR environment. The interactions can be facilitated by one or more sensors of an electronic device. In some embodiments, the inputs can be from input devices including touch-sensitive surfaces, buttons, joysticks, etc. In some embodiments, the inputs can be from audio sensors. In some embodiments, the input can be from tracking the eyes and/or hands of a user.

In some embodiments, the interactions can provide various functionality for the content application. In some embodiments, an input can scroll through content items in the content browsing user interface 302. In some embodiments, an input can select a content item, preview a content item, change a viewing mode of one or more content items or of the content application, move a content item, add a content item to a clipboard or a share sheet, invoke display of one or more user interface elements (e.g., user interface controls), and/or actuate one or more user interface elements (e.g., controls to perform an action associated), among other possible functions. Some of these interactions/functions are described in more detail herein.

In some embodiments, view 300 of the XR environment includes a representation of a clipboard. The representation of the clipboard can include one or more content items 304 (e.g., selected from the plurality of content items in the content browsing user interface 302). In some embodiments, the one or more content items of the clipboard content can be represented as a stack 320 of content items. In such a stack representation, one content item can at least partially (or fully) cover one or more other content items (e.g., a second content item can cover a first content item). In some embodiments, stack 320 can display the last selected content item on the top of the stack. In some embodiments, the content items can be represented in other ways (e.g., an unordered stack or pile) in the representation of the clipboard.

In some embodiments, the contents of the clipboard can be displayed in a user interface element 312 (e.g., a window, container, pane, etc.). In some embodiments, the contents of the clipboard (e.g., stack 320) can be displayed anchored to a user interface element 312. In some embodiments, the user interface element 312 can be a representation of a physical object (e.g., a wall, a table, a part of the user, etc.). In some embodiments, the contents of the clipboard can be displayed in the foreground of the XR environment. In some embodiments, the contents of the clipboard can be displayed at a greater distance from the user in the XR environment. In some embodiments, the representation of the clipboard can be displayed in a first region of the XR environment that corresponds to a first depth within the XR environment, and the content browsing user interface 302 can be displayed in a second region of the XR environment that corresponds to a second depth within the XR environment. In some embodiments, the clipboard contents and/or the representation of the clipboard can be displayed anchored to a body part of the user (e.g., to an open palm of a user or to a plane defined by the open palm of the user). For example, user interface element 312 can correspond to a representation of a user's hand, or a region proximate to the user's hand. The user's hand can provide an anchor point for the clipboard that is easily accessible and is in proximity to the user for interaction.

In some embodiments, the clipboard remains displayed while the clipboard includes at least one content item. Optionally, the clipboard can be displayed in the XR environment in response to adding at least one content item from the content browsing user interface 302 (or another user interface view of one or more content items), and the clipboard can cease being displayed in response to emptying the clipboard of content items. In some embodiments, the clipboard remains displayed while the clipboard includes at least two content items. Optionally, the clipboard can be displayed in response to adding a second content item from the content browsing user interface 302 (or another view of one or more content items), and the clipboard can cease being displayed in response to emptying the clipboard of content items or in response to having fewer than two content items. In some embodiments, the clipboard remains displayed whether or not it has any content (e.g., when the clipboard is the user's hand).

In some embodiments, the clipboard is displayed in the XR environment when one or more criteria are satisfied for displaying the clipboard. In some embodiments, the one or more criteria optionally includes a criterion that is satisfied when the clipboard includes at least one content item, and is not satisfied when the clipboard is empty of content items. In some embodiments, the one or more criteria optionally includes a criterion that is satisfied when a representation of a hand (optionally displayed in the XR environment) corresponds to a predetermined hand (e.g., a secondary hand, such as the left hand for a right-handed user), and is not satisfied when the representation of the hand corresponds to another hand (e.g., a primary hand, such as the right hand for a right-handed user). In some embodiments, the one or more criteria optionally includes a criterion that is satisfied when a representation of a hand (optionally displayed in the XR environment) corresponds to a predetermined pose (e.g., open palm), and is not satisfied when the representation of the hand is not in the predetermined pose (e.g., closed fist). In some embodiments, the one or more criteria optionally includes a criterion that is satisfied when a representation of a hand (optionally displayed in the XR environment) corresponds to a specified orientation oriented in a predetermined direction or within a threshold of the predetermined direction (e.g., oriented in a predetermined direction or within a threshold of the predetermined direction that may correspond to facing the user), and is not satisfied when the representation of the hand does not correspond to the specified orientation. In some embodiments, the one or more criteria optionally includes a criterion that is satisfied when a user's gaze focuses on the representation of a hand (optionally displayed in the XR environment) for a threshold period of time, and is not satisfied when the user's gaze focuses elsewhere or focuses on the representation of the hand for less than the threshold period of time.

In some embodiments, some or all of the above one or more criteria are required to display the clipboard contents. In some embodiments, some or all of the above criteria are required to initially display the clipboard contents, but fewer of the above criteria are required to maintain the display of the clipboard contents (e.g., gaze may be required to invoke the clipboard, but not to keep the clipboard displayed, a tolerance of a pose or an orientation may be relaxed to maintain display, etc.). In some embodiments, fewer than the above criteria may be required to initially display the clipboard within a threshold period of time after ceasing to display the clipboard (e.g., to make it easier to invoke the clipboard a short period of time after having met the criteria to invoke the clipboard).

Figure 3B:
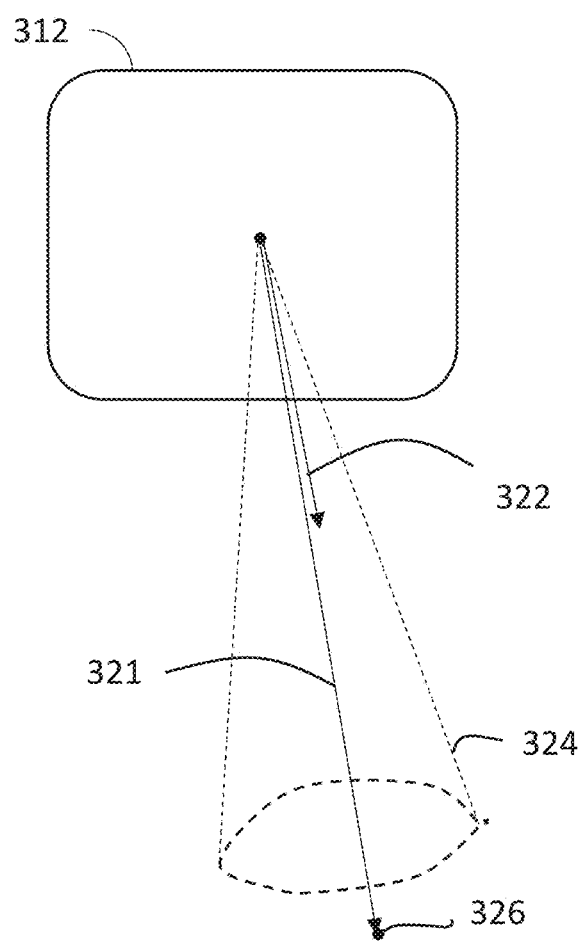
FIG. 3B illustrates an example criterion for display of a clipboard in an XR environment according to some embodiments of the disclosure.

FIG. 3B illustrates an example criterion for display of a clipboard in an XR environment according to some embodiments of the disclosure. FIG. 3B illustrates a user interface element 312, which, in some embodiments, is a representation of a hand of the user (e.g., in an open palm pose). In some examples, the orientation of the hand in the XR environment can be defined by one or more vectors. A first vector 321 can be defined between the representation of the hand and a user (e.g., between a representation of a hand and a user's head, represented in FIG. 3B by point 326). A second vector 322 can be a normal vector of the palm. For example, the normal vector is orthogonal to a plane defined by the palm in the open palm pose. The orientation criterion, in some embodiments, is satisfied when the second vector 322 is parallel to the first vector 321 or when the second vector 322 is within a threshold tolerance of being parallel to the first vector 321. The threshold tolerance is represented in FIG. 3B by cone 324 around the first vector 321. When the second vector 322 is not parallel with the first vector 321 or outside the tolerance, the orientation criterion is not satisfied. The satisfaction of the orientation criterion can correspond to a hand oriented relative to the head in a manner consistent with a user looking at the open face of the palm, which provides an indication of a user intention to interact with the clipboard content.

Referring back to FIG. 3A, in some embodiments, an input while displaying the content browsing user interface 302 is used to add a content item from the plurality of content items in the content browsing user interface 302 to a clipboard. In some embodiments, the content item is added to the clipboard in accordance with a determination that the input satisfies one or more criteria. In some embodiments, the content item is not added to the clipboard in accordance with a determination that the input fails to satisfy the one or more criteria. In some embodiments, adding the content item removes the content item from the plurality of content items displayed in the content browsing user interface 302. In some embodiments, adding the content item duplicates the content item from the plurality of content items displayed in the content browsing user interface 302.

In some embodiments, the inputs are performed in part or entirely using gaze. For example, focusing gaze (e.g., using eye tracking sensor(s) 232) on a content item for a threshold duration can add the content item to the clipboard. In some embodiments, gaze can be used for determining a target content item to add the clipboard, and additional selection input can be required to add the targeted content item to the clipboard. In some embodiments, the additional selection input can be performed using a button, touch screen or other input device. In some embodiments, the additional selection input can be performed using a finger or hand (e.g., using hand tracking sensor(s) 230), optionally using a representation of the finger or hand displayed in the XR environment. In some embodiments, the additional selection input can include a selection made by the hand, such as touching the content item in content browsing user interface 302 with the representation of the hand or a gesture by the hand (e.g., based on pose, orientation, and/or movement of the hand). In some embodiments, the additional selection input can be made by contacting two fingers (e.g., contacting a thumb and an index finger as shown by hand 314 in FIG. 3A) while gazing at the desired content item. In some embodiments, the selection can be made by tapping a content item using the representation of the hand in the XR environment without the need for using gaze to target a specific content item.

In some embodiments, the input can require a sequence of sub-inputs to add a content item to the clipboard. In some embodiments, the sequence can include a selection sub-input, a movement sub-input and a deselection sub-input. The one or more criteria can correspond to the sequence of sub-inputs. In some embodiments, the selection can include a pinch gesture of two fingers (e.g., a thumb and index finger), and the deselection can include a release of the pinch gesture. The movement between the selection and deselection can correspond to a threshold amount movement in a predetermined direction while the selection sub-input is maintained. For example, the movement may include a pulling movement away from the plurality of content items in the content browsing user interface (and/or toward the user) by a threshold amount (as indicated by the dashed arrow in FIG. 3A) while the thumb and index finger are pinched. Thus, in some embodiments, the one or more criteria include a first criterion that is satisfied when the movement exceeds a threshold amount of movement in a direction opposite from the plurality of content items (and not satisfied if less than the threshold movement is measured or if the amount of movement is not in the specified direction), a second criterion that is satisfied when the movement occurs while maintaining the selection (and not satisfied if the movement occurs without the selection sub-input), and a third criterion that is satisfied when the deselection occurs after the threshold amount of movement (and not satisfied until the deselection occurs and/or if the displacement during the selection indicated a reversal of the movement such that the total movement is less than the threshold amount of movement at the time of deselection).

In some embodiments, the movement of a targeted/selected content item in accordance with the movement during the input is animated during the input to add the content item to the clipboard. In some embodiments, until the movement (while maintaining the selection sub-input, such as pinching) exceeds a first threshold amount of movement in a predetermined direction (e.g., away from the plurality of content items in the content browsing user interface 302), the selected content item can move in the opposite direction in the XR environment (opposite the direction of the movement). The amount of movement of the selected content item in the opposite direction can be a function of the amount of movement of the input. For example, the selected content item can be pushed further backward the more the movement of the input pulls closer to the user (e.g., while the input movement is less than the first threshold). Additionally or alternatively, until the movement (while maintaining the selection sub-input) exceeds the first threshold amount of movement in the predetermined direction, the size of the selected content item can shrink with the amount of shrinking of the selected content item being a (different) function of the amount of movement of the input. For example, FIG. 3A illustrates a targeted content item 304A indicated by the gaze focus 316 that can be moved backward and/or shrink as represented by content item 304A' while hand 314 is moving away from the plurality of content items, but by an amount of movement by less than the first threshold amount of movement.

In some embodiments, after the movement (while maintaining the selection sub-input) exceeds the first threshold amount of movement in the predetermined direction, the selected content item can move in the same direction in the XR environment (e.g., as a function of the amount of movement of the input). For example, the selected content item can be pulled forward toward the use the more the movement pulls closer to the user (e.g., while the amount of input movement is above the first threshold). Additionally or alternatively, after the movement (while maintaining the selection sub-input) exceeds the first threshold amount of movement in the predetermined direction, the size of the selected content item can increase, with the amount of increasing of the selected content item being a function of the amount of movement of the input. For example, FIG. 3A illustrates a targeted content item 304A can be moved forward and/or increase in size as represented by content item 304A" while hand 314 is moving away from the plurality of content items, but the amount of movement is above the first threshold amount of movement. In some embodiments, the amount of movement of the targeted content item (and/or the corresponding change in size of the targeted content items) can be 1:1 with the amount of input movement (e.g., the distance the content item is displaced in the XR environment is the same as the distance the hand or representation of the hand is displaced). In some embodiments, the function can be different, such that the amount of movement of the target content item is scaled (e.g., linearly or non-linearly) with the amount of input movement.

In some embodiments, upon the deselection sub-input after the threshold about of movement (e.g., the second threshold illustrated in FIG. 3A), the selected content item 304 can be added to the clipboard (and optionally displayed) as illustrated by content item 304''' in stack 320. In some embodiments, the deselection sub-input can cause the movement of the targeted content item to change trajectory. For example, the movement can change from a trajectory toward the user (e.g., toward a source of the input) to a trajectory toward the clipboard (while the representation of the clipboard is displayed) to animate adding the content item to the clipboard. The size of content item 304''' can be smaller than the size of content item 304 in some embodiments. In some embodiments, the size of content item 304''' can be larger than the size of content item 304. The added content item represented by content item 304''' can at least partially (or fully) cover the one or more additional content items in stack 320 while the representation of the clipboard is displayed in the computer-generated environment.

In some embodiments, the movement of the selected content item 304A described above-including first moving backward and/or shrinking (content item 304A'), then moving forward and/or increasing (content item 304"), and then moving to and being added to the clipboard (content item 304''')—can provide an animation of the process of adding a content item to the clipboard. The animation can provide visual feedback to the user during the process that can improve the intuitiveness and transparency of the process. For example, the initial shrinking/movement away from the user can provide information about which content item is targeted without requiring a cursor or other indicator of gaze or targeting. The subsequent movement toward the user can provide an indicator that the input is underway. The movement toward the clipboard, while displayed, can provide an indicator that the input satisfies the input criteria and the operation of adding the content item to the clipboard is completed.

It is understood that the above input (including a sequence of sub-inputs) is one example of an input for adding content items to the clipboard, but that other inputs are possible. Additionally or alternatively, in some embodiments, the above input may enable adding content items to the clipboard while a representation of the clipboard is displayed in the XR environment, but may not add content to the clipboard while the representation of the clipboard is not displayed (e.g., requiring the display criteria for the clipboard and the input criteria for adding content items to the clipboard). In some embodiments, satisfying the display criteria for the clipboard can provide context for an overloaded input. For example, the input to add content to the clipboard may be the same input to perform another function (e.g., to delete a content item or move a content item), but the intended functionality can be disambiguated by the display of the clipboard (by satisfying the clipboard display criteria).

In some embodiments, the contents of the clipboard remain in the clipboard whether or not the clipboard is displayed in the XR environment (e.g., while satisfying the one or more clipboard display criteria). Thus, upon detecting that the one or more clipboard display criteria are no longer satisfied, the representation of the clipboard can cease being displayed in the XR environment, but the clipboard contents do not change. When the one or more clipboard display criteria are once again satisfied, the representation of the clipboard can be displayed in the XR environment with its contents. In some embodiments, the contents of the clipboard can be cleared when the clipboard is no longer displayed. In some embodiments, the clipboard can be cleared when the user performs another action. The actions can include selecting an affordance for clearing the clipboard contents, sharing the clipboard contents, pasting the clipboard contents, and/or after making a gesture. In some embodiments, the gesture can include making a first or rotating an orientation by 180 degrees, optionally with a representation of the hand proximate to the clipboard contents (or to which the clipboard contents are anchored), or covering the clipboard contents with a representation of a hand.

Figure 4A:
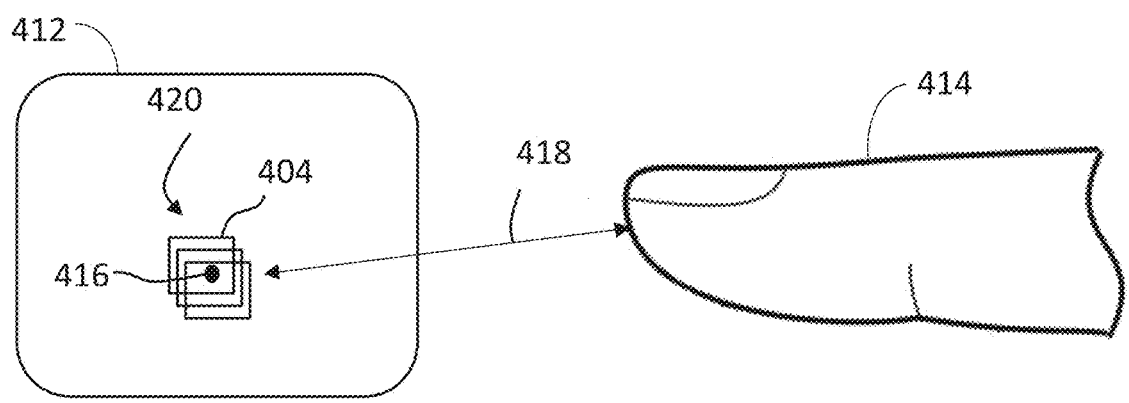
FIGS. 4A-4C illustrate example views of clipboard contents in an XR environment according to some embodiments of the disclosure.
Figure 4B:
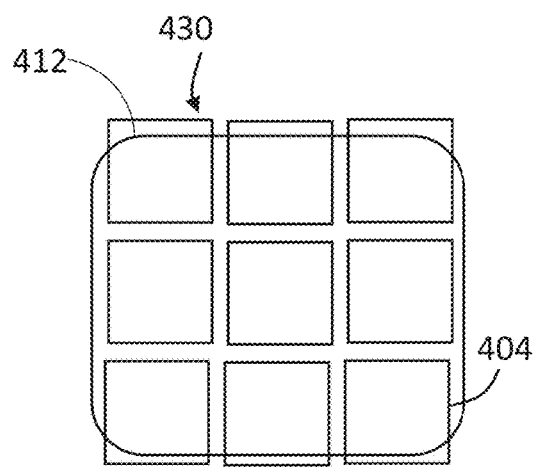
Figure 4C:
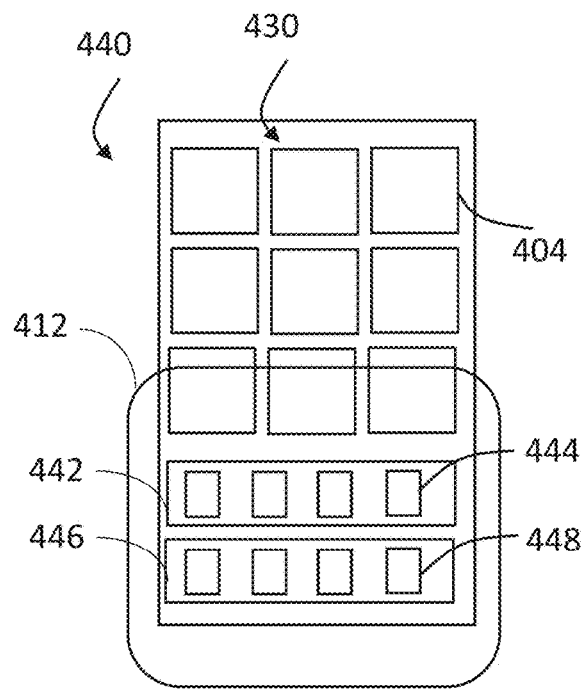

In some embodiments, the display of the contents of the clipboard can be updated in response to further input. As a result, the display of the contents of the clipboard can transition from a first representation of multiple content items to a second representation of the multiple content items. FIGS. 4A-4C illustrate example views of clipboard contents in an XR environment according to some embodiments of the disclosure. As described above, in some embodiments, the clipboard contents can be represented as a stack 420 (or more generally a first representation of multiple content items), optionally anchored to a user interface element 412 (e.g., corresponding to stack 320 and user interface element 312). In a stack representation, one content item can at least partially (or fully) cover one or more other content items. In some examples, in response to further input, the contents of stack 420 can be expanded and displayed in a different representation of the multiple content items (e.g., as illustrated in FIGS. 4B and 4C).

In some embodiments, the input to transition from a first representation of multiple content items to a second, different representation of the multiple content items can be based on gaze and/or proximity of a representation of a hand or finger. In some embodiments, the display of the clipboard contents can be updated (e.g., expanded) in response to finger and/or hand 414 being within a threshold distance 418 of stack 420 or user interface element 412. In some embodiments, the display of the clipboard contents can be updated (e.g., expanded) in response to focusing gaze, indicated by the gaze focus 416, on stack 420 or user interface element 412 for a threshold period of time. In some embodiments, the display of the clipboard contents can be updated (e.g., expanded) in response to focusing gaze and/or in response to proximity of the representation of finger and/or hand 414. In some embodiments, when both gaze and proximity are used, the duration of gaze can be reduced while the proximity within the threshold distance of the representation of finger and/or hand 414 is detected and/or the threshold distance of the representation of the finger and/or hand 414 can be reduced when the gaze is focused for a threshold duration is detected.

Referring to FIGS. 4B and 4C, content items 404 can be displayed in an expanded form 430, such as in a grid of content items (or other expanded representation) in response to the input (gaze and/or proximity). In the expanded form, the content items 404 may not overlap or may overlap less as compared with the partially or fully overlapping content items 404 in stack 420. Additionally or alternatively, the content items 404 can be increased in size relative to the representation of content items 404 in stack 420. In some embodiments, the contents of the clipboard in the expanded form can at least partially extend beyond the boundaries of user interface element 412 depending on the number of content items. Additionally or alternatively, expanding the contents of the clipboard occludes portions of user interface element 412 (e.g., additional portions and/or different portions of user interface element 412).

In some embodiments, in addition to updating the display of the clipboard contents, one or more user interface elements 444 and 448 (e.g., affordances) are displayed to share content items in the clipboard. In some embodiments, user interface elements 444 can correspond to people with whom the contents of the clipboard can be shared via a specific application. For example, the people can correspond to recent contacts or frequent contacts to send the content items via a messaging application (or email or other communication/sharing application). In some embodiments, user interface elements 448 can correspond to different means for sharing content items (e.g., messaging application(s), email application(s), near field communication, short range communication, etc.). The user interface elements 444 are optionally displayed in a user interface element 442 (e.g., a window, container, pane, etc.). The user interface elements 448 are optionally displayed in a user interface element 446 (e.g., a window, container, pane, etc.).

In some embodiments, the expanded form 430 of clipboard contents and the user interface elements 444, 448 can be displayed together in a content sharing user interface 440, as shown in FIG. 4C. In some embodiments, the expanded form 430 of clipboard contents is optionally displaced relative to user interface element 412 as compared with FIG. 4B, such that content sharing user interface 440 including expanded form 430 can be anchored to user interface element 412.

In some embodiments, a first input can cause the display of the clipboard contents to be updated from a stack representation of FIG. 4A (a first representation of multiple content items) to an expanded form representation of FIG. 4B (a second representation of multiple content items) and then to the content sharing user interface of FIG. 4C (a third representation of multiple content items). For example, a gaze for a first threshold duration and/or a proximity within a first threshold distance can update the display from the first representation of multiple content items (e.g., stack 420) to a second representation of multiple content items (e.g., expanded view 430). A gaze for a second threshold duration (longer than the first threshold duration) and/or a proximity within a second threshold distance (e.g., closer to the representation of the clipboard contents) can update the display from the second representation of multiple content items (e.g., expanded form 430) to the third representation of multiple content items (e.g., content sharing user interface 440). In some embodiments, the transition from the first representation of multiple content items to the third representation of multiple content items can occur without the intervening second representation should proximity be detected within the second threshold distance without detecting the proximate object within the first threshold distance and outside the second threshold distance for longer than a threshold period. In some embodiments, hysteresis can be used to avoid switching between the different representations of the multiple content items in the clipboard when the proximate object rests close to one of the threshold distances.

In some embodiments, an input can be used to preview a content item and/or to change a viewing mode of one or more content items or of the content application. In some embodiments, previewing a content item and/or changing a viewing mode includes changing a depth at which one or more content items are displayed in the XR environment. For example, in response to detecting a request to view one of the items of content of a first user interface, the electronic device optionally displays the requested item of content in a second user interface. Thus, in some embodiments, the second user interface is a content viewing user interface (also referred to herein as "preview user interface") that includes an item of content (e.g., text content, photo content, and/or video content). Although referred to as a preview or viewing user interface, it is understood that other functions are possible (e.g., scrolling, etc.) in such a user interface.

Figure 5A:
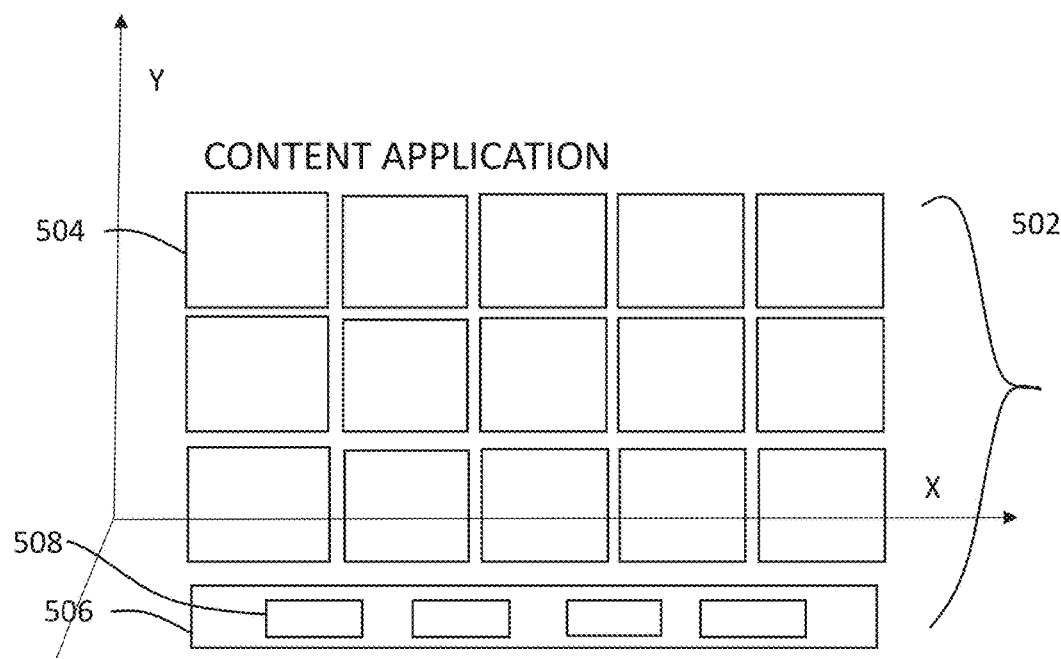
FIGS. 5A-5C illustrate example views of a content application in an XR environment according to some embodiments of the disclosure.
Figure 5B:
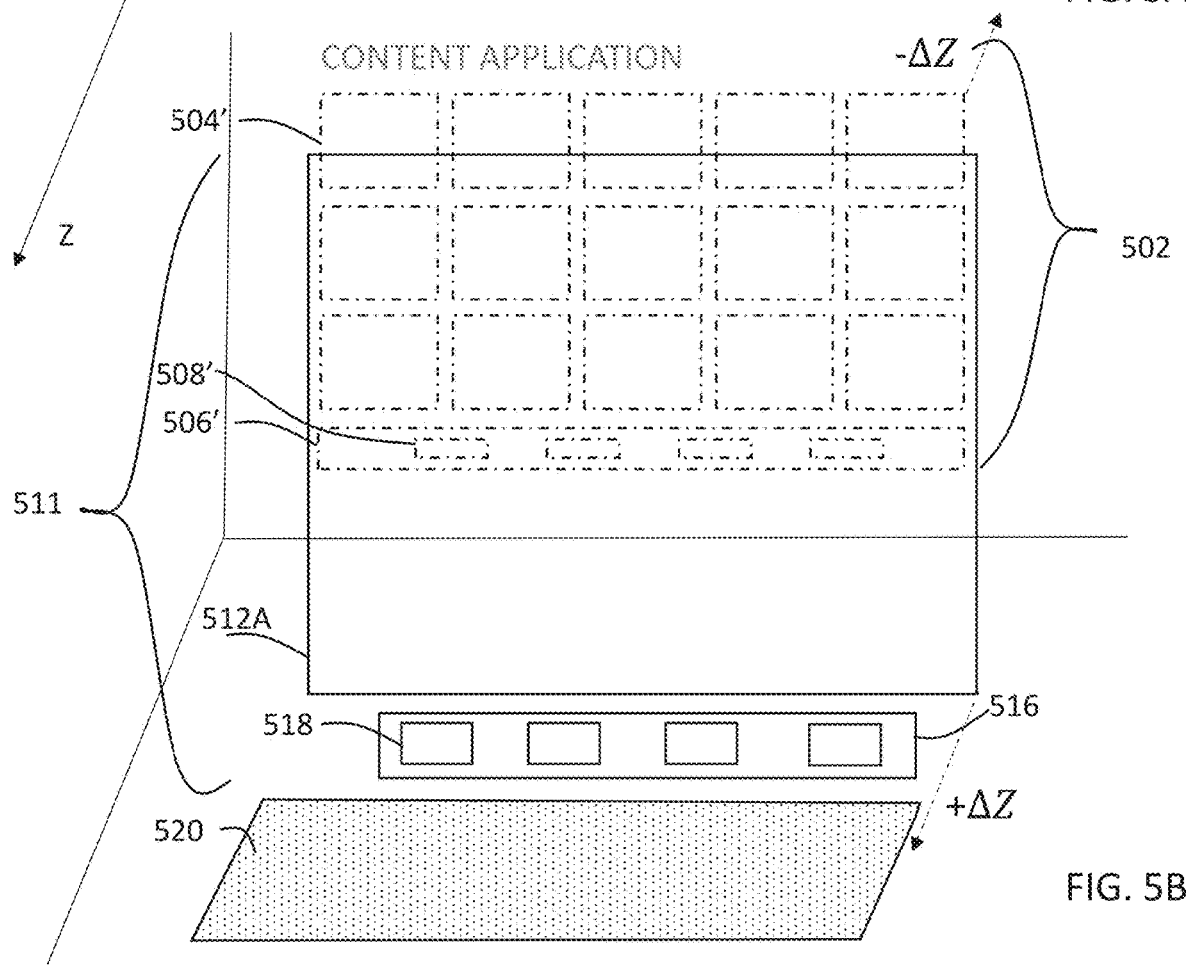
Figure 5C:
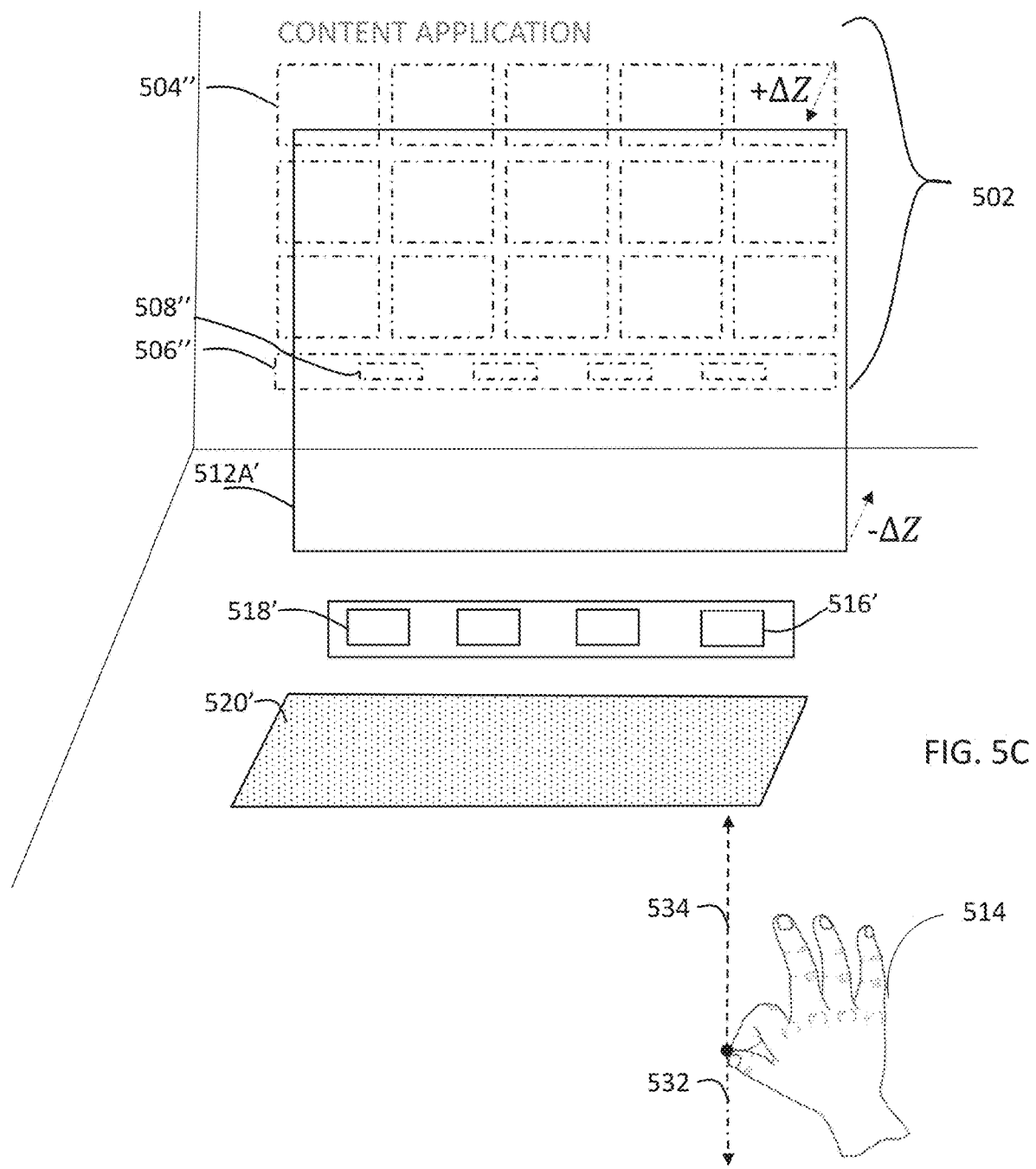

FIGS. 5A-5C illustrate example views of a content application in an XR environment according to some embodiments of the disclosure. FIG. 5A illustrates a content application including a content browsing user interface 502 of multiple content items 504 (and optionally including one or more user interface elements 508 disposed in a user interface element 506) corresponding to content browsing user interface 302 of multiple content items 304 (and optionally to user interface elements 306, 308). The details of the content browsing user interface 502 are not repeated here for brevity. The content browsing user interface 502 is displayed in the three-dimensional XR environment at a first depth. For example, the content browsing user interface 502 can be represented as a grid of content items in the X-Y plane as indicated by the axes in FIG. 5A, at the first depth along the Z-axis. Content browsing user interface 502 is shown floating in the XR environment, but may optionally be anchored to a representation of a virtual or physical object (e.g., table, wall, etc.) represented in the XR environment.

In some embodiments, an input can cause a transition to a different viewing mode in the content application (e.g., a "transition input"). For example, the inputs can be from input devices including touch-sensitive surface(s), button(s), joystick(s), audio sensor(s), hand tracking sensor(s), eye tracking sensor(s) or any other suitable input device. In some embodiments, the input can include a gaze to target a content item in content browsing user interface 502 and a selection input from an input device (e.g., a pinch of two fingers, pressing a button, etc.) to select the targeted content item. FIG. 5B illustrates a preview user interface 511 for a content application. Preview user interface 511 is optionally displayed in the XR environment in response to the input to transition to a different viewing mode (e.g., selecting a content item to preview). In some embodiments, preview user interface 511 includes content item 512A that corresponds to one of the content items 504 targeted (e.g., based on gaze) by the input to transition to the different viewing mode. Content item 512A can be displayed in the XR environment with a size greater than the displayed content item 504 to which it corresponds in content browsing user interface 502. Optionally, preview user interface 511 includes one or more user interface elements 518 providing various functions. In some embodiments, some or all of the various functions provided by user interface elements 518 can be the same as the functions provided by user interface elements 508. In some embodiments, some or all of the various functions provided by user interface elements 518 can be different than the functions provided by user interface elements 508. In some embodiments, the functions can include an option to share content item 512A, delete content item 512A, add content item 512A to a "favorite" content item category, playback controls (e.g., play/pause, fast forward, rewind, mute or other volume adjustment) for video content items, etc. In some embodiments, the user interface elements 518 are disposed in a user interface element 516 (e.g., a window, container, pane, etc.). In some embodiments, the one or more user interface elements 518 are disposed below content item 512A with or without a container or may be disposed overlapping a portion of content item 512A. In some embodiments, user interface elements 516 are not displayed or may be displayed in response to some input (e.g., gaze, and/or gestures, and/or proximity, as described above with respect to user interface elements 444, 448). In some embodiments, the one or more user interface elements 518 are displayed in a different region of the XR environment.

In some embodiments, preview user interface 511 replaces content browsing user interface 502 in the XR environment. In such embodiments, content browsing user interface 502 ceases to be displayed in the XR environment and preview user interface 511 is displayed in its place the XR environment. In some embodiments, preview user interface 511 is displayed at the same depth (along the Z-axis) within the XR environment as content browsing user interface 502 was previously displayed. In some embodiments, preview user interface 511 is displayed at a different depth (along the Z-axis) within the XR environment. In some embodiments, preview user interface 511 is displayed closer to the user in the XR environment. In some embodiments, preview user interface 511 is displayed further from the user in the XR environment.

In some embodiments, preview user interface 511 is displayed concurrently with content browsing user interface 502. In such embodiments, preview user interface 511 is displayed with a different depth (along the Z-axis) in the XR environment than content browsing user interface 502. In some embodiments, the depth of one user interface of the content application is changed. For example, the content browsing user interface 502 can remain at its depth prior to the transition input and preview user interface 511 can be displayed at a different depth in the XR environment. Alternatively, the content browsing user interface 502 can be moved to a different depth in the XR environment due to the transition input and preview user interface 511 can be displayed at the depth in the XR environment at which the content browsing user interface 502 was displayed prior to the transition input (e.g., displaying the preview user interface 511 can push back the content browsing user interface 502). In some embodiments, the depths of multiple user interfaces of the content application are changed. For example, FIG. 5B illustrates the content browsing user interface 502 can be moved to a different depth in the XR environment compared with its depth in FIG. 5A (e.g., pushed back, −ΔZ) due to the transition input and preview user interface 511 can be displayed at the depth in the XR environment different from the depth at which the content browsing user interface 502 was displayed prior to the input shown in FIG. 5A (e.g., forward from, +ΔZ).

In some embodiments, some characteristics of the XR environment and user interfaces can change between different viewing modes. For example, a level of immersion can be different between the content browsing mode and the preview mode. In some embodiment, the level of immersion can be increased in the preview mode by darkening the XR environment outside the preview user interface 511 and/or by increasing the opacity applied to physical representations in the XR environment. For example, the XR environment may be darker in the preview mode in which the preview user interface 511 is shown in FIG. 5B as compared with the XR environment in the content browsing mode as shown in FIG. 5A. The darkening of the XR environment may not apply to content item 512A (and/or preview user interface 511), which can optionally brighten relative to content item 504A. Additionally, light from content item 512A can optionally cause a reflection of content item 512A to be displayed in the darkened computer-generated environment. For example, FIG. 5B illustrates reflection 520 from content item 512 (e.g., on the floor in the XR environment). In some embodiments, the reflection is displayed in the XR environment only when the environment is darkened. For example, reflection 520 is shown in FIG. 5B, but not shown in FIG. 5A. In some embodiments, the reflection can be shown in the XR environment, but the amount of reflection depends on the brightness of the content item and the darkness of the XR environment. In such examples, a reflection from the content items may be displayed in the XR environment of FIG. 5A, but the intensity of the reflection for content items 504 is less than the reflection of content item 512A in a deeper immersion level of FIG. 5B with darkening of the XR environment and/or brightening of content item 512A.

In some embodiments, the XR environment is a virtual reality environment. In some such embodiments, darkening the XR environment (and brightening some content item(s) or user interface(s)) is achieved by dimming virtual light sources used to generate the virtual environment of the XR environment. In some embodiments, the XR environment is a mixed or augmented reality environment. In some such embodiments, the XR environment includes video captured by the device (e.g., by image sensor(s) 210) and optionally computer-generated virtual content or user interfaces displayed overlaying the video. Darkening the XR environment is achieved by darkening the video portion of the XR environment. In some such embodiments, an at least partially transparent display is used that includes a layer with adjustable opacity/transparency to adjust the amount of light passing through the display. Increasing the opacity via the layer may reduce the amount of light and thereby dim the XR environment.

In some embodiments, the appearance of the content browsing user interface 502 is different while displayed coextensive in time with preview user interface 511. For example, the appearance of content browsing user interface 502 can be out of focus, faded out and/or dimmed while displayed with preview user interface 511 as compared with content browsing user interface 502 without concurrently displaying preview user interface 511, optionally due to the change in immersion level of the XR environment and/or due to occlusion by preview user interface 511. Additionally, the size of the content items 504' (and optionally user interface elements 506', 508') displayed in content browsing user interface 502 in FIG. 5B can be smaller in size than content items 504 displayed in content browsing user interface 502 in FIG. 5A. The change in size of the display of content items 504 can be a function of the change in depth of content browsing user interface 502 between FIGS. 5A and 5B.

In some embodiments, the transition between the content browsing mode and the preview mode can be gradual. For example, changes in position and/or size and/or appearance of user interface elements and content items of content browsing user interface 502 between FIG. 5A and FIG. 5B can be gradual. For example, the transition can animate the movement of content browsing user interface 502 pushing back from a first depth in FIG. 5A to a second depth in FIG. 5B and the resulting change in size of the content items and/or user interface element of content browsing user interface 502. Additionally or alternatively, the changes in appearance of the content browsing user interface 502 and the XR environment due to changing immersion level can be gradual. For example, the darkening of the environment and/or fading/blurring the focus of the content items in the content browsing user interface 502 can occur gradually.

In some embodiments, input can be used to transition back from the preview mode to the content browsing mode. FIG. 5C illustrates a transition from a preview mode back to a content browsing mode. In some embodiments, the inputs are from input device(s) including touch-sensitive surface(s), button(s), joystick(s), audio sensor(s), hand tracking sensor(s), eye tracking sensor(s) or any other suitable input device.

In some embodiments, the input can include selection using an input device (e.g., a pinch of two fingers, pressing a button, etc.) and movement. In some embodiments, the input can require a sequence of sub-inputs to transition from the preview mode back to the content browsing mode. In some embodiments, the sequence can include a selection sub-input (e.g., pinch), a movement sub-input, and a deselection sub-input (e.g., releasing the pinch). The movement between the selection and deselection can correspond to a threshold amount movement in a predetermined direction while the selection sub-input is maintained (e.g., movement while pinching). In some embodiments, the movement can correspond to a first threshold amount of movement in a first predetermined direction and a second threshold amount of movement in a second predetermined direction. For example, as illustrated in FIG. 5C, the input can include pinching together two fingers (e.g., thumb and index finger) of hand 514, a representation of which is optionally displayed in the XR environment. While pinching, the movement can include a first movement by a first threshold amount in a first predetermined direction indicated in FIG. 5C by arrow 532, and subsequently a second movement by a second threshold amount in a second predetermined direction indicated in FIG. 5C by arrow 534. In some embodiments, the first threshold amount and second threshold amount are the same. In some embodiments, the second threshold amount is greater than the first threshold amount. In some embodiments, the first predetermined direction and the second predetermined direction are opposite directions (or within a threshold of being opposite directions). In some embodiments, the first predetermined direction can be downward in the XR environment and the second predetermined direction can be at least partially upward and/or toward the content browsing user interface 502. In some embodiments, the deselection (e.g., release of the pinch) of the input must occur while the movement is above a threshold velocity to execute the transition (e.g., pausing after the second movement in the second predetermined direction by the second threshold amount would not execute the transition). In some embodiments the deselection can execute the transition independent of the velocity at the time of deselection.

In some embodiments, the content application transitions from the preview user interface 511 back to the content browsing user interface 502 in response to the input. In some embodiments, the transition can be between the preview mode and the content browsing mode can be gradual (e.g., reversing the transition from the content browsing mode back to the preview mode). For example, the transition can animate the movement of content browsing user interface 502 pulling forward from the second depth in FIG. 5B to the first depth in FIG. 5A (and changing the size of the content items and/or user interface elements of content browsing user interface 502). Additionally or alternatively, the changes in appearance of the content browsing user interface 502 and the XR environment due to changing immersion level can be gradual. For example, the lightening of the environment and/or fading in/bringing into focus of the content items in the content browsing user interface 502 can occur gradually.

In some embodiments, the animation includes movement of content item 512A returning back to the corresponding content item 504A in the content browsing user interface 502. In some embodiments, the velocity of content item 512A in the animation can be in accordance with the velocity of the input movement (e.g., the input movement in the second predetermined direction). For example, the faster the input movement, the faster the velocity; the slower the input movement, the slower the velocity.

In some embodiments, the transition begins at the conclusion of the input (e.g., including selection, movement and deselection) to return back to content browsing user interface 502. In some embodiments, the transition can begin in response to some sub-inputs and continue as the input progresses to completion (e.g., detecting all the required sub-inputs). In some embodiments, the transition begins in response to some sub-inputs and then is canceled if the input does not progress to completion. For example, movement in the first predetermined direction while maintaining the pinch input can begin the transition by beginning to reduce the immersion (e.g., lightening the environment) or by beginning to change the size of content items (e.g., shrinking content item 512A) and/or the position of content items (e.g., in content browsing user interface 502 and preview user interface 511). FIG. 5C illustrates the depths of multiple user interfaces of the content application are optionally changed. For example, FIG. 5C illustrates the content browsing user interface 502 can begin moving forward from the depth in FIG. 5B to the depth in FIG. 5A (e.g., shown in FIG. 5C with an intermediate position of, +ΔZ) due to part or all of the input to transition, and preview user interface 511 can begin moving backward from the depth in FIG. 5B toward the content browsing user interface 502 (e.g., shown in FIG. 5C with an intermediate position of, −ΔZ). In accordance with this movement, content items 504" (and optionally user interface elements 506" and 508") may begin to increase in size (and/or fade in and/or brighten), and content item 512' (and optionally user interface elements 516' and 518') may begin to decrease in size (and/or dim and/or fade out). In some embodiments, the reflection 520' changes size and/or brightness based on the changes to the size and/or brightness of content item 512' and the brightness of the XR environment.

It is understood that, in some embodiments, content item 512A in the preview user interface 511 occupies more than a threshold amount (e.g., 50%, 70%, 90%, etc.) of the viewing area of the display generation component, such that the preview user interface 511 is considered a "full-screen" preview mode.

Figure 6:
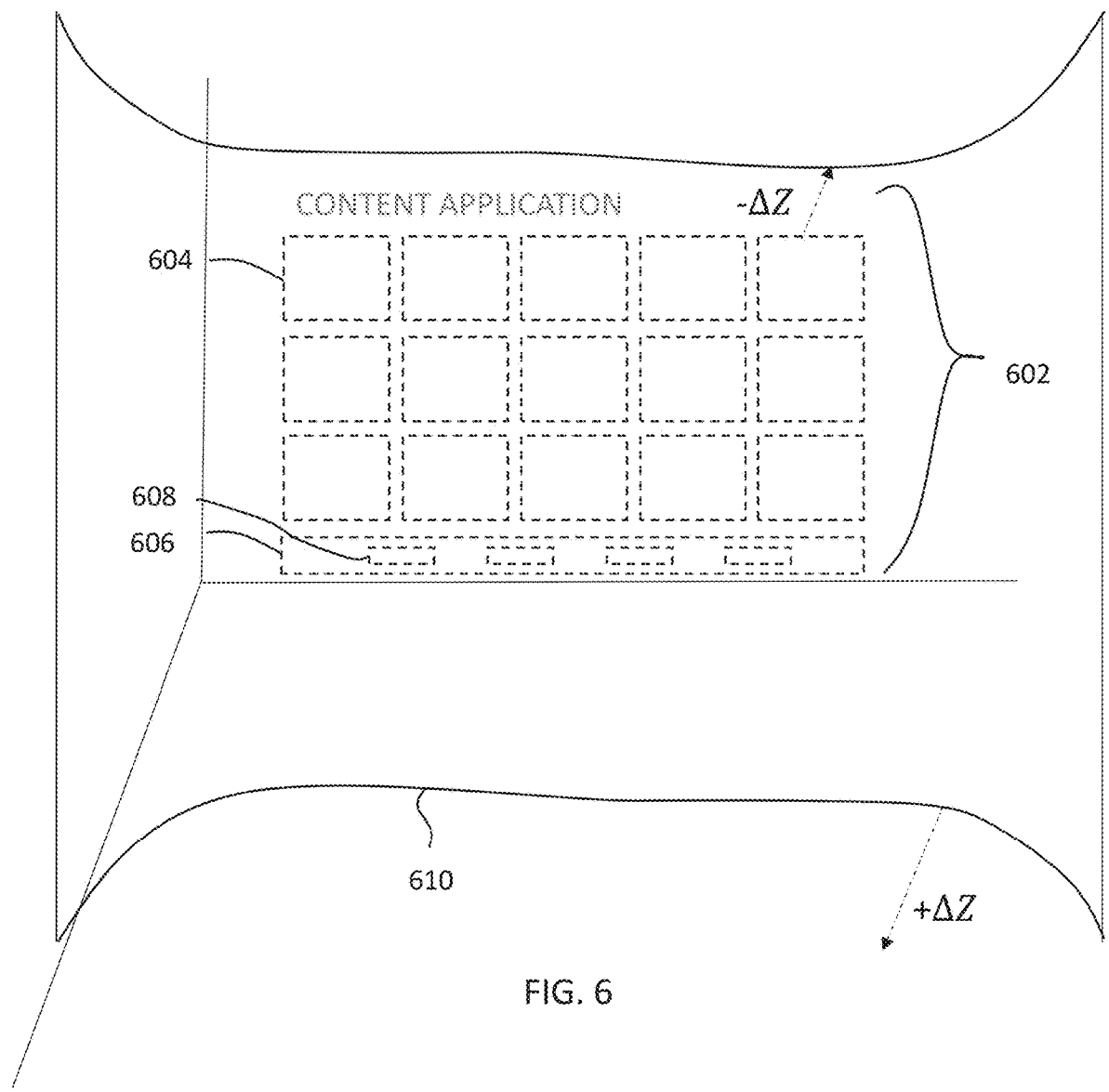
FIG. 6 illustrates an example view of a content application in an XR environment according to some embodiments of the disclosure.

FIG. 6 illustrates an example view of a content application in an XR environment according to some embodiments of the disclosure. FIG. 6 corresponds to another possible user interface for viewing one or more content items of the content application. For example, in response to detecting a request to view one of the items of content in a first user interface (e.g., the content browsing user interface 502 of FIG. 5A), the electronic device optionally displays the requested item of content in a second user interface. Thus, in some embodiments, the second user interface is a content viewing user interface (also referred to herein as a "panoramic user interface") that includes an item of content (e.g., text content, photo content, and/or video content).

For reference, FIG. 6 illustrates a content browsing user interface 602 of multiple content items 604 (and optionally including one or more user interface elements 608 disposed in a user interface element 606) corresponding to content browsing user interface 502 of multiple content items 504 (and optionally to user interface elements 506, 508) of FIG. 5A. FIG. 6 illustrates a panoramic user interface 610 for a content application optionally displayed in the XR environment in response to the input to transition to a different viewing mode (e.g., the same transition input or a different transition input than used to transition to the preview mode of FIG. 5B). In some embodiments, panoramic user interface 610 includes one content item that corresponds to one of the content items 604 targeted (e.g., based on gaze) by the transition input.

The content item displayed in the panoramic user interface 610 is displayed in the XR environment with a size greater than the displayed content item 604 to which it corresponds in the content browsing user interface. In some embodiments, the content item in the panoramic display occupies more than a threshold amount (e.g., 50%, 70%, 90%, etc.) of the viewing area of the display generation component. In some embodiments, the content item in the panoramic user interface 610 is a three-dimensional representation (non-planar). In some embodiments, the content item in the panoramic user interface 610 wraps partially or fully around the user (e.g., providing a 180° or 360° viewing capability). In some embodiments, a rotation input (e.g., as measured by motion sensors, hand-tracking sensors, etc.) can be used to rotate the view of the XR environment to display a different portion of the content item displayed in panoramic user interface 610.

In some embodiments, the same transition input is used to transition from content browsing user interface 502/602 to either preview user interface 511 or panoramic user interface 610. In some embodiments, the transition is made to the panoramic user interface 610 in accordance with the selected content item corresponding to panoramic content (e.g., a panoramic photo or video), whereas the transition is made to preview user interface 511 in accordance with the selected content item corresponding to non-panoramic content (e.g., standard photos or videos). In some embodiments, different transition inputs are used to transition to panoramic user interface 610 or preview user interface 511, respectively.

Optionally, panoramic user interface 610 includes one or more user interface elements (not shown) providing various functions (e.g., similar to as described above with respect to user interface elements 518 and not repeated here). In some embodiments, the user interface elements are displayed in response to some additional input (e.g., gaze, gesture, and/or proximity of a finger/hand).

In some embodiments, panoramic user interface 610 replaces content browsing user interface 602 in the XR environment. In such embodiments, content browsing user interface 602 ceases to be displayed in the XR environment and panoramic user interface 610 is displayed in its place in the XR environment. In some embodiments, panoramic user interface 610 is displayed at the same depth (along the Z-axis) within the XR environment as content browsing user interface 602 prior to the transition to the panoramic viewing mode. In some embodiments, panoramic user interface 610 is displayed at a different depth (along the Z-axis) within the XR environment. In some embodiments, panoramic user interface 610 is displayed closer to the user in the XR environment than content browsing user interface 602 prior to transition. In some embodiments, panoramic user interface 610 is displayed further from the user in the XR environment than content browsing user interface 602 prior to transition.

In some embodiments, panoramic user interface 610 is displayed concurrently with content browsing user interface 602. In such embodiments, panoramic user interface 610 is displayed with a different depth (along the Z-axis) in the XR environment than content browsing user interface 602. In some embodiments, the depth of one user interface of the content application is changed. For example, the content browsing user interface 602 can remain at its depth prior to the transition input and panoramic user interface 610 can be displayed at a different depth in the XR environment (e.g., closer to the user for a more immersive experience). Alternatively, the content browsing user interface 602 is moved to a different depth in the XR environment due to the transition input and panoramic user interface 610 can be displayed at the depth in the XR environment at which the content browsing user interface 602 was displayed prior to the transition input (e.g., displaying the panoramic user interface 610 can push back the content browsing user interface 602). In some embodiments, the depths of multiple user interfaces of the content application are changed. For example, as FIG. 6 illustrates, the content browsing user interface 602 can be moved to a different depth in the XR environment compared with the depth of content browsing user interface 502 in FIG. 5A (e.g., pushed back, −ΔZ) due to the transition input and panoramic user interface 610 can be displayed at the depth in the XR environment different from the depth at which the content browsing user interface 502 was displayed prior to the transition input shown in FIG. 5A (e.g., forward from, +ΔZ).

In some embodiments, a level of immersion can be different for the panoramic mode versus the content browsing mode and/or the preview mode. In some embodiments, the level of immersion can be increased in the panoramic view by darkening the XR environment outside the panoramic user interface 610 and/or by increasing the opacity applied to the physical representations in the XR environment and/or other non-physical representations outside the panoramic user interface 610. For example, the XR environment may be darker in the panoramic mode as compared with the XR environment in the content browsing mode as shown in FIG. 5A and/or as compared with the XR environment in the preview mode as shown in FIG. 5B. The darkening of the XR environment may not apply to the content item in panoramic user interface 610, which can optionally brighten compared to the corresponding content item in the content browsing user interface 602 prior to transition. Additionally, light from the panoramic content item can optionally cause a reflection to be displayed in the darkened computer-generated environment (e.g., on the floor).

In some embodiments, the appearance of the content browsing user interface 602 can be altered while displayed coextensive in time with panoramic user interface 610. For example, the appearance of content browsing user interface 602 can be out of focus, faded out and/or dimmed while concurrently displayed with panoramic user interface 610 as compared with the appearance of content browsing user interface 602 while displayed without panoramic user interface 610. Additionally, the size of the content items 604 (and optionally user interface elements 606, 608) displayed in content browsing user interface 602 in FIG. 6 can be smaller in size than content items 504 displayed in content browsing user interface 502 in FIG. 5A. The change in size of the display of content items 504 can be a function of the change in depth of content browsing user interface 502/602 between FIGS. 5A and 6.

In some embodiments, the transition between the content browsing mode and the panoramic mode can be gradual. For example, changes in position and/or size and/or appearance of user interface elements and content items of the content browsing user interface between FIG. 5A and FIG. 6 can be gradual. For example, the transition can animate the movement of content browsing user interface 502 pushing back from a first depth in FIG. 5A to a second depth in FIG. 6, and the resulting change in size of the content items and/or user interface element of content browsing user interface 502/602. Additionally or alternatively, the changes in appearance of the content browsing user interface 602 and the XR environment due to changing immersion level can be gradual. For example, the darkening of the environment and/or fading and/or blurring the focus of the content items in the content browsing user interface 602 can occur gradually. In some embodiments, the transitions can be reversed upon exiting the panoramic mode, optionally in a gradual fashion. In some embodiments, the same input can be used to exit the panoramic mode as to exit the preview mode.

Figure 7:
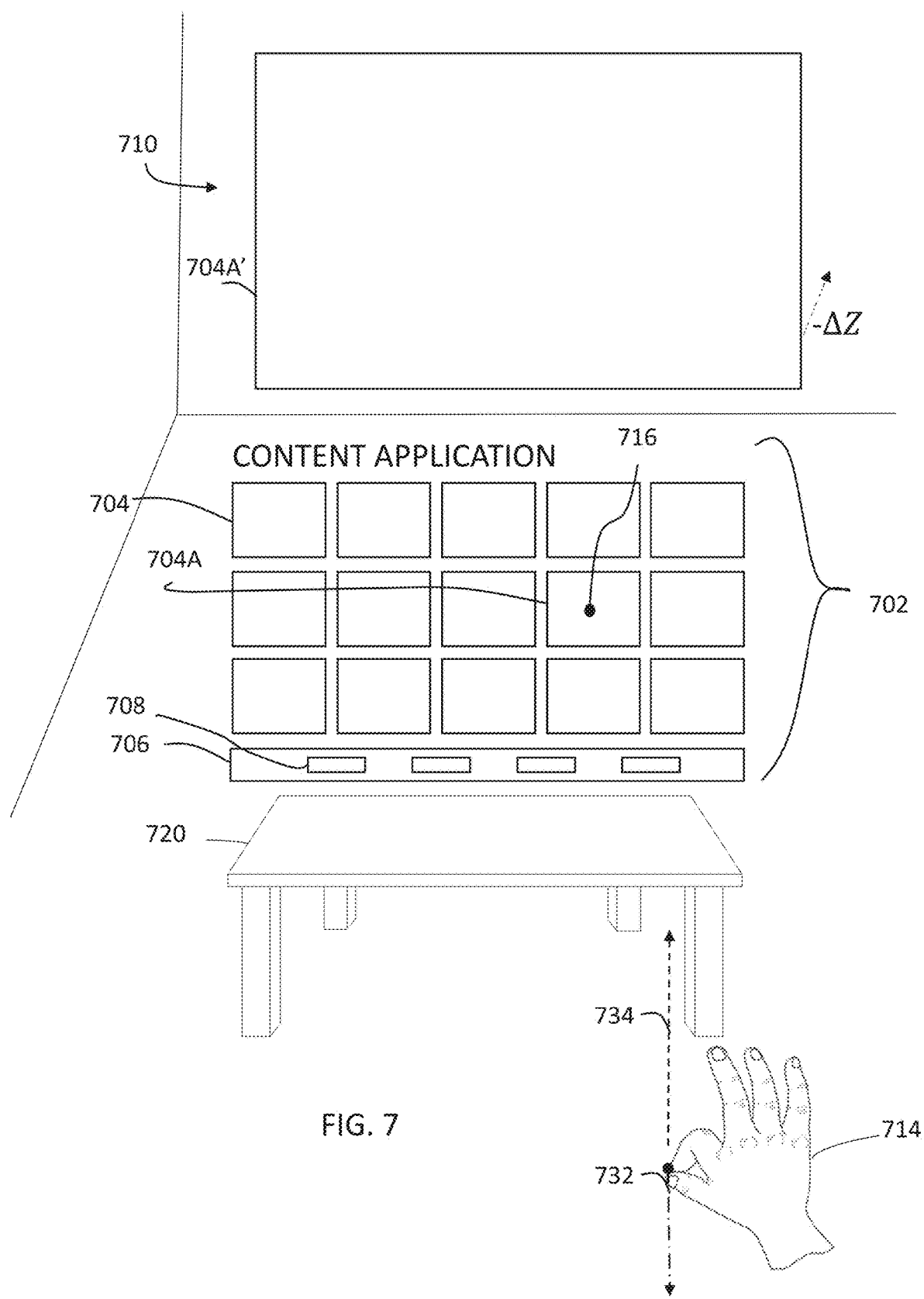
FIG. 7 illustrates an example view of a content application in an XR environment according to some embodiments of the disclosure.

FIG. 7 illustrates an example view of a content application in an XR environment according to some embodiments of the disclosure. FIG. 7 corresponds to another possible user interface for viewing one or more content items of the content application. For example, in response to detecting a request to view one of the items of content in a first user interface (e.g., content browsing user interface 702 corresponding to the content browsing user interface of FIG. 5A), the electronic device optionally displays the requested item of content in a second user interface. Thus, in some embodiments, the second user interface is a content viewing user interface (also referred to herein as a "preview user interface") that includes an item of content (e.g., text content, photo content, and/or video content).

For reference, FIG. 7 illustrates a content browsing user interface 702 of multiple content items 704 (and optionally including one or more user interface elements 708 disposed in a user interface element 706) corresponding to content browsing user interface 502 of multiple content items 504 (and optionally to user interface elements 506, 508) of FIG. 5A. Unlike content browsing user interface 502, content browsing user interface 702 can be disposed closer to the user (e.g., in the foreground relative to content browsing user interface 502). In some embodiments, the content browsing user interface 702 is displayed anchored to a representation of a physical object (e.g., table 720 in FIG. 1). FIG. 7 illustrates a preview user interface 710 for a content application optionally displayed in the XR environment in response to the input to transition to a different viewing mode (e.g., the same transition input or a different transition input than used to transition to the preview mode of FIG. 5B or the panoramic mode of FIG. 6). In some embodiments, preview user interface 710 includes one content item 704A' that corresponds to one of the content items 704A targeted (e.g., based on gaze, indicated by gaze indicator 716) by the transition input.

In some embodiments the content item displayed in the preview user interface 710 is displayed in the XR environment with a size greater than the displayed content item 704 to which it corresponds. In some embodiments, content item 704A' in the preview user interface 710 is displayed in the background in the XR environment, and optionally is anchored to a planar surface (e.g., a background wall). In some embodiments, content item 704A' in the preview user interface 710 is displayed at a higher elevation within the XR environment than content browsing user interface 702.

In some embodiments, the same input can be used to transition from content browsing user interface 702 to preview user interface 710 as is used to transition from content browsing user interface 502/602 to preview user interface 511 or panoramic user interface 610. In some embodiments, the input is a gesture made by hand 714 (optionally reflected in the XR environment by a representation of hand 714) including pinching together two fingers (e.g., thumb and index finger) of hand 714, and while pinching, moving by a first threshold amount in a first predetermined direction indicated in FIG. 7 by arrow 734 to cast content item 704A (e.g., an image) to display preview user interface 710. In some embodiments, to exit the preview mode and return to the content browsing mode (e.g., displaying content browsing user interface 702 and ceasing displaying preview user interface 710), the transition input includes pinching together two fingers of hand 714 (optionally while gaze is targeting content item 704'), and while pinching, moving by a second threshold amount in a second predetermined direction (e.g., opposite the first predetermined direction) indicated in FIG. 7 by arrow 732 to pull content item 704A' (e.g., an image) from preview user interface 710. In some embodiments, the transition is made to preview user interface 710 (as opposed to other user interfaces of the content application) in response to the transition input in accordance with the content browsing user interface being within a threshold distance of the user (e.g., foreground) and/or in accordance with having a planar surface more than a threshold distance (e.g., background). In some embodiments, the transition is made from the content browsing user interface to the panoramic user interface 610 or to preview user interface 511, as described above, in accordance with the content browsing user interface being outside the threshold distance (and/or in accordance with not having a planar surface). In some embodiments, different inputs can be used to transition to preview user interface 710, panoramic user interface 610 or preview user interface 511, respectively.

Optionally, preview user interface 710 includes one or more user interface elements (not shown) providing various functions (e.g., similar to as described above with respect to user interface elements 518 and not repeated here). In some embodiments, the user interface elements are displayed in response to some additional input (e.g., gaze, gesture, etc.). In some embodiments, these one or more user interface elements are displayed in the foreground, in closer proximity to the user than preview user interface 710.

In some embodiments, when preview user interface 710 is displayed, content browsing user interface 702 ceases to be displayed in the XR environment. In some embodiments, preview user interface 710 is displayed concurrently with content browsing user interface 702. In such embodiments, preview user interface 710 is displayed with a different depth (along the Z-axis) in the XR environment than content browsing user interface 702. In some embodiments, the depth of one user interface of the content application is changed. For example, the content browsing user interface 702 can remain at its depth prior to the transition input and preview user interface 710 can be displayed at a different depth (e.g., −ΔZ) in the XR environment (e.g., further from the user). In some embodiments, the depths of multiple user interfaces of the content application are changed. For example, the content browsing user interface 702 can be moved to a different depth in the XR environment compared with the depth of content browsing user interface 702 (e.g., pulled forward toward the user, +ΔZ) due to the transition input and preview user interface 710 can be displayed at the depth in the XR environment different from the depth at which the content browsing user interface 702 was displayed prior to the transition input (e.g., pushed backward from the user, −ΔZ).

In some embodiments, a level of immersion can be different for preview user interface 710 in the preview mode versus the content browsing mode (or versus preview user interface 511 or panoramic user interface 610). In some embodiment, the level of immersion can be increased in the preview mode by darkening the XR environment outside the preview user interface 710 and/or by increasing the opacity applied to the physical representations in the XR environment and/or other non-physical representations outside the preview user interface 710. For example, the XR environment may be darker in the preview mode in which the preview user interface 710 is shown as compared with the XR environment in the content browsing mode as shown in FIG. 5A and/or as compared with the XR environment in the preview mode as shown in FIG. 5B. In some embodiments, the level of lighting/dimming can be the same for preview user interface 710 as for preview user interface 511 (both in preview modes). The darkening of the XR environment may not apply to the content item 704A', which can optionally brighten compared with corresponding content item 704A.

Additionally, light from content item 704A' can optionally cause a reflection to be displayed in the darkened computer-generated environment.

In some embodiments, the appearance of the content browsing user interface 702 can be altered while displayed coextensive in time with preview user interface 710. For example, the appearance of content browsing user interface 702 can be out of focus, faded out and/or dimmed while concurrently displaying preview user interface 710 as compared with content browsing user interface 702 without displaying preview user interface 710. Additionally, the size of the content items 704 (and optionally user interface elements 706, 708) displayed in content browsing user interface 702 can be smaller in size while displaying preview user interface 710 as compared to their size in the content browsing mode.

In some embodiments, the transition between the content browsing mode and the preview mode can be gradual. For example, changes in position and/or size and/or appearance of user interface elements and/or content items of content browsing user interface 702 or preview user interface 710 can occur gradually. For example, the transition can animate the movement of content browsing user interface 702 moving toward the user and/or changing the size or appearance of the content items of content browsing user interface 702. As another example, the transition can animate the movement, change in size and change in brightness of content item 704A as it transitions to be displayed as content item 704A' in preview user interface 710. In some embodiments, the transitions can be reversed upon exiting the preview mode, optionally in a gradual fashion. In some embodiments, the same input can be used to exit the panoramic mode as to exit the preview mode.

Figure 8:
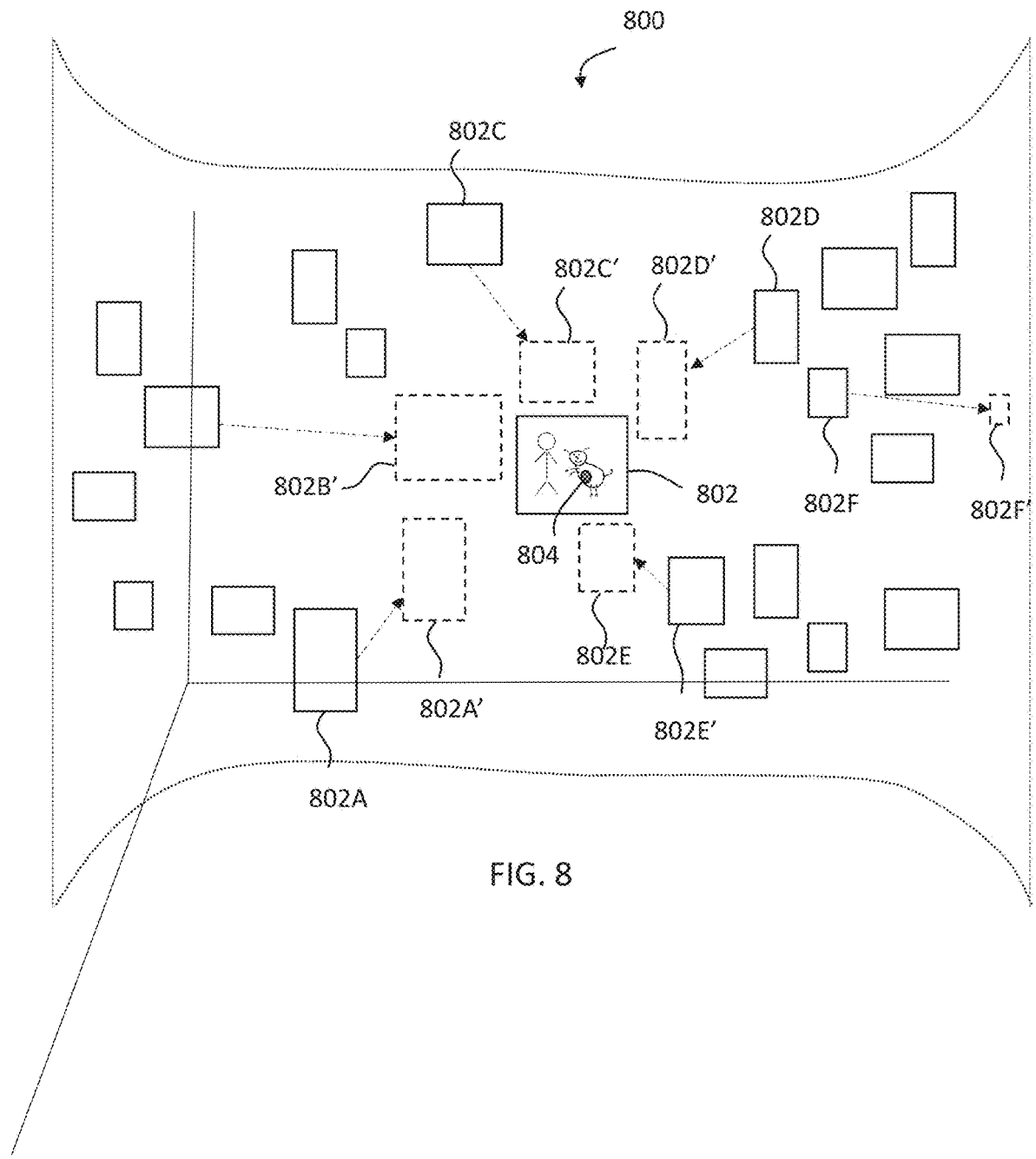
FIG. 8 illustrates an example view of a content application in an XR environment according to some embodiments of the disclosure.

FIG. 8 illustrates an example view of a content application in an XR environment according to some embodiments of the disclosure. FIG. 8 corresponds to another possible content browsing user interface 800 for browsing and/or viewing content items of the content application. Unlike the grid layout of content items in content browsing user interface 502, content browsing user interface 800 illustrates a plurality of content items splayed in the XR environment. In some embodiments, the splayed content items 802 (illustrated as rectangles in FIG. 8) can be arranged in a planar representation in the XR environment, but not arranged in a grid (e.g., with a row/column or other uniform representation). For example, splayed content items 802 can be disposed at the same depth (along the Z-axis) in the XR environment and with the same orientation. In some embodiments, the splayed content items can be arranged in a non-planar representation. For example, various splayed content items 802 are disposed at different depths (along the Z-axis) and or at different orientations.

In some embodiments, the content browsing user interface 800 occupies more than a threshold amount (e.g., 50%, 70%, 90%, etc.) of the viewing area of the display generation component. In some embodiments, the content browsing user interface 800 extends in the XR environment beyond the dimensions of the physical environment represented in the XR environment. For example, some content items 802 and/or some of content browsing user interface 800 can appear in the XR environment at a distance from the user greater than a distance of physical walls of the room in which the user is located in the physical environment. In some embodiments, content browsing user interface 800 is constrained to a specific region of the XR environment defined by a viewing port (e.g., a polygonal or circular viewing port).

In some embodiments, content browsing user interface 800 is a three-dimensional representation (non-planar) similar to panoramic user interface 610. In some embodiments, the splayed content items in the content browsing user interface 800 wrap partially or fully around the user (e.g., providing a 180° or 360° viewing capability). In some embodiments, a rotation input (e.g., as measured by motion sensors, hand-tracking sensors, etc.) can be used to rotate the view and see a different portion of the splayed content items displayed in content browsing user interface 800.

In some embodiments, the same input can be used to transition from content browsing user interface 502/602 to content browsing user interface 800 as to transition to other viewing modes/user interfaces (e.g., preview user interface 511, panoramic user interface 610, preview user interface 710, etc.). In some embodiments, a different input can be used to transition to content browsing user interface 800 than to other user interfaces/viewing modes.

Optionally, content browsing user interface 800 includes one or more user interface elements (not shown) providing various functions (e.g., similar to as described above with respect to user interface elements 518, and not repeated here). In some embodiments, these user interface elements are displayed in response to some additional input (e.g., gaze and/or a gesture by a finger/hand).

In some embodiments, content browsing user interface 800 replaces content browsing user interface 502/602 (or another user interface) in the XR environment. In such embodiments, content browsing user interface 502/602 ceases to be displayed in the XR environment and content browsing user interface 800 is displayed in its place the XR environment. In some embodiments, content browsing user interface 800 is displayed at the same depth (along the Z-axis) within the XR environment as the user interface presented prior to the transition. In some embodiments, splayed content items in content browsing user interface 800 are displayed at multiple different depths (along the Z-axis) within the XR environment. In some embodiments, content browser user interface 800 is displayed closer to and/or further from the user in the XR environment (as compared with content browsing user interfaces 502/602/702).

In some embodiments, a level of immersion is different for the content browsing mode for splayed content items versus other content browsing modes and/or preview modes. In some embodiment, the level of immersion can be increased in the panoramic view by darkening the XR environment outside the content browsing user interface 800 and/or by increasing the opacity applied to the physical representations in the XR environment and/or other non-physical representations outside the content browsing user interface 800. For example, the XR environment may be darker in the panoramic mode in which the content browsing user interface 800 is shown in FIG. 8 as compared with the XR environment in the content browsing mode as shown in FIG. 5A, as compared with the XR environment in the preview modes as shown in FIG. 5B or 7, and/or as compared panoramic mode as shown in FIG. 6. In some embodiments, the opacity applied to the physical environment can be above a threshold to allow for the content items 802 to be displayed at a depth to appear to extend beyond walls (or other items) in the physical environment. The darkening of the XR environment may not apply to the content items 802, which can optionally brighten. Additionally, light from the content items 802 can optionally cause a reflection to be displayed in the darkened computer-generated environment.

In some embodiments, the appearance of the content items in content browsing user interface 800 can be altered. For example, a user may focus attention on a specific/targeted content item, and the focus of attention can cause a change in position of one or more content items (e.g., an attraction and/or a repulsion effect). This attraction and/or repulsion effect can help a user browse and/or filter content items having shared characteristics, and optionally cluster content items with shared characteristics in a region of the user interface. In some embodiments, the user may focus attention on the specified content item using gaze (e.g., represented by gaze focus 804 on content item 802). In some embodiments, focusing on content item 802 (e.g., a photo or video of a specific person and a specific pet) can cause one or more additional content items 802A-802E to move closer to content item 802 (e.g., to positions illustrated by content items 802A'-802E') in an attraction effect. In some embodiments, the movement of the content item can include changes in three-dimensional position (e.g., including changes in depth) and/or orientation. In some embodiments, the movement of content items 802A-802E closer to content item 802 can increase the size of the content items (e.g., content items 802A'-802E' are illustrated to optionally increase in size relative to content items 802A-802E). Additionally or alternatively, in some embodiments, focusing on content item 802 can cause one or more additional content items to move further from content item 802 in a repulsion effect. For example, content item 802F can move further from content item 802 as illustrated by content item 802F', optionally changing the position, orientation and/or size (e.g., shrinking) of the content item. In some examples, the attraction and repulsion movements described above can be reversed when the focus leaves content item 802 (e.g., when the input ends). In some embodiments, the content items can remain in their respective locations when the focus is removed from a specific content item. In some embodiments, the content items can be attracted to or repulsed from a new target content item each time a new content item is targeted (e.g., by gaze or other input).

In some embodiments, the attraction to targeted content item 802 is based on a shared characteristic with targeted content item 802 and/or the repulsion from the targeted content item 802 is based on a distinct characteristic from targeted content items 802. The amount of attraction and/or repulsion may be a function on whether the characteristic is shared or distinct (whether neutral or opposite). In some embodiment multiple characteristics are used and an ensemble score based on whether multiple characteristics are shared or distinct (and how shared or distinct the characteristics are) is used to determine the amount of attraction/repulsion.

As an example, targeted content item 802 can be a photo (or video) of a specific person and specific pet, content items 802A-802E can be photos (or videos) including the specific person and/or specific pet, and content item 802F can be a photo (or video) that does not include the person or the pet (or includes different persons and/or different pets). Content items 802A-802E are attracted to the location of content item 802 based on shared characteristics and content item 802F is repulsed from the location of content item 802 based on distinct characteristics. In some embodiments, content items including the specified person or specified pet (but not both) remains stationary or is attracted to content item 802, but not as much as those content items with both the specified person and pet. In some embodiments, content items with distinct characteristics remain stationary or be repulsed (with the amount of repulsing being a function of how disparate the content items are).

The above description uses the identity of the person and/or animal as a characteristic, but other characteristics are possible. In some embodiments, the shared characteristic can be other characteristics of the content item such as number of persons and/or animals (e.g., content items with one person and one pet, content items with four people, content items with only pets, etc.), location (e.g., content items created at a shared geolocation, such as home, work, a specific city or country, etc.), date (e.g., content items created on specific day, week, month, year, etc.), event (e.g., content items created at the same or similar events, such as school, wedding, sporting event, conferences etc.), size (e.g., content items with a shared aspect ratio, etc.), orientation (e.g., content items with a shared orientation, such as landscape or portrait), capture device (e.g., content items created by a shared sensor, such as a rear camera, a front-facing camera, a specific content creation application, etc.), mode (e.g., a selfie mode), a file type (e.g., photos, videos, text), activity (e.g., reading, exercising, hiking, kayaking, etc.), filter or effect type (e.g., specific color filter or black-and-white filter, etc.), favorites (e.g., user-specified favorite content items), relationships (e.g., spouses, family members, teammates etc.), among other possible characteristics (scenic shots, architecture shots, famous landmarks, etc.).

In some embodiments, one characteristic is derived for the targeted content item. In some embodiments, multiple characteristics are derived for the targeted content item. For example, the identity of the person in content item 802 can be derived as a characteristic (one characteristic) or the identity of the person and the pet in content item 802 (two characteristics). In some examples, the characteristic can be derived from a subset of a targeted content item. For example, content item 802 is illustrated as including a person and a pet, but the characteristic may be derived as the pet/identity of the pet based on gaze focus 804 being collocated with the pet.

In some embodiments, one or more machine learning models (e.g., a deep neural network, etc.) are used to determine one or more characteristics of different content items (e.g., to extract features) of the content items. In some embodiments, when a content item is targeted (or when a portion of a content item is targeted), the one or more machine learning models can predict one or more characteristics of the content item and/or generate a score representative of how common or distinct other content items are from the targeted content item. These scores can then be used to determine whether to change the position various content items, whether the change should reflect attraction or repulsion, and how much attraction or repulsion should be applied.

In some embodiments, the attraction and/or repulsion are gradual. For example, content items 802A-802F may gradually move from their initial position to the position indicated by content items 802A'-802F'. In some embodiments, the rate of the movement of content items can be a function of distance, attraction/repulsion score, and/or duration of the input. In some embodiments, the velocity of the movement of content items may be a function of distance (e.g., velocity is linearly or non-linearly proportional (or inversely proportional) to distance between a respective content item and the targeted content item). In some embodiments, the velocity of the movement of content items may be a function of score (e.g., velocity is linearly or non-linearly proportional to score between a respective content item and the targeted content item). In some embodiments, the velocity of the movement of content items may be a function of duration of the input (e.g., velocity is linearly or non-linearly proportional to duration that gaze rests on the targeted content item). In some embodiments, the velocity of the movement is a function of distance, score and duration of the input (e.g., gaze).

In some embodiments, hysteresis can be added to the attraction and repulsion effect. For example, movement associated with the attraction/repulsion effect may begin when gaze focuses on a targeted content item for a first threshold duration, and then continue (optionally at a slower velocity) despite temporary aversion of gaze. The movement associated with the attraction/repulsion may not stop until gaze is averted from the previously targeted options for a second threshold duration (or until a new content item is targeted by gaze focus for the first threshold direction). In some examples, the attraction and/or repulsion effect in the splayed content browsing user interface 800 can be toggled on or off (e.g., by a user interface element in the XR environment, or by other input such as a gesture or voice command).

In some embodiments, the appearance of the content items in content browsing user interface 800 can be altered based on a spatial characteristic. For example, the appearance of content items may be enhanced based on location within the XR environment. For example, a specific region of the XR environment can be defined (e.g., the center of the field of view of the user). Content items at the specific region can be a first size and content items at a distance from the specific region can be a different (e.g., smaller) size. In some embodiments, the size of content items can decrease (e.g., linearly or non-linearly) moving away from the specific region in the XR environment (e.g., moving to the left/right and/or rearward from the specific region). In some examples, in addition to size being maximized at the specific region, the content items may have a maximum focus and/or lighting (and/or minimum fading) at the specific region. The focus and/or lighting may decrease (e.g., linearly or non-linearly) and/or fading may increase moving away from the specific region in the XR environment. In some embodiments, the above described spatial characteristics can improve focus and or provide zoom for content items that are the subject of a user's focus (and zoom out content items outside the user's focus) without requiring user input to zoom. In some embodiments, the specific region can move within the XR environment in accordance with a user input (e.g., rotation of the electronic device). For example, the specific region can remain at the same point within the field of view of the electronic device. In some embodiments, the rotation input provides an alternative means for scrolling content items by moving the electronic device to provide a different view of the splayed content items rather than an input (e.g., a gesture) to scroll the content items (e.g., as described with respect to FIGS. 9A-9C).

In some embodiments, the transition between content browsing user interface 800 and other user interfaces of the content application described herein can be gradual (e.g., animating the changes in position, size orientation, and/or appearance of user interface elements and content items). In some embodiments, the transition is instantaneous or rapid. In some embodiments, some of the transitions are gradual and some of the transitions are rapid or instantaneous. For example, transitioning from content browsing user interface 502 to content browsing user interface 800 can gradually dim the environment but rapidly remove content items 504 and add content items 802 to the XR environment. In some embodiments, the transitions are reversed upon exiting the splayed content browsing mode, optionally in a gradual fashion (and/or rapid fashion).

Figure 9A:
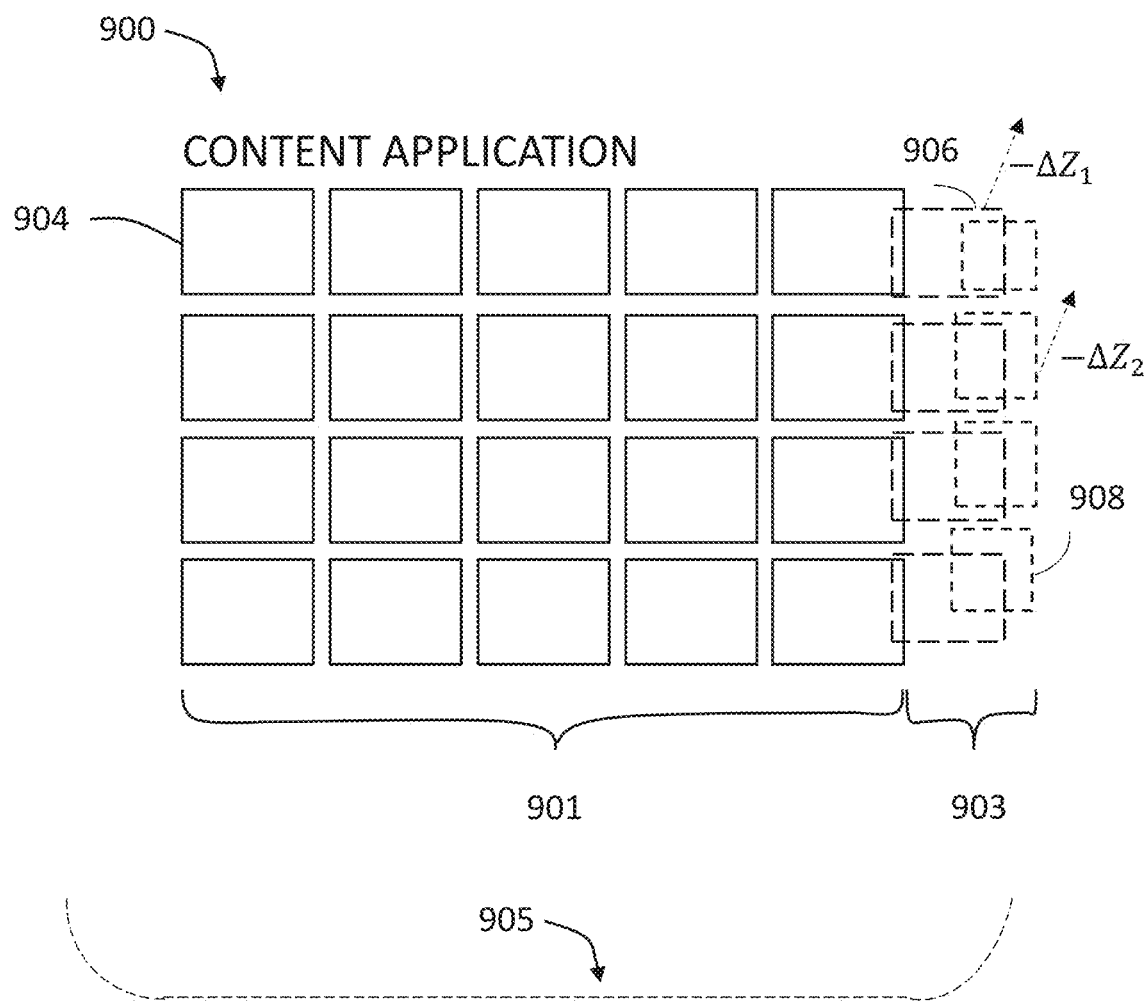
FIGS. 9A-9C illustrate scrolling a content browsing user interface of a content application according to some embodiments of the disclosure.
Figure 9B:
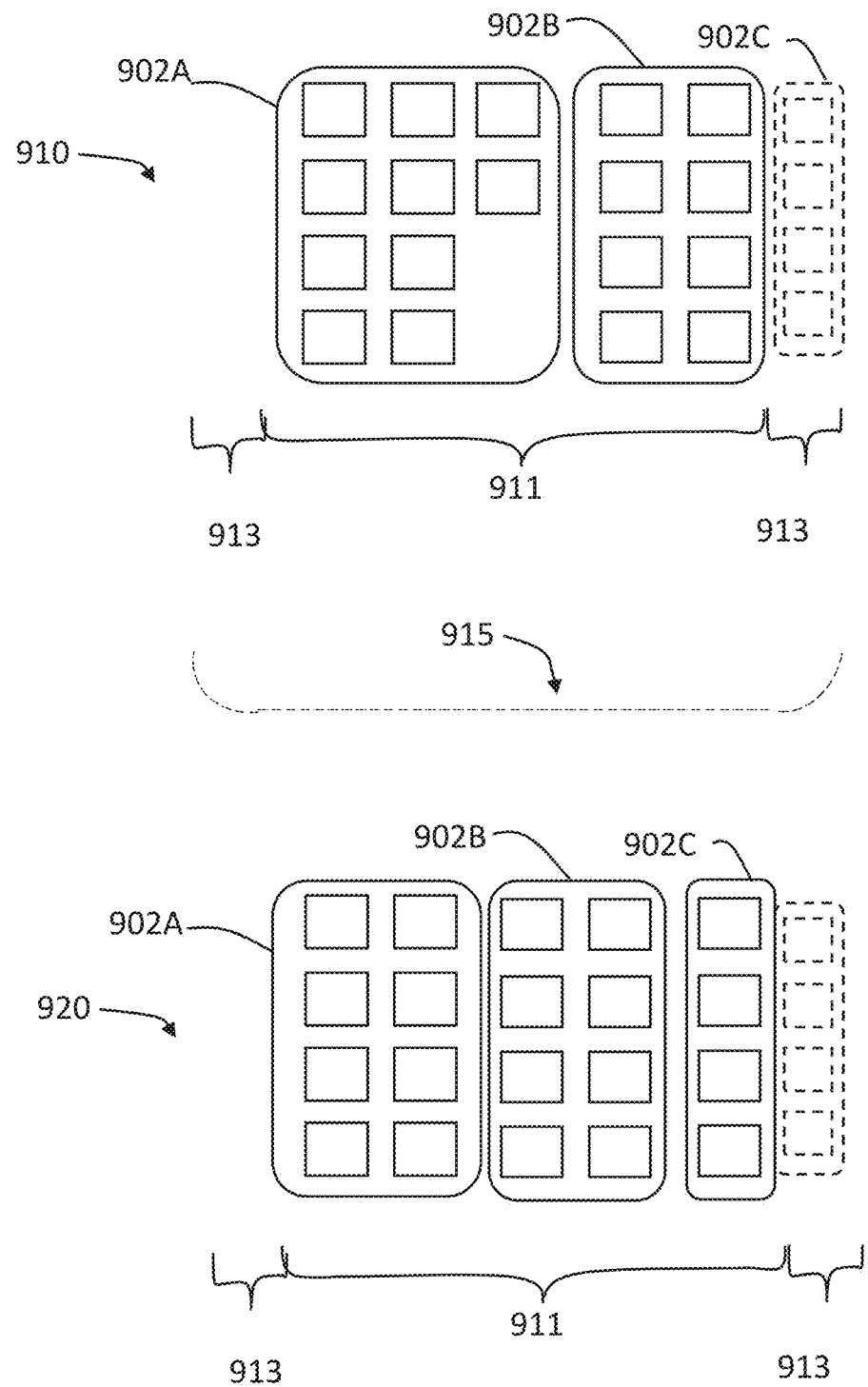
Figure 9C:
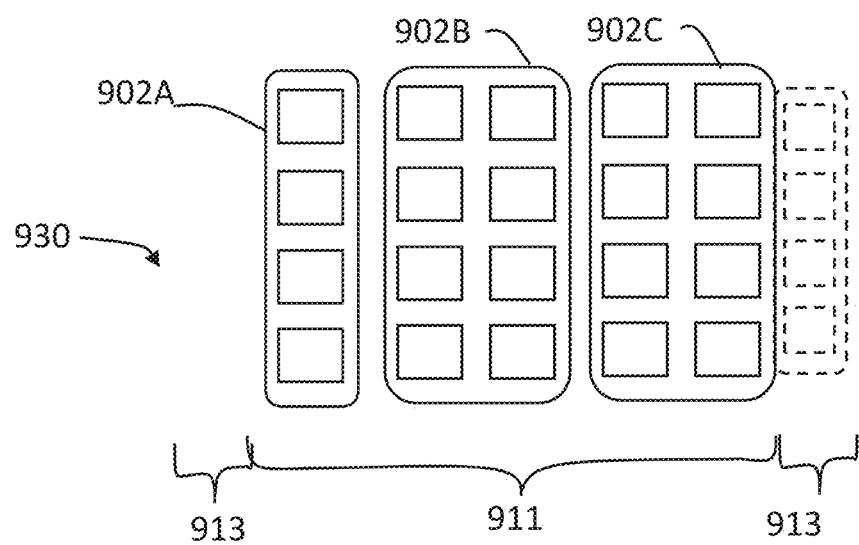
Figure 9C:
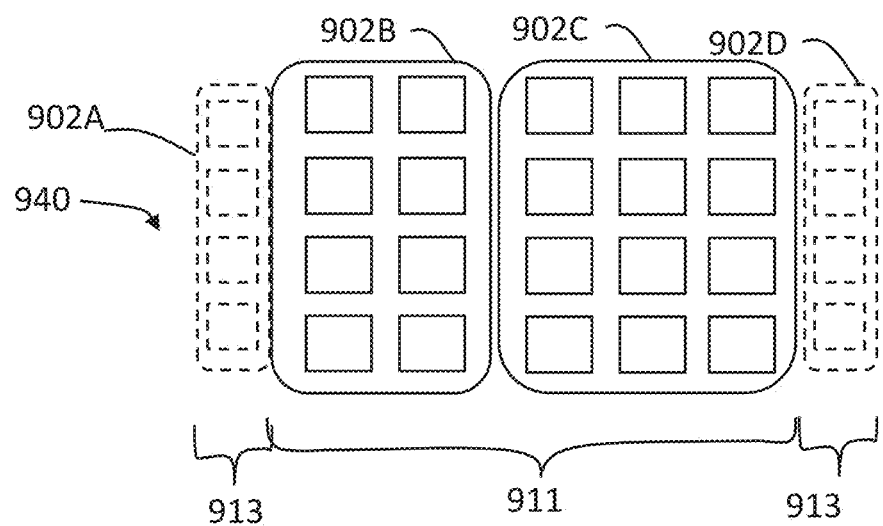
Figure 10A:
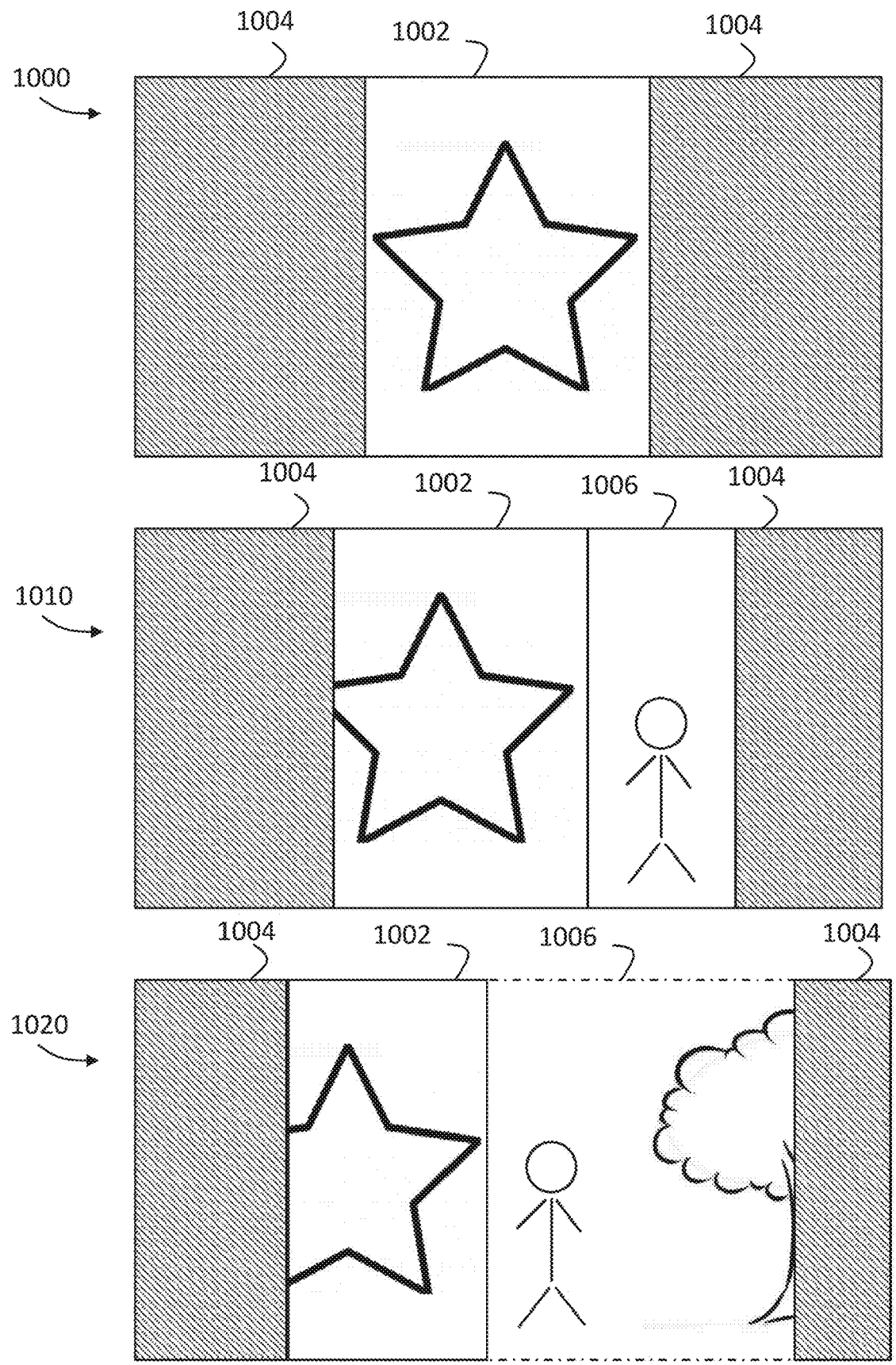
FIG. 10A-10D illustrate scrolling a content browsing user interface of a content application according to some embodiments of the disclosure.
Figure 10B:
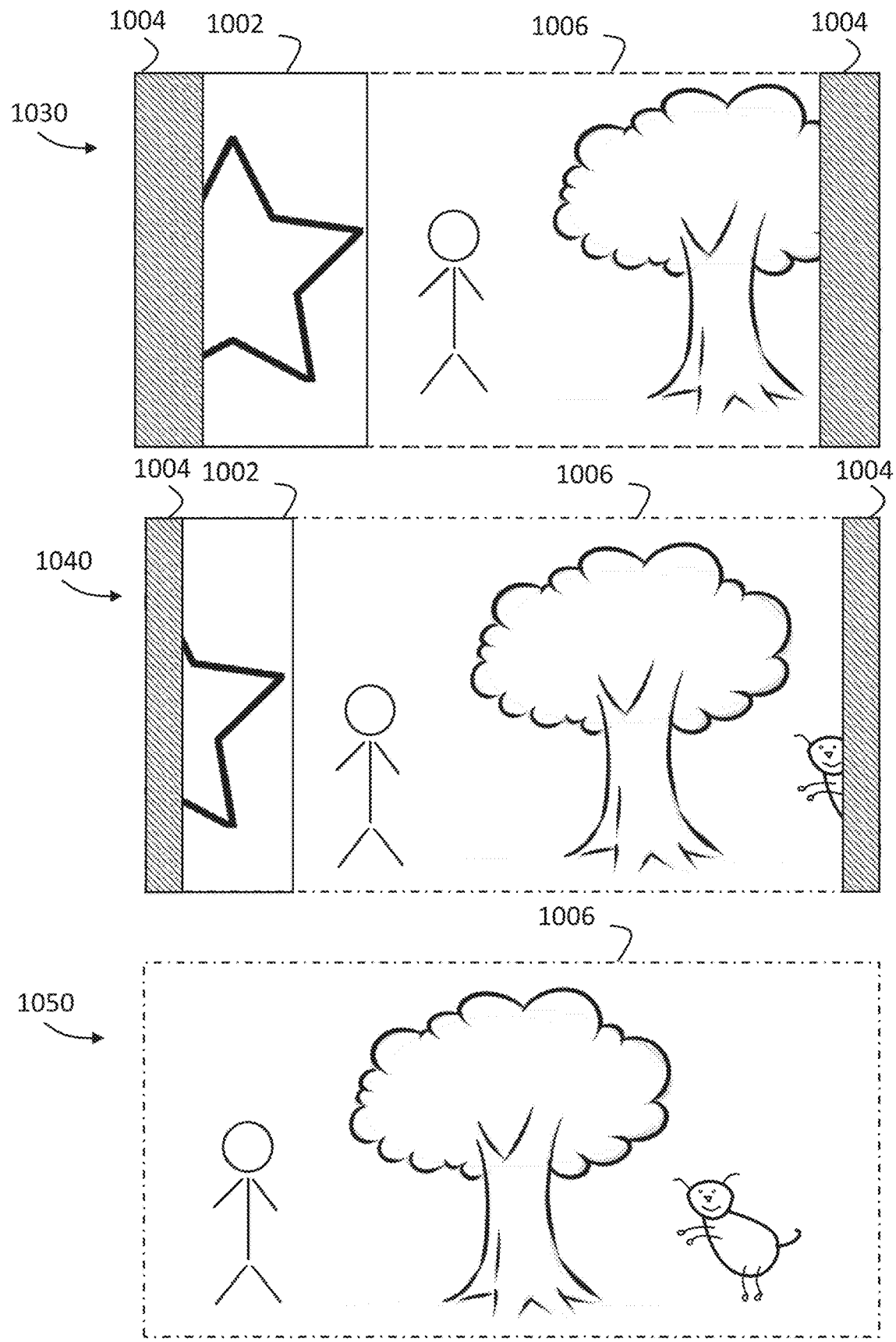
Figure 10C:
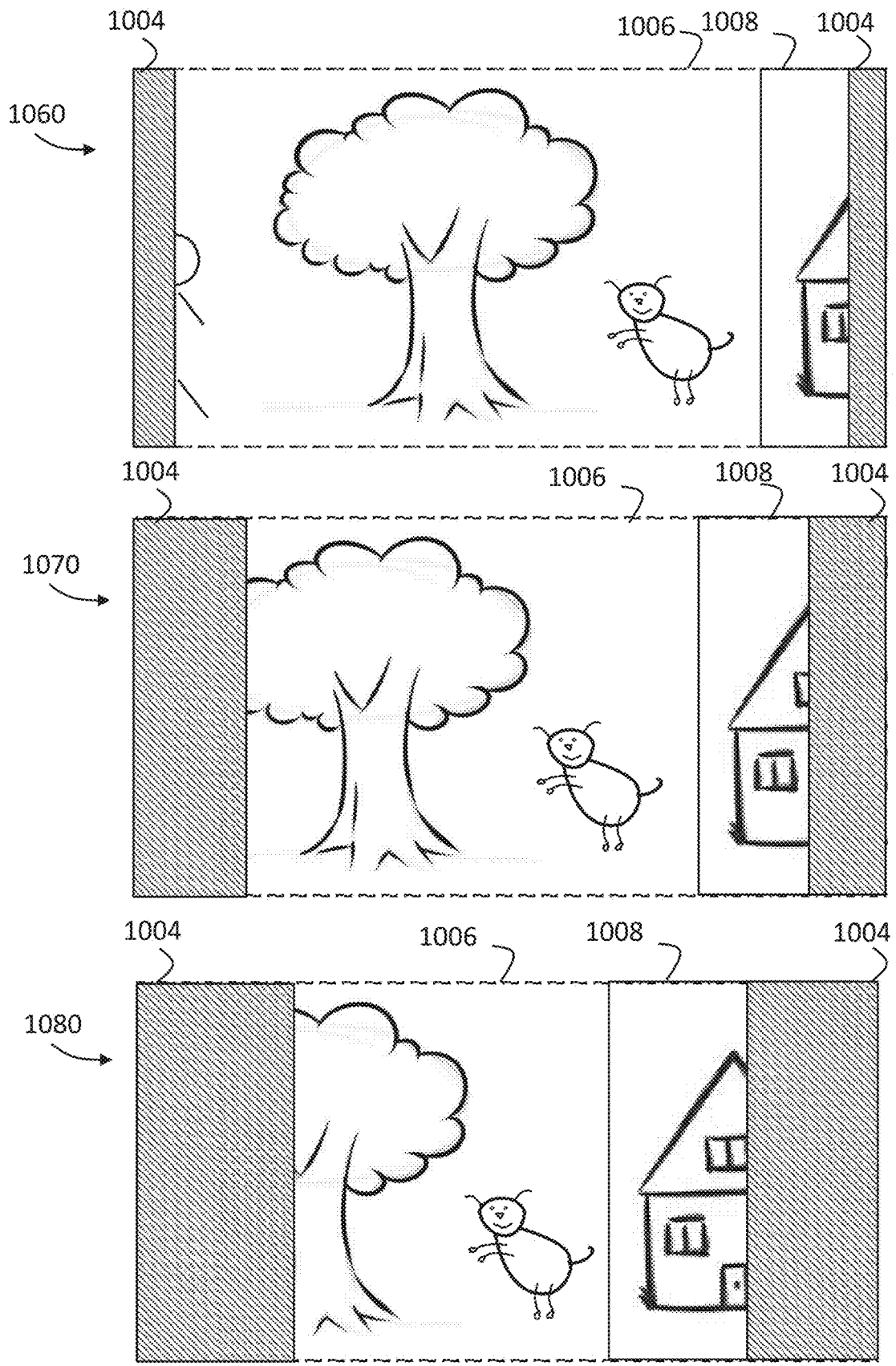
Figure 10D:
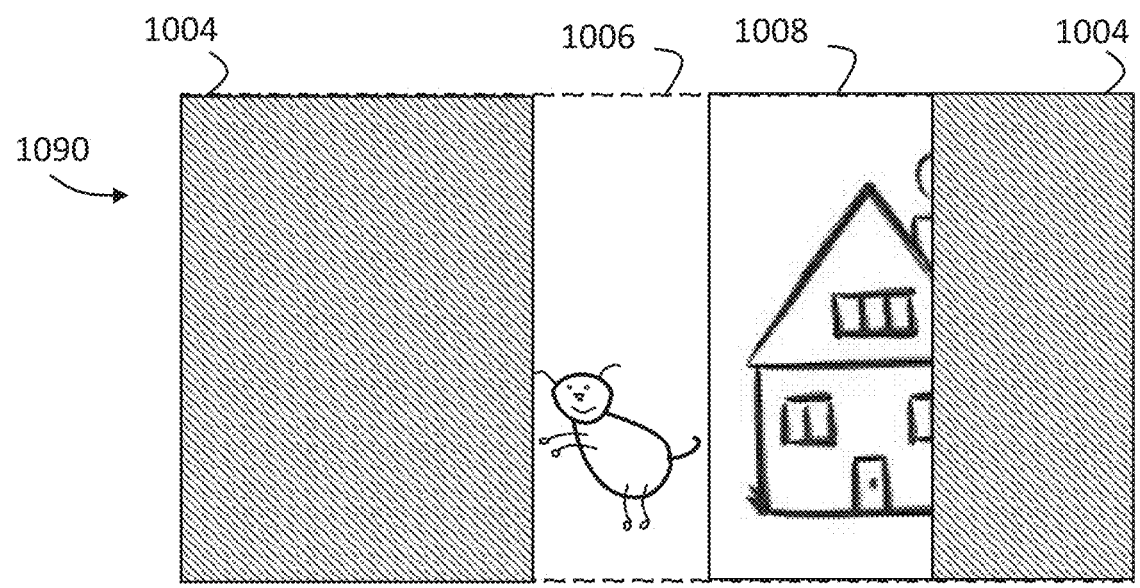
Figure 10D:
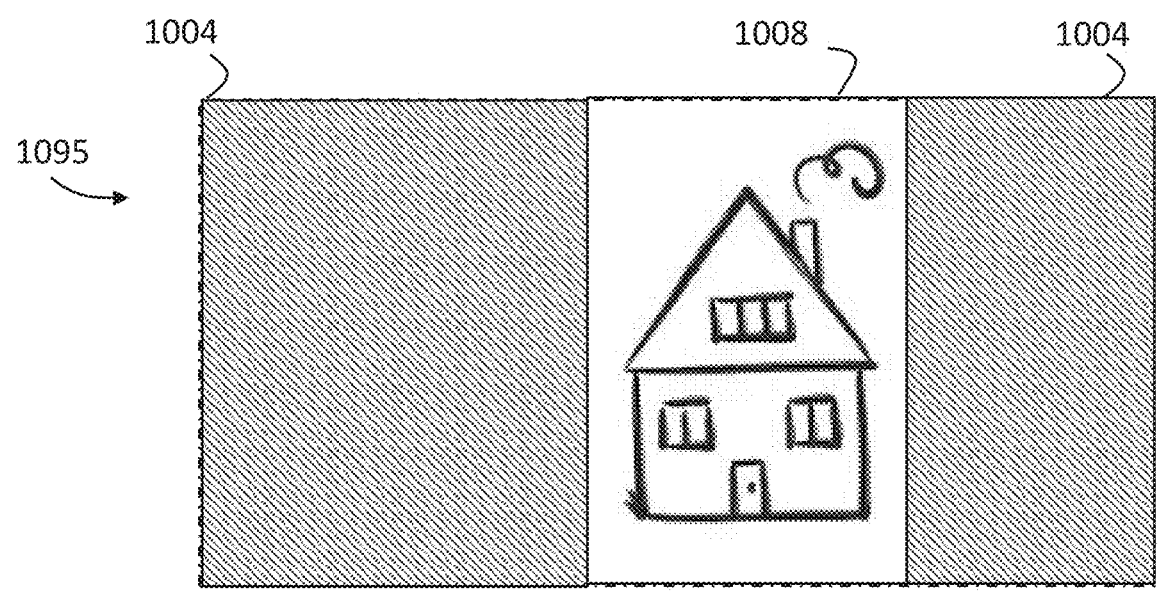
Figure 11A:
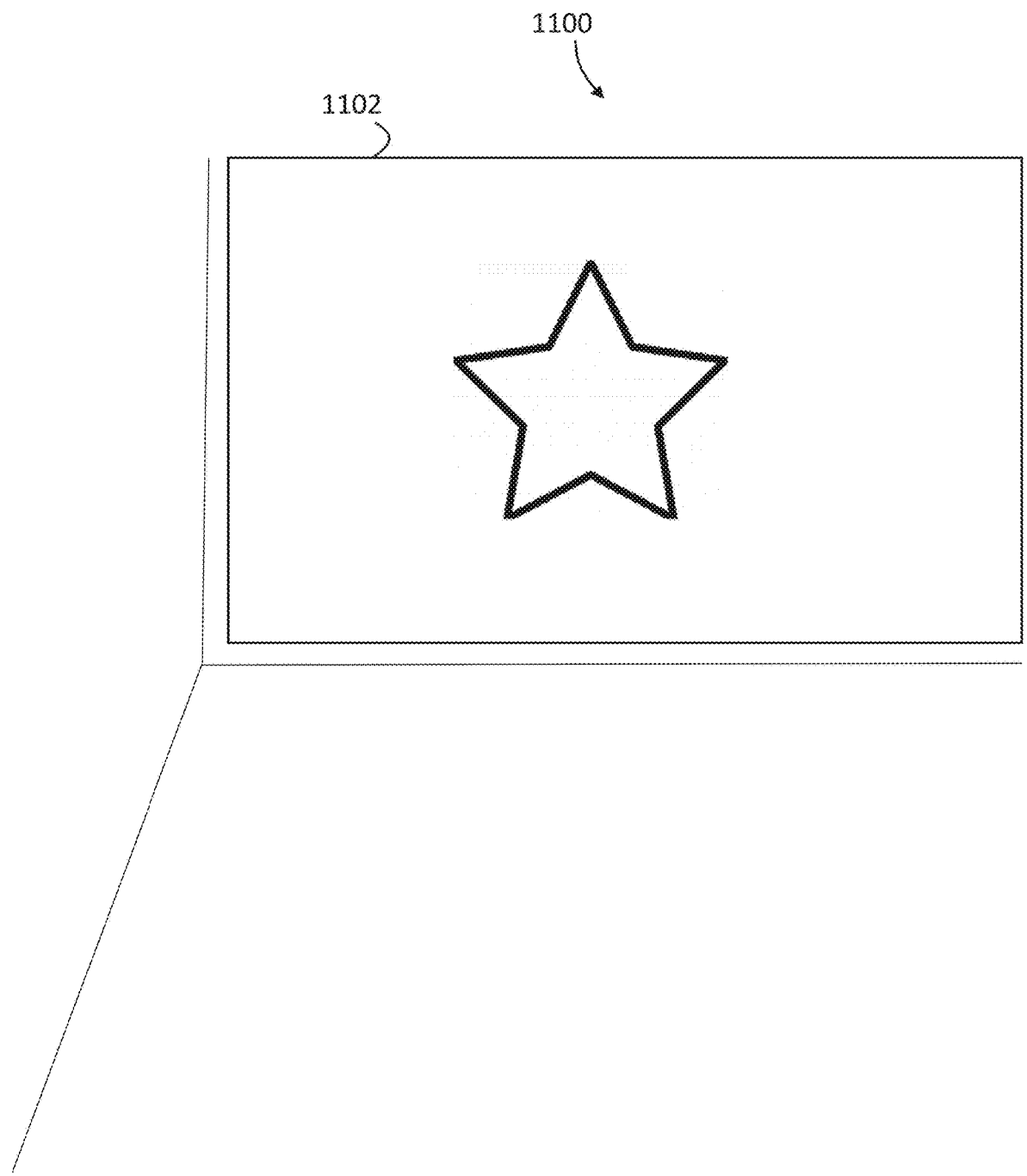
FIGS. 11A-11D illustrate views of a content-in-content user interface of a content application according to some embodiments of the disclosure.
Figure 11B:
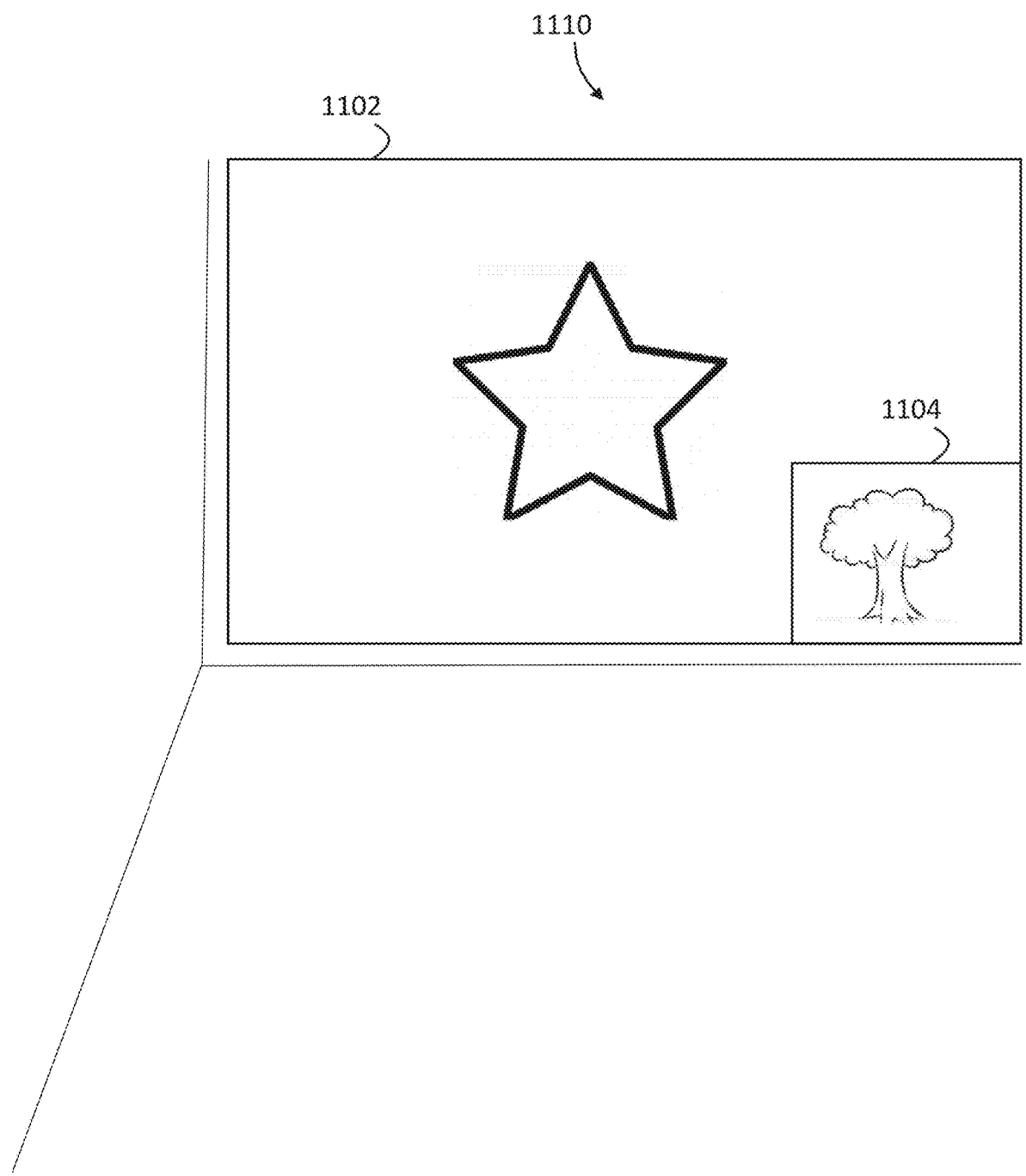
Figure 11C:
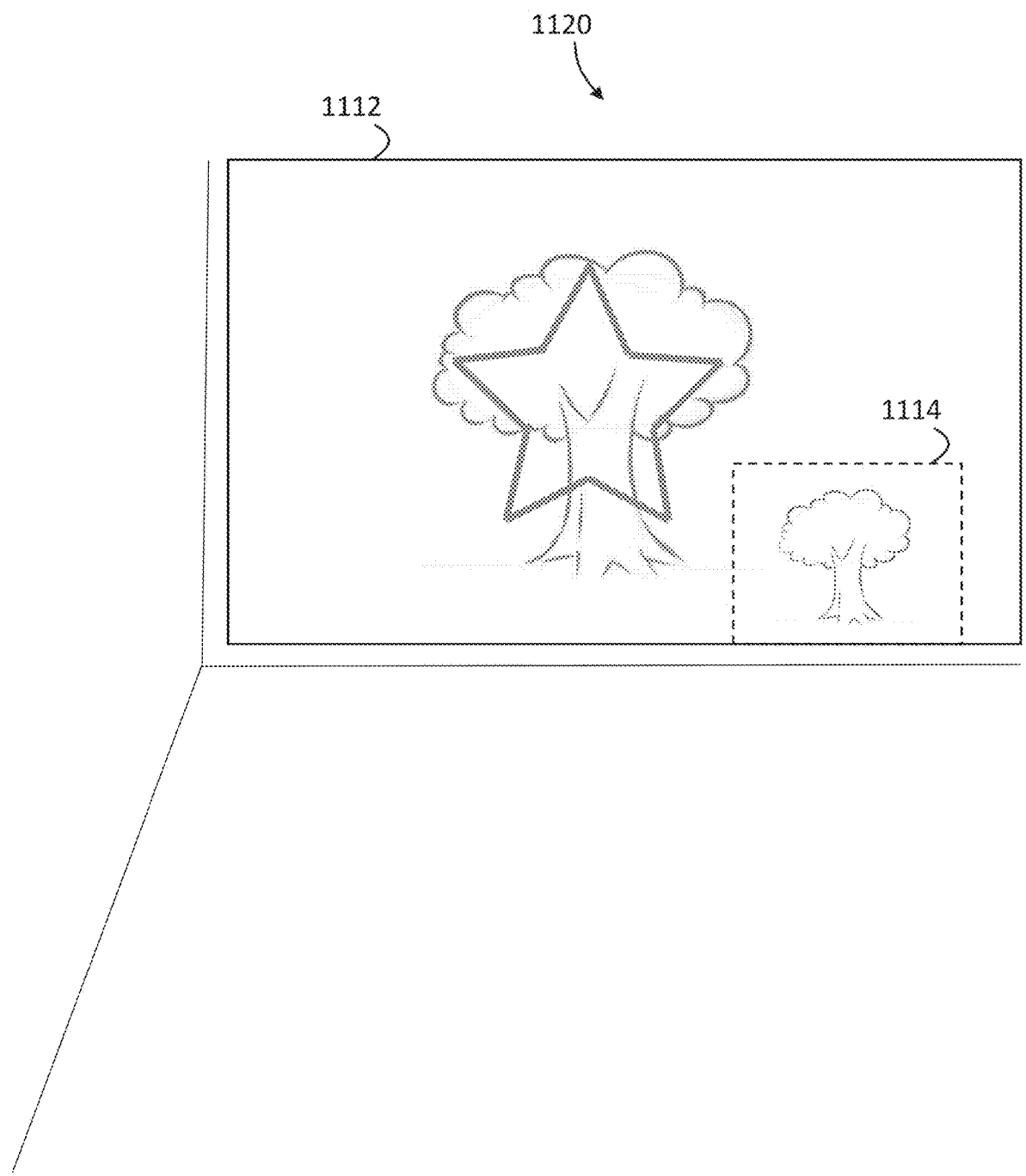
Figure 11D:
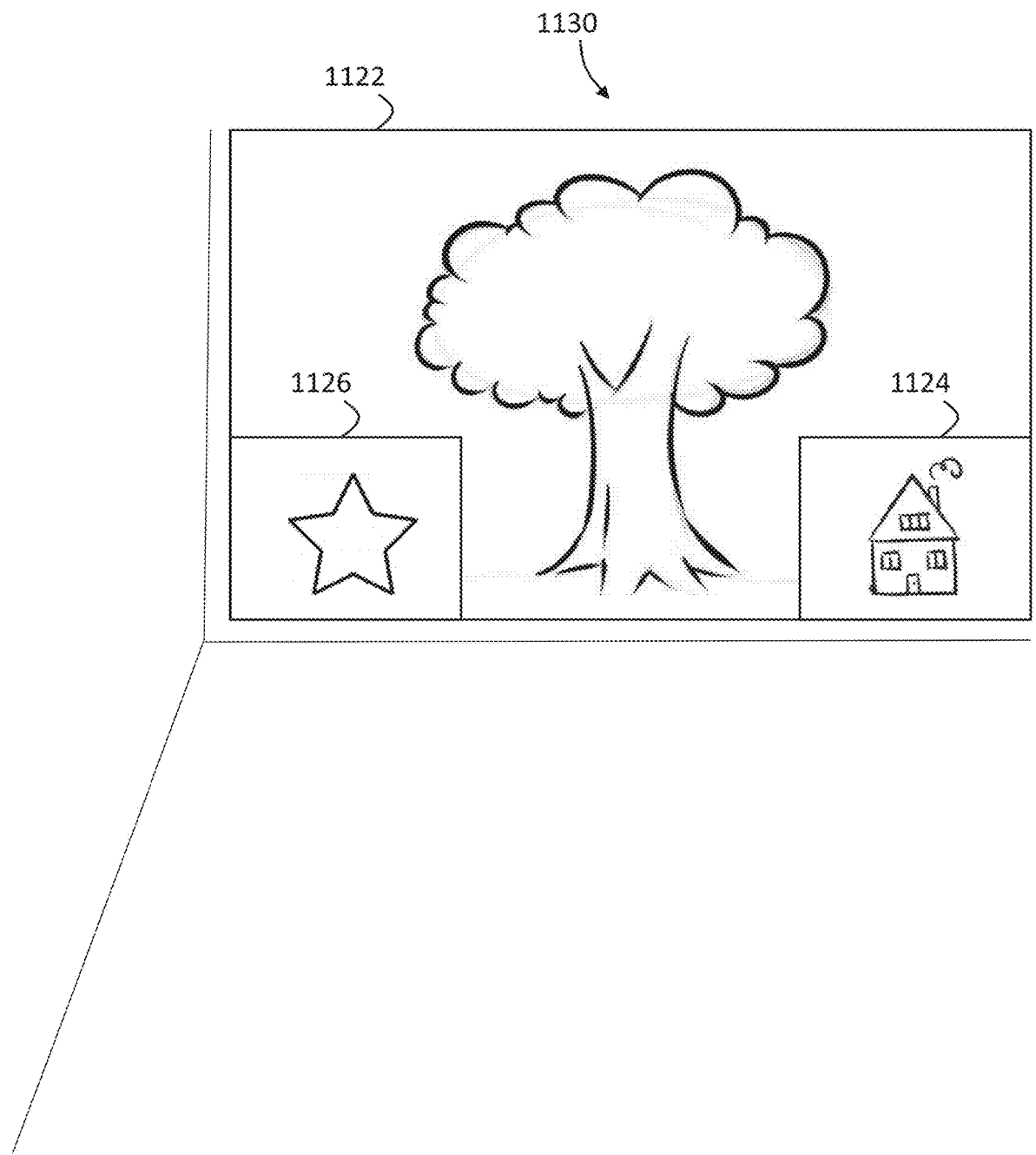

FIGS. 9A-9C illustrate scrolling a content browsing user interface of a content application according to some embodiments of the disclosure. FIG. 9A illustrates a content browsing user interface 900 including a plurality of content items 904 arranged in a grid (e.g., corresponding to the content browsing user interface 502/602/702). In some embodiments, the content application may include a number of content items that exceeds the display area allotted to the content browsing user interface 900. For example, content browsing user interface 900 of FIG. 9A illustrates a display area 901 (first region) with space for 20 content items 904 in a 4×5 grid. It should be understood that the display area allotted to the content browsing user interface may be different than the example representation in FIG. 9A. In some embodiments, a user input is used to scroll the plurality of content items. For example, a scroll input can be provided via a gesture (e.g., a swipe gesture by a finger or hand), via an affordance in the user interface (e.g., moving a slider or tapping scroll button) and/or gaze input (e.g., resting gaze on an edge of the grid for a threshold period of time). The scrolling input can cause some of the content items 904 to be moved and/or replaced with other content items that are not displayed in the display area 901 of content browsing user interface 900. For example, a column of content items 906 can be added to the content browsing user interface 900 and the leftmost column of content items 904 can be removed from the content browsing user interface (e.g., cease displaying the leftmost column) in response to a scroll input.

In some embodiments, in order to improve the user experience, additional content items 906, 908 are displayed in an edge area 903 (second region) of the content browsing user interface 900. The content items 906, 908 can be displayed in the second region 903 with an appearance that is different than content items 904 displayed in the first region 901 of the content application. The illustration of content items in a second region 903 along the edge can provide the user with information about whether there are additional content items to scroll to in the content browsing user interface (e.g., FIG. 9A shows additional content items in the edge region on the right, but not on the left so the user understands that browsing is only possible in one direction), and also can provide some information about what these content items may be (e.g., because there are further representations of the content).

In some embodiments, the content items in the second region 903 along the edge can be non-planar, whereas the content items in the first region 901 can planar. For example, the content items in content browsing user interface 900 can be fit to a curve 905 (illustrated from a top-down perspective in FIG. 9A), that includes a linear portion corresponding to the first region 901 and a curved portion corresponding to the second region 903. The curve can move away from the user (e.g., along a Z-axis), such that the content items have different depths along the curve portion. For example, content items 904 can have a first depth, content items 906 can have a second depth (e.g., $-\Delta Z_1$ further from the user), and content items 908 can have a third depth (e.g., $-\Delta Z_2$, even further from the user). In some embodiments, scrolling content along the curve can provide the appearance of the content items moving between the first region 901 and the second region 903 like a carousel.

In some embodiments, the content items disposed along the curve (e.g., content items 906, 908) are oriented toward the user in a planar fashion similar to content items 904 (e.g., depth defined by the curve, but the orientation not defined by the curve). In some embodiments, the content items disposed along the curve follow the curve such that the content item has a depth gradient (and the orientation of content items follow the curve).

In some embodiments, the content items in the second region 903 can have a different appearance than content items in the first region 901 due to the change in depth. For example, the content items 906 can be smaller in size compared with content items 904 due to the relative depth of content items 906 from the user. Likewise, content items 908 can be smaller in size compared with content items 906 due to the relative depth of content items 908 from the user. In some embodiments, the content items 906, 908 in the second region can also be faded out, dimmed in brightness and/or out of focus compared with content items 904. In some embodiments, the fade, brightness, and/or focus for content items 906 can be relatively less than for content items 904, and the fade, brightness, and/or focus for content items 908 can be relatively less than for content items 906. In some embodiments, the size, fade, brightness, and/or focus for content items in the second region 903 can follow a gradient along the curve 905. Additionally, it is understood that content items in second region 903 may be at least partially occluded by content items in first region 901, and that some content items in the second region 903 may at least partially occlude other content items in the second region (e.g., content items 906 may partially occlude content items 908).

Although not illustrated in FIG. 9A, an additional edge area is optionally presented on the opposite side of display area 901, and can include representations of content items in the edge region on the opposite side of display area 901. The behavior and appearance of the content items in this additional edge region are similar (mirrored) and are not repeated here for brevity. Although FIG. 9A illustrates two columns of content items in the edge region, it is understood that fewer or more columns can be displayed in the edge region.

FIGS. 9B-9C illustrates different views 910, 920, 930, 940 of a content browsing user interface including a plurality of content items (e.g., illustrated as rectangles) arranged in a grid similar to content browsing user interface 900. However, the content browsing user interface of FIGS. 9B-9C illustrates the content items grouped into containers 902A-902D (e.g., user interface elements). Each container can correspond to a period of time (e.g., day, week, month, year, etc.), an event, or a folder, for example. Each of containers 902A-902D can include one or more content items. For example, container 902A in view 910 includes ten representative content items and container 902B includes eight representative content items. The containers can be sized, in some embodiments, according to the number of underlying content items therein. For example, container 902A is three columns wide by 4 rows to accommodate 10 content items, leaving two empty spaces. Container 902B is two columns wide by 4 rows to accommodate 8 eight content items. In some embodiments, the container size may be limited by the size of a display region 911 (first region) of the user interface. For example, display region 911 is illustrated to accommodate 5 columns, and thus container 902B may include more than eight items, but container 902A and 902B may together be limited to five columns of content items. It should be understood that the display area allotted to the content browsing user interface and the size of the containers may be different than the example representation in FIGS. 9B-9C.

In some embodiments, the content items illustrated in the container may be a representative sampling of the content items in the container, but there may be more content items in the container than displayed in the user interface. For example, container 902B illustrates eight content items in the user interface, but may include more than eight content items. In some embodiments, an input to select a respective container triggers display of another user interface (or a transition to a new user interface) to display the contents of the container. In some embodiments, a user input (e.g., gaze, proximity, and/or gesture) can be used to expand a respective container and/or the content items in a container in a similar manner as described with respect to the expanded view of the clipboard contents in FIGS. 4A-4C. For example, the container can be expanded in the foreground (or closer to the user in the XR environment) to display the expanded content items. In some embodiments, the content items are expanded out of the container without expanding the container. In some embodiments, the container includes a visual indicator that there are more content items in the container than displayed in the content browsing user interface. In some embodiments, an appearance (e.g., shape, outline, etc.) of the container displaying fewer than all content items is different than a container that displays all its content items. In some embodiments, containers displaying fewer than all content times may expand as other containers contract. For example, as described herein, some containers may collapse or contract as part of the scrolling process. In some embodiments, rather than expanding the contents of a container in a separate user interface (in response to an input to expand the container to view the contents), the selected container can be expanded in display region 911 of the user interface, and other containers in display region 911 can be collapsed to make room for the expansion of the selected container.

In some embodiments, a user input can be used to scroll the plurality of content items. For example, a scroll input can be provided via a gesture (e.g., a swipe gesture by a finger or hand), via an affordance in the user interface (e.g., moving a slider or tapping scroll button), and/or gaze input (e.g., resting gaze on an edge of the grid for a threshold period of time). The scrolling input can cause some of the content items to be moved and/or replaced with other content items that are not displayed in the display area 911 of content browsing user interface 900.

In some embodiments, in order to improve the user experience, additional content items are displayed in an edge area 913 (second region) of the content browsing user interface. These additional content items can be displayed in the second region 913 with an appearance that is different than content items displayed in the first region 911 of the content application. The illustration of content items in a second region 913 along the edge can provide the user with information about whether there are additional content items to scroll to in the content browsing user interface (e.g., additional content items are shown in the edge region on the right, but not in the edge region on the left, so the user understands that browsing is only possible in one direction) and also can provide some information about what these content items may be (e.g., because there are additional representations of content items).

Additionally or alternatively, in order to improve the user experience, rather than adding a removing a column of content items on each edge for each scrolling transition, the transition between the first region 911 and the second region 913 or between the second region 913 and the first region 911 can be made once per container. A container can first collapse to a smaller size (e.g., one column) prior to transitioning from first region 911, and a container transitioning from the second region 913 to the first region 911 can be made as a collapsed, smaller size container (e.g., one column), which can then expand in the first region 911.

In some embodiments, the content items and/or container(s) in the second region 913 along the edge are in a non-planar orientation, whereas the content items and/or container(s) in the first region 911 are in a planar orientation. For example, the content items in the content browsing user interface can be fit to a curve 915 (illustrated from a top-down perspective for FIGS. 9B-9C), that includes a linear portion corresponding to the first region 911 and curved portions corresponding to the second regions 913. The curve can move away from the user (e.g., along a Z-axis), such that the content items have different depths along the curve. For example, content items in containers 902A-902B can have a first depth and content items in container 902C can have a second depth (e.g., $-\Delta Z_1$ further from the user). In some embodiments, scrolling content along the curve can provide the appearance of the content items/containers moving like a carousel. As described with respect to FIG. 9A, the content items disposed along the curve (e.g., container 902C in FIG. 9A) can be oriented toward the user in a planar fashion or alternatively can be disposed along the curve follow the curve such that the content item has a depth gradient. Additionally or alternatively, as described with respect to FIG. 9A, the content items and/or container(s) in the second region 913 can have a different appearance (size, fade, focus, and/or brightness) compared with the content items and/or containers in the first region.

Views 910, 920, 930 and 940 illustrate the collapsing and expanding of containers during scrolling (e.g., in response to scroll left inputs). View 920 shows a collapse of one column of container 902A, a displacement of container 902B by one column, and the transition of container 902C from second area 913 to first area 911 (right edge transition). View 930 shows a further collapse of one column by container 902A, a further displacement of container 902B by one column, and the expansion of container 902C by one column (without a further transition from second area 913 to first area 911). View 940 shows a transition of container 902A from the first area 911 to the second area 913 (left edge transition), a further displacement of container 902B by one column, and the expansion of container 902C by one column (without a further transition from second area 913 to first area 911). The left-side edge region 913 shows container 902A and the right-side edge region 913 shows container 902D (e.g., that are accessible by scrolling right or left, respectively). Collapsing containers and expanding containers allows for three columns of content items to be transitioned into the first area with two edge transitions (e.g., one left edge and one right edge), whereas without collapsing/expanding the containers, the scrolling of three columns of content items may require three edge transitions at both edge regions 913.

FIGS. 9A-9C illustrate scrolling content items for a content browsing user interface including a plurality of content items (e.g., for a content browsing user interface such as content browsing user interfaces 502/602/702). In some embodiments, a scrolling input can be used to scroll images in other modes that illustrate one content item (e.g., for preview user interface 511, panoramic user interface 610, and/or preview user interface 710). Thus, some form of browsing may be available even in preview modes and/or panoramic modes with scrolling input (i.e., browsing may not be limited to modes that are called browsing user interfaces).

In some embodiments, for user interfaces with one content item, the transition in response to a scrolling input is between a first content item and a second content item. In some embodiments, the transition includes sliding in a first content item and concurrently sliding out the second content item. In some embodiments, other animated transitions are possible (e.g., fading in one content item and concurrently fading out one content item, etc.) In some embodiments, the size of the first content item and the second content item are different (e.g., different aspect ratio, etc.). To accommodate transitions between different size content items, in some embodiments, an adjustable mask is used.

FIG. 10A-10D illustrate scrolling a content browsing user interface of a content application according to some embodiments of the disclosure. FIGS. 10A-10D show a transition from first content item 1002 (e.g., corresponding to a photo with a first aspect ratio) to a second content item 1006 (e.g., corresponding to a photo with a second aspect ratio) to a third content item 1008 (e.g., corresponding to a photo with a third aspect ratio or the first aspect ratio). In the process of the transition, a mask 1004 can be used and dynamically adjusted to provide a transition for an improved user experience.

View 1000 shows content item 1002 in a display region of the user interface (e.g., corresponding to preview user interface 511 or 710), with mask 1004 masking the portions of the display region not occupied by content item 1002. In response to a scrolling input (e.g., scroll left), the content image 1002 can be transitioned out and replaced by content item 1006. The transition can include an animation such as sliding content image 1002 left and concurrently sliding content item 1006 left. As shown in views 1010, 1020, 1030, and 1040, the mask 1004 can gradually shrink to accommodate the larger content item 1006 while gradually sliding content item 1002 out of the display region and sliding content item 1006 into the display region. View 1050 illustrates the conclusion of the first transition where content item 1006 completely replaces content item 1002, and the mask shrinks to disappear (or to a reduced size).

In response to a scrolling input (e.g., scroll left), while content item 1006 is displayed in the display region of the user interface, the content item 1006 can be transitioned out and replaced by content item 1008. The transition can include an animation such as sliding content item 1006 left and concurrently sliding content item 1008 left. As shown in views 1060, 1070, 1080, and 1090, the mask 1004 can gradually grow to accommodate the smaller content item 1008 while gradually sliding content item 1006 out of the display region and sliding content item 1008 into the display region. View 1095 illustrates the conclusion of the second transition where content item 1008 completely replaces content item 1006, and the mask grows to meet the size of content item 1008.

In some embodiments, when the size (e.g., aspect ratio, etc.) of the content item before and after the transition are the same, the mask is not adjusted. It is understood that although scrolling left is shown, that similar behavior can be implemented in the opposite direction for scrolling right. Additionally, it is understood that although FIGS. 10A-10D show adjustment of the mask to accommodate content items with different widths, that the mask is additionally or alternatively adjusted, in some embodiments, to accommodate content items with different heights. Additionally, although scrolling in described herein (e.g., in FIGS. 9A-9C, 10A-10D, etc.)

primary by scrolling left or right, it is understood that scrolling is performed in other directions in some embodiments (e.g., up/down).

In some embodiments, the content application includes a content-within-content display mode/user interface (e.g., a photo-within-a-photo display mode/user interface). In some embodiments, the content-within-content display mode/user interface provides an indication of scrollable content within the display area of a content item (without displaying the indication outside the display area, such as in an edge region as in FIGS. 9A-9C). In some embodiments, the content-within-content display mode/user interface is provided for content items greater than a threshold size. Larger content items can provide sufficient area to both display the primary content item as well as one or more secondary content items without obscuring the primary content item too much (and providing sufficient area for secondary content to be visibly meaningful). In some embodiments, content-within-content is implemented in other user interfaces (e.g., preview or panoramic user interfaces). In some embodiments, content-within-content can be implemented even for smaller content items.

FIGS. 11A-11D illustrate views of a content-in-content user interface of a content application according to some embodiments of the disclosure. FIGS. 11A-11D show views 1100, 1110, 1120 and 1130 of the content-in-content user interface, displayed in the XR environment, optionally anchored to a surface (e.g., a representation of a physical wall in the physical environment). The content-in-content user interface can include a primary content item and optionally one or more secondary content items. The primary content item 1002 is displayed in a primary display position shown in view 1100. In some embodiments, in response to an input, one or more secondary content items are displayed in smaller secondary display positions. For example, in view 1110, primary content item 1002 is displayed in the primary display position and secondary content item 1104 is displayed in the secondary display position. View 1130 shows a content item displayed in the primary position and content items displayed in respective secondary display positions. In some embodiments, the secondary display positions occupy the lower, opposite corners of the content-in-content user interface (overlapping and obscuring part of the primary display position). In some embodiments, the secondary display positions can be in other locations within the primary display position. In some embodiments, one or more secondary content items are displayed in one or more smaller secondary display positions (optionally without user input) if there is another content item to navigate to in response to scrolling in one or both directions. Thus, the secondary content item(s) can indicate the content item to be displayed in accordance with a scrolling input in a respective direction.

As illustrated in view 1110, primary content item 1102 is displayed in the XR environment with a first size (e.g., greater than a first threshold area of the user interface) in the primary display position, and a secondary content item 1104 with a second size, different from the first size (e.g., smaller, less than a second threshold area of the user interface). In response to a scrolling input (e.g., scroll left), the primary content item 1102 can be transitioned out of the primary display position and secondary content item 1104 can be transitioned into the primary display position. For example, as illustrated in view 1130, the image of the secondary content item 1104 in view 1110 is displayed as the primary content item 1122 in view 1130. The image of the primary content item 1002 is displayed as a secondary content item 1126 in the left-side secondary display position, and an image of a new secondary content item 1124 is displayed in the right-side secondary display position in view 1130.

In some embodiments, the transition between views 1110 and 1130 includes an animation. In some embodiments, the animation can include displacing the content item in the secondary position and cross-fading the content item in the primary position and the content item in the secondary position. For example, view 1120 illustrates lateral displacement of content item 1104 as represented by content item 1114. The lateral displacement is optionally achieved by a slide animation. Additionally, as illustrated in view 1120, the images of content items 1102 and 1104 are cross-faded, represented by content item 1112 including a blending/overlapping of lighter shading images of content items 1102 and 1104 in the primary display position. Additionally, in some embodiments, the image of content item 1104 can fade out of the displaced secondary display position as represented by the lighter shading of content item 1114.

Additionally or alternatively, in some embodiments, the image of content item 1104 can cross-fade into the left-side secondary display position (shown with content item 1126 in view 1130) and/or the image of content item 1124 can cross-fade into the right-side secondary display position (as shown in view 1130). In some embodiments, content items 1124 and 1126 are added to the secondary display position with a different animation. For example, content item 1124 can slide in (following the sliding displacement of content item 1104/1114) to the right-side secondary display position and content item 1126 can slide into the left-side secondary display position.

In some embodiments, one or more additional user interfaces of the content application can be concurrently displayed with the content-in-content user interface (or alternatively replace the content-in-content user interface), optionally in response to an input while displaying the content-in-content user interface. For example, the content-in-content user interface can be displayed in the background of the XR environment and another user interface (e.g., content browsing user interfaces 502/602/702/800) can be displayed in the foreground (optionally in response to an input). In some embodiments, content items in the content-in-content user interface can represent a container (a user interface element) that includes multiple content items that can be displayed in a content browsing user interface. For example, the content item in the primary display position in content-in-content user interface may correspond to a collection of content items (e.g., an album, a curated list, an event, etc.), and the corresponding collection of content items can be displayed in the additional user interface. In such a manner the content-in-content user interface can allow, for example, for easy browsing photo albums, whereas a content browsing user interface can be invoked to browse the photos within a selected album. In a similar manner, selecting one of the photos while browsing can enable display of a further user interface (e.g., a preview user interface) that can replace the content browsing user interface or be displayed further in the foreground within the XR environment (e.g., concurrently with the content-in-content user interface and/or the content browsing user interface). More generally, the content-in-content user interface, content browsing user interface, and preview user interface allow for different navigation/scrolling inputs at different hierarchical levels.

Figure 12:
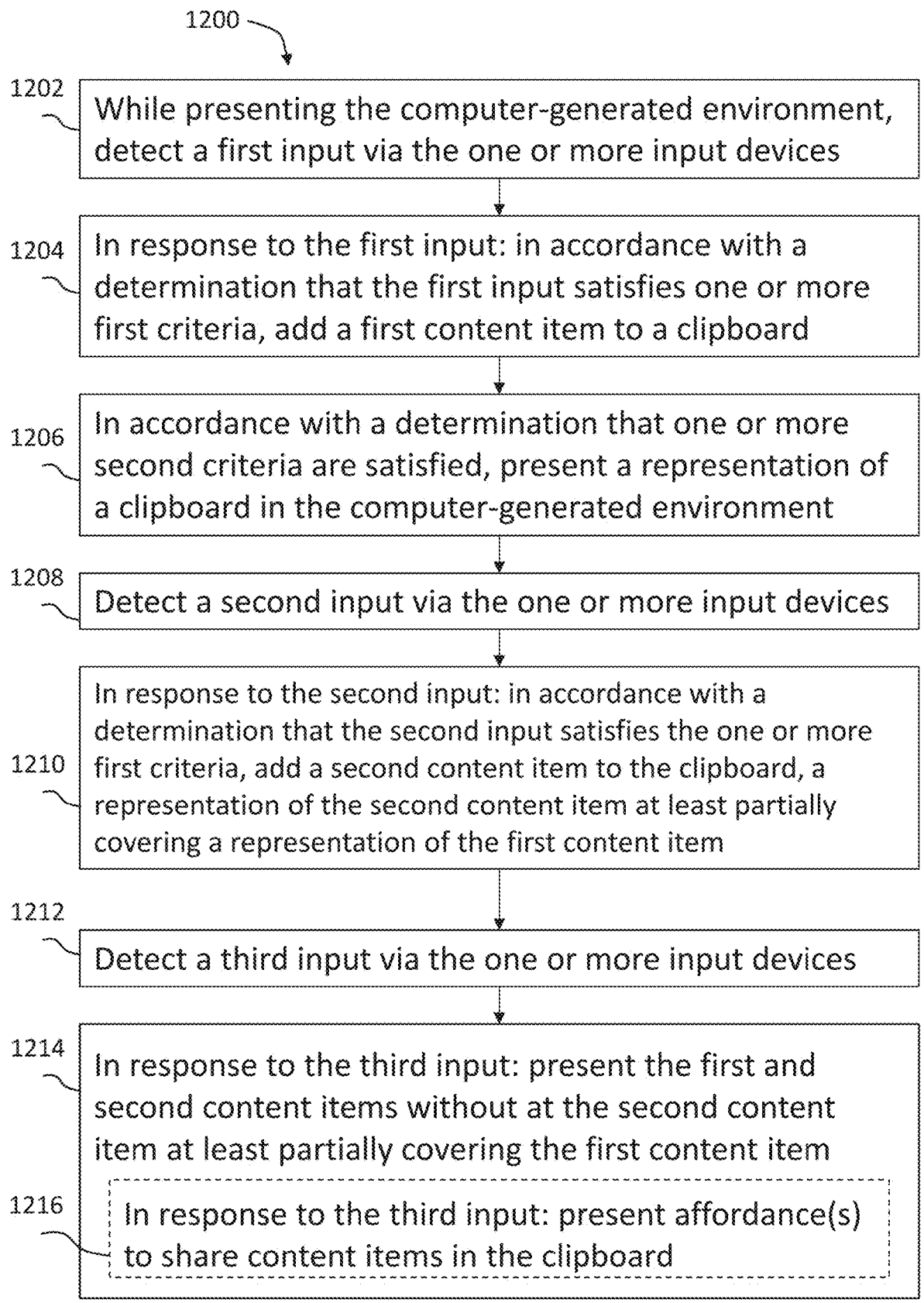
FIG. 12 illustrates an example process for a content application in an XR environment in accordance with some embodiments of the disclosure.

FIG. 12 illustrates an example process 1200 for a content application in an XR environment in accordance with some embodiments of the disclosure. Process 1200 is optionally performed at an electronic device such as device 100 or device 200, when performing clipboard-related interactions described above with reference to FIGS. 3A-4C. Some operations in process 1200 are optionally combined and/or optionally omitted. The order of some operations in process 1200 is optionally changed, in some embodiments.

In some embodiments, operations of process 1200 are performed at an electronic device in communication with a display generation component (a display integrated with the electronic device (optionally a touch screen display) and/or an external display such as a monitor, projector, television, etc.) and one or more input devices (e.g., touch-sensitive surface, motion tracking sensors (e.g., for hands and/or eyes), buttons, joysticks, audio sensors, etc.). An XR environment including a plurality of content items is presented via the display generation component (e.g., display generation component(s) 224). The plurality of content items is optionally displayed in a first region of the XR environment, and optionally includes a first content item and a second content item. The XR environment optionally includes a representation of a physical object. While presenting the XR environment, a first input is detected at 1202, via the one or more input devices. At 1204, in response to the first input, the first content item is added to a clipboard in accordance with a determination that the first input satisfies one or more first criteria (for adding content items to the clipboard). In some embodiments, a representation of the clipboard is anchored to the representation of a physical object or the representation of the clipboard is the representation of the physical object. Additionally or alternatively to one or more of the embodiments disclosed above, in some embodiments, in accordance with a determination that the first input fails to satisfy the one or more first criteria, forgo adding the first content item to the clipboard. Additionally or alternatively to one or more of the embodiments disclosed above, in some embodiments, in accordance with a determination that one or more second criteria (for presenting a representation of the clipboard) are satisfied, presenting, at 1206, a representation of the clipboard in the XR environment. The representation of the clipboard is optionally presented in a second region of the XR environment, different from the first region of the XR environment. Optionally, the representation of the clipboard is presented concurrently with the plurality of content items in the first region of the XR environment. Additionally or alternatively to one or more of the embodiments disclosed above, in some embodiments, in accordance with a determination that the one or more second criteria are not satisfied, forgo presenting the representation of the clipboard.

Additionally or alternatively to one or more of the embodiments disclosed above, in some embodiments, while presenting the XR environment, detecting at 1208, via the one or more input devices, a second input. In response to the second input, at 1210, in accordance with a determination that the second input satisfies the one or more first criteria, a representation of the second content item is added to the clipboard. The representation of the second content item optionally covers, at least partially, the representation of the first content item in the representation of the clipboard is presented. Additionally or alternatively to one or more of the embodiments disclosed above, in some embodiments, in accordance with a determination that the second input fails to satisfy the one or more first criteria, forgo adding the representation of the second content item to the clipboard.

Additionally or alternatively to one or more of the embodiments disclosed above, in some embodiments, the first input includes movement of the hand or the representation of the hand presented in the XR environment. Additionally or alternatively to one or more of the embodiments disclosed above, in some embodiments, the first input comprises: a selection (e.g., a pinch), a movement (e.g., pulling toward the user/away from the content browsing user interface 302), and a deselection (e.g., release pinch). While an amount of the movement is less than a threshold amount, the first content item moves in accordance with the amount of the movement in a direction opposite a direction of the movement and/or the first content item is reduced in size in accordance with the amount of the movement. Additionally or alternatively to one or more of the embodiments disclosed above, in some embodiments, while the amount of movement is greater than the threshold amount, the first content item moves in accordance with the amount of movement in the direction of the movement and/or the first content item is increased in size in accordance with the amount of the movement.

Additionally or alternatively to one or more of the embodiments disclosed above, in some embodiments, the one or more first criteria include a first criterion that is satisfied when the movement exceeds a threshold amount of movement in a direction opposite from the plurality of content items, a second criterion that is satisfied when the movement occurs while maintaining the selection, and/or a third criterion that is satisfied when the deselection occurs after the threshold amount of movement. Additionally or alternatively to one or more of the embodiments disclosed above, in some embodiments, the XR environment includes a representation of a hand and the representation of the clipboard is anchored to the representation of the hand. Additionally or alternatively to one or more of the embodiments disclosed above, in some embodiments, the XR environment includes a representation of a hand and the representation of the clipboard is the representation of the hand. Additionally or alternatively to one or more of the embodiments disclosed above, in some embodiments, the one or more second criteria include a first criterion that is satisfied when there is at least one content item in the clipboard, a second criterion that is satisfied when the representation of the hand is an open palm, a third criterion that is satisfied when the open palm is oriented in a predetermined direction or within a threshold of the predetermined direction, and/or a fourth criterion that is satisfied when the representation of the hand corresponds to a predetermined hand.

Additionally or alternatively to one or more of the embodiments disclosed above, in some embodiments, while presenting the representation of the clipboard, process 1200 optionally includes detecting a third input at 1212. In response to third input, at 1214 the display generation component(s) presents the representation of the first content item and the representation of the second content item in the representation of the clipboard without the representation of the second content item at least partially covering the representation of the first content item, and optionally in an expanded form. Additionally or alternatively to one or more of the embodiments disclosed above, in some embodiments, presenting the representation of the first content item and the representation of the second content item comprises changing a location of the representation of the first content item and/or changing a location of the representation of the second content item in the XR environment. Additionally or alternatively to one or more of the embodiments disclosed above, in some embodiments, the display generation component(s) presents, at 1216, one or more user interface elements (e.g., affordances) to share content items in the clipboard in response to the third input. Additionally or alternatively to one or more of the embodiments disclosed above, in some embodiments, receiving the third input comprises detecting a gaze for a threshold duration at the second region of the XR environment and/or detecting proximity of a representation of a first hand presented in the XR environment to a representation of a the clipboard or a second hand presented in the second region of the XR environment.

Additionally or alternatively to one or more of the embodiments disclosed above, in some embodiments, in accordance with the determination that the second input satisfies the one or more first criteria, process 1200 includes presenting a content-sharing user interface including the representation of the clipboard and one or more affordances to share the content items of the clipboard while the representation of the clipboard is presented.

Additionally or alternatively to one or more of the embodiments disclosed above, in some embodiments, the first region corresponds to a first depth within the XR environment and the second region corresponds to a second depth within the XR environment. Additionally or alternatively to one or more of the embodiments disclosed above, in some embodiments, the first depth is disposed outside of a reach of a representation of a hand and the second depth is disposed within the reach of the representation of the hand within the XR environment.

It should be understood that the particular order in which the operations in FIG. 12 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIG. 2) or application specific chips. Further, the operations described above with reference to FIG. 12 are, optionally, implemented by components depicted in FIG. 2.

Figure 13:
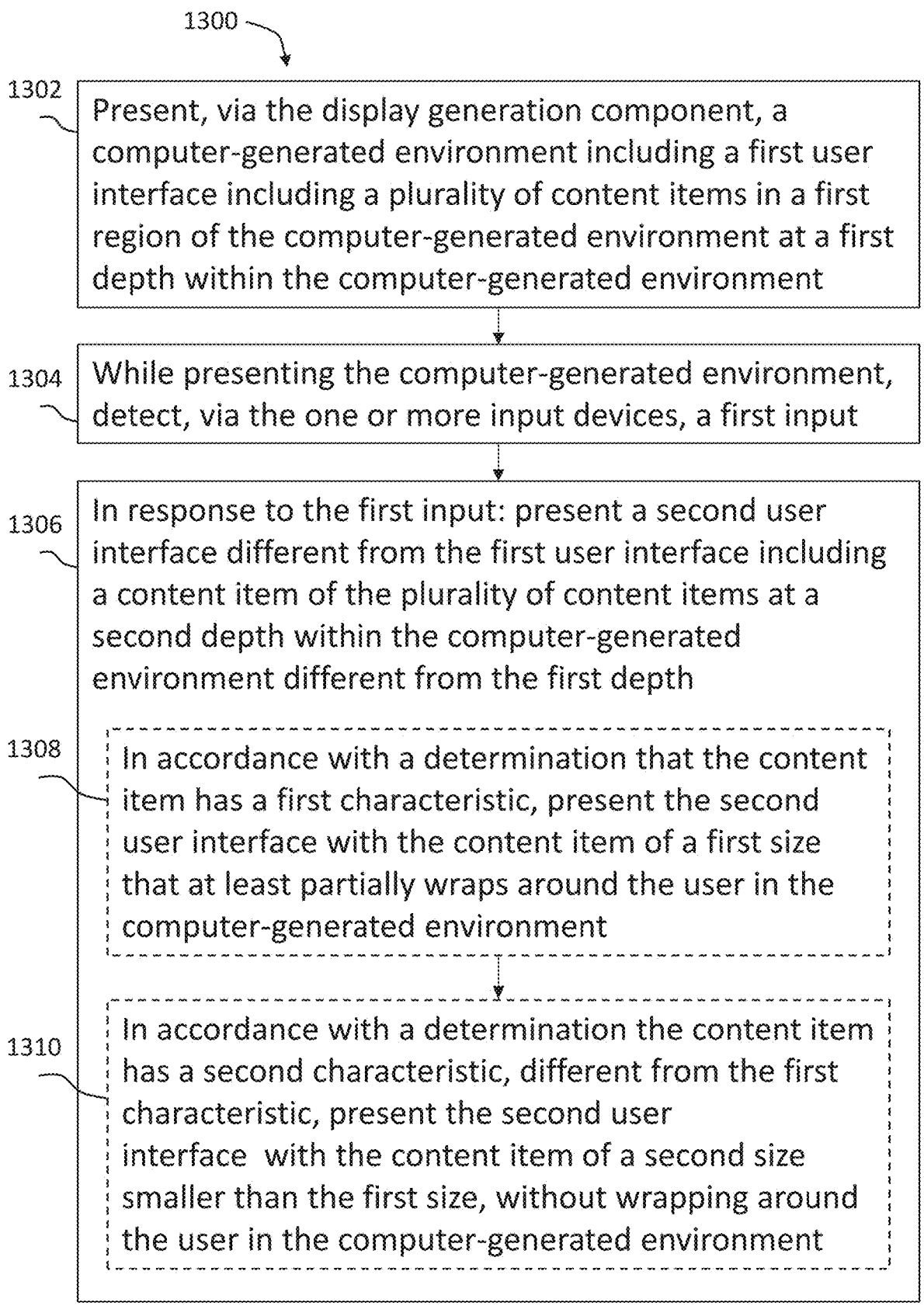
FIG. 13 illustrates an example process for a content application in an XR environment in accordance with some embodiments of the disclosure.

FIG. 13 illustrates an example process 1300 for a content application in an XR environment in accordance with some embodiments of the disclosure. Process 1300 is optionally performed at an electronic device such as device 100 or device 200, when performing transitioning between different modes/views described above with reference to FIGS. 5A-7, for example. Some operations in process 1300 are optionally combined and/or optionally omitted. The order of some operations in process 1300 is optionally changed, in some embodiments.

In some embodiments, process 1300 is performed at an electronic device in communication with a display generation component and one or more input devices. In some embodiments, at 1302, the electronic device presents, via the display generation component, an XR environment including a first user interface including a plurality of content items in a first region of the XR environment at a first depth within the XR environment. In some embodiments, while presenting the XR environment, the electronic device detects, at 1304, via the one or more input devices, a first input. In some embodiments, in response to the first input, the electronic device presents, at 1306, a second user interface different from the first user interface including a content item of the plurality of content items at a second depth within the XR environment different from the first depth.

Additionally or alternatively to one or more of the embodiments disclosed above, in some embodiments, in accordance with a determination that the first user interface at the first depth is within a first threshold distance from the user, the electronic device presents the second user interface at the second depth comprises presenting the second user interface more than a second threshold distance from the user, the second threshold distance greater than the first threshold distance.

Additionally or alternatively to one or more of the embodiments disclosed above, in some embodiments, in accordance with a determination that the first user interface at the first depth is within a first threshold distance from the user, the electronic device presents the second user interface at the second depth comprises presenting the second user interface anchored to a representation of a planar surface in the XR environment. Additionally or alternatively to one or more of the embodiments disclosed above, in some embodiments, the representation of the planar surface is a representation of a physical flat surface.

Additionally or alternatively to one or more of the embodiments disclosed above, in some embodiments, in accordance with a determination that the first user interface at the first depth is outside a first threshold distance from the user, the electronic device presents the second user interface at the second depth comprises presenting the content item within a second threshold distance from the user, the second threshold distance less than the first threshold distance.

Additionally or alternatively to one or more of the embodiments disclosed above, in some embodiments, the electronic device presents the first user interface concurrently with presenting the second user interface. Additionally or alternatively to one or more of the embodiments disclosed above, in some embodiments, the electronic device concurrently presenting the first user interface and the second user interface comprises presenting the first user interface at a third depth within the XR environment different from the first depth and the second depth, wherein the first depth is between the second depth and the third depth.

Additionally or alternatively to one or more of the embodiments disclosed above, in some embodiments, in accordance with a determination that the first user interface is presented without presenting the second user interface, the electronic device presents the first user interface with a first appearance. Additionally or alternatively to one or more of the embodiments disclosed above, in some embodiments, in accordance with a determination the first user interface is presented concurrently with the second user interface, the electronic device presents the first user interface with a second appearance different than the first appearance. Additionally or alternatively to one or more of the embodiments disclosed above, in some embodiments, the second appearance is faded compared to the first appearance, the second appearance is out of focus compared to the first appearance, the second appearance is dimmed compared to the first appearance, or the second appearance is partially obscured compared to the first appearance.

Additionally or alternatively to one or more of the embodiments disclosed above, in some embodiments, in response to the first input, the electronic device dims the XR environment.

Additionally or alternatively to one or more of the embodiments disclosed above, in some embodiments, the second user interface at the second depth at least partially wraps around the user in the XR environment. Additionally or alternatively to one or more of the embodiments disclosed above, in some embodiments, in accordance with a determination that the content item has a first characteristic, the electronic device presents, at 1308 the second user interface with the content item of a first size that at least partially wraps around the user in the XR environment. Additionally or alternatively to one or more of the embodiments disclosed above, in some embodiments, in accordance with a determination the content item has a second characteristic, different from the first characteristic, the electronic device presents, at 1310, the second user interface with the content item of a second size smaller than the first size, without wrapping around the user in the XR environment.

Additionally or alternatively to one or more of the embodiments disclosed above, in some embodiments, an appearance of the content item presented in the second user interface is different than an appearance of the content item in the first user interface. Additionally or alternatively to one or more of the embodiments disclosed above, in some embodiments, the appearance of the content item in the second user interface is greater in size than the appearance of the content item in the first user interface, or wherein the appearance of the content item in the second user interface is brighter than the appearance of the content item in the first user interface.

Additionally or alternatively to one or more of the embodiments disclosed above, in some embodiments, the first input comprises: a selection and a deselection. Additionally or alternatively to one or more of the embodiments disclosed above, in some embodiments, the first input comprises: a selection, a movement and a deselection. Additionally or alternatively to one or more of the embodiments disclosed above, in some embodiments, the first input comprises: tapping the content item of the plurality of content items in the first user interface with a representation of a finger in the XR environment. Additionally or alternatively to one or more of the embodiments disclosed above, in some embodiments, the first input comprises gazing at the content item of the plurality of content items in the first user interface.

Additionally or alternatively to one or more of the embodiments disclosed above, in some embodiments, while presenting the XR environment, the electronic device detects, via the one or more input devices, a second input different from the first input. Additionally or alternatively to one or more of the embodiments disclosed above, in some embodiments, in response to the second input, the electronic device presents a third user interface different from the first user interface and different from the second user interface, the third user interface including the content item of the plurality of content items at a third depth within the XR environment different from the first depth.

Additionally or alternatively to one or more of the embodiments disclosed above, in some embodiments, while presenting the second user interface, the electronic device detects, via the one or more input devices, a second input. Additionally or alternatively to one or more of the embodiments disclosed above, in some embodiments, in response to the second input, the electronic device ceases presenting of the second user interface. Additionally or alternatively to one or more of the embodiments disclosed above, in some embodiments, in response to the second input, the electronic device presents the first user interface at the first depth. Additionally or alternatively to one or more of the embodiments disclosed above, in some embodiments, the second input comprises a selection, a first movement in a first direction, a second movement in a second direction different than the first direction, and a deselection. Additionally or alternatively to one or more of the embodiments disclosed above, in some embodiments, in response to detecting a portion of the second input, the electronic device begins a transition between the second user interface and the first user interface, wherein beginning the transition comprises changing a depth at which the first user interface is presented, changing a depth at which the second user interface is presented, changing an appearance of the first user interface, changing an appearance of the second user interface, or changing an appearance of the XR environment.

It should be understood that the particular order in which the operations in FIG. 13 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIG. 2) or application specific chips. Further, the operations described above with reference to FIG. 13 are, optionally, implemented by components depicted in FIG. 2.

Figure 14:
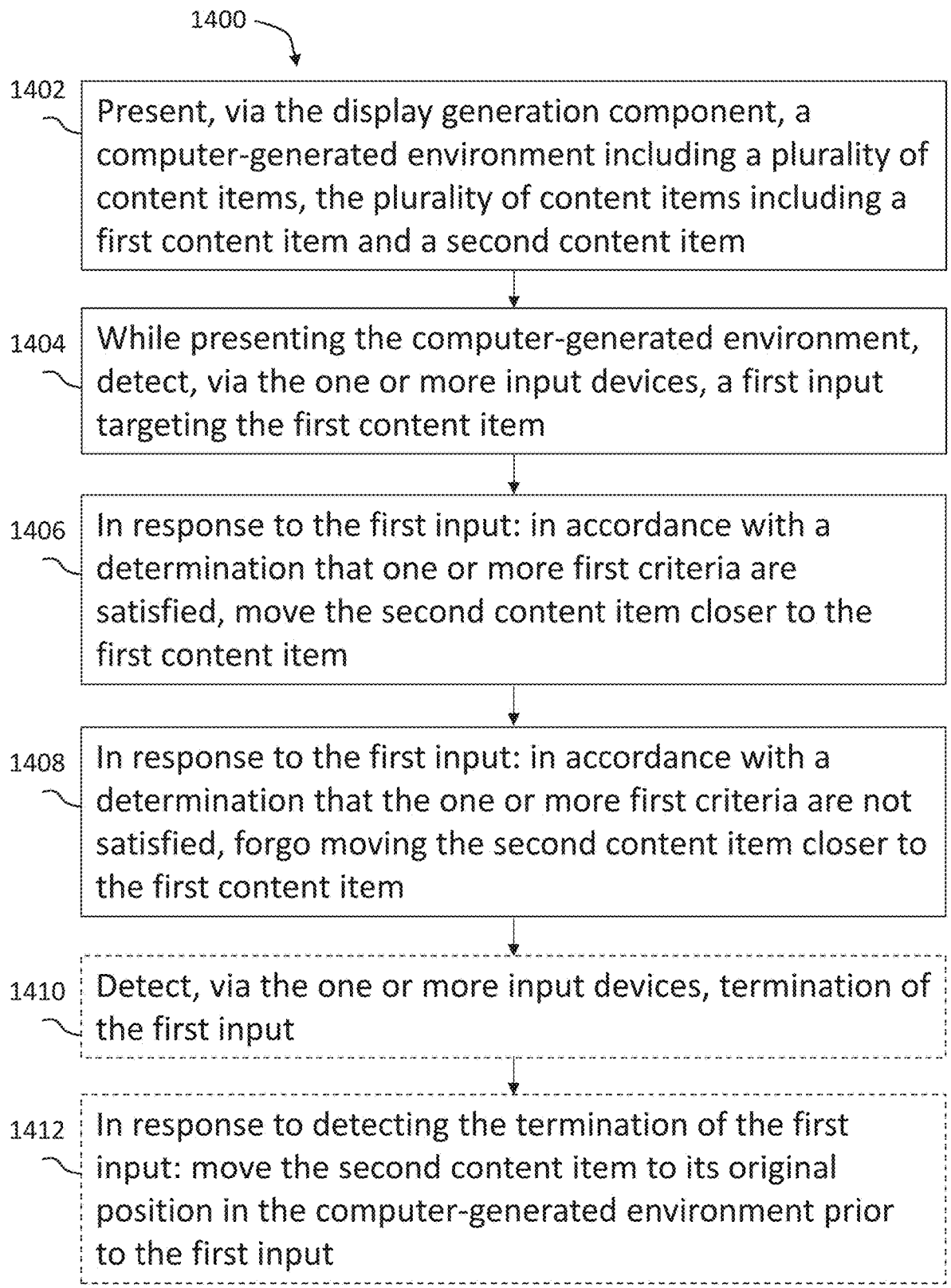
FIG. 14 illustrates an example process for a content application in an XR environment in accordance with some embodiments of the disclosure.

FIG. 14 illustrates an example process 1400 for a content application in an XR environment in accordance with some embodiments of the disclosure. Process 1400 is optionally performed at an electronic device such as device 100 or device 200, when operating and interacting in the splayed content browsing user interface described above with reference to FIG. 8, for example. Some operations in process 1400 are optionally combined and/or optionally omitted. The order of some operations in process 1400 is optionally changed, in some embodiments.

In some embodiments, process 1400 is performed at an electronic device in communication with a display generation component and one or more input devices. In some embodiments, at 1402, the electronic device presents, via the display generation component, an XR environment including a plurality of content items, the plurality of content items including a first content item and a second content item. In some embodiments, while presenting the XR environment, the electronic device detects, at 1404, via the one or more input devices, a first input targeting the first content item. In some embodiments, in response to the first input, in accordance with a determination that one or more first criteria are satisfied, the electronic device, at 1406, moves the second content item closer to the first content item. In some embodiments, in response to the first input, in accordance with a determination that the one or more first criteria are not satisfied, the electronic device, at 1408, forgoes moving the second content item closer to the first content item.

Additionally or alternatively to one or more of the embodiments disclosed above, in some embodiments, in response to the first input, in accordance with a determination that one or more second criteria are satisfied, the electronic device moves the second content item further from the first content item. Additionally or alternatively to one or more of the embodiments disclosed above, in some embodiments, in response to the first input, in accordance with a determination that the one or more second criteria are not satisfied, forgoes moving the second content item further from the first content item.

Additionally or alternatively to one or more of the embodiments disclosed above, in some embodiments, moving the second content item comprises changing a depth at which the second content item is presented in the XR environment. Additionally or alternatively to one or more of the embodiments disclosed above, in some embodiments, moving the second content item comprises changing a size of the second content item in the XR environment. Additionally or alternatively to one or more of the embodiments disclosed above, in some embodiments, moving the second content item comprises changing an orientation of the second content item in the XR environment.

Additionally or alternatively to one or more of the embodiments disclosed above, in some embodiments, a velocity of the moving of the second content item is a function of a distance between the first content item and the second content item. Additionally or alternatively to one or more of the embodiments disclosed above, in some embodiments, a velocity of the moving of the second content item is a function of a duration of the first input. Additionally or alternatively to one or more of the embodiments disclosed above, in some embodiments, the first input comprises gaze on the first content item for a threshold duration.

Additionally or alternatively to one or more of the embodiments disclosed above, in some embodiments, the electronic device determines a parameter representative of a similarity between one or more characteristics of the first content item and one or more characteristics of the second content item. Additionally or alternatively to one or more of the embodiments disclosed above, in some embodiments, the one or more first criteria include a criterion that is satisfied when the parameter is greater than a first threshold. Additionally or alternatively to one or more of the embodiments disclosed above, in some embodiments, the one or more second criteria include a criterion that is satisfied when the parameter is less than a second threshold. Additionally or alternatively to one or more of the embodiments disclosed above, in some embodiments, the one or more characteristics are derived from the first content item or from a subset of the first content item. Additionally or alternatively to one or more of the embodiments disclosed above, in some embodiments, a velocity of the moving of the second content item is a function of the parameter.

Additionally or alternatively to one or more of the embodiments disclosed above, in some embodiments, the parameter is output by a machine learning model (e.g., machine learning circuitry, a neural network, etc.). Additionally or alternatively to one or more of the embodiments disclosed above, in some embodiments, the machine learning model is configured to extract the one or more characteristics of the first content item from the first content item based on the first input.

Additionally or alternatively to one or more of the embodiments disclosed above, in some embodiments, the plurality of content items is splayed in the XR environment.

Additionally or alternatively to one or more of the embodiments disclosed above, in some embodiments, a subset of the plurality of content items wrap around the user in the XR environment.

Additionally or alternatively to one or more of the embodiments disclosed above, in some embodiments, presenting the plurality of content items in the XR environment comprises dimming the XR environment.

Additionally or alternatively to one or more of the embodiments disclosed above, in some embodiments, presenting the plurality of content items in the XR environment comprises presenting a subset of the plurality of content items at a depth in the XR environment beyond a depth of a physical wall and obscuring the physical wall in the XR environment.

Additionally or alternatively to one or more of the embodiments disclosed above, in some embodiments, a first subset of the plurality of content items are presented in a first region at a first depth with a first size and a second subset of the plurality of content items are presented in a second region different from the first region at the first depth with a second size different from the first size.

Additionally or alternatively to one or more of the embodiments disclosed above, in some embodiments, the electronic device detects, via the one or more input devices, a second input comprising rotation of the electronic device. Additionally or alternatively to one or more of the embodiments disclosed above, in some embodiments, in response to the second input, the electronic device presents a different view of the XR environment including the plurality of content items, wherein at least one of the plurality of content items increases in size and at least another one of the plurality of content items decreases in size.

Additionally or alternatively to one or more of the embodiments disclosed above, in some embodiments, the electronic device detects, via the one or more input devices, a second input focusing on a third content item of the plurality of content items. Additionally or alternatively to one or more of the embodiments disclosed above, in some embodiments, in response to the second input, in accordance with a determination that the one or more first criteria are satisfied, the electronic device moves the second content item closer to the third content item. Additionally or alternatively to one or more of the embodiments disclosed above, in some embodiments, in response to the second input, in accordance with a determination that the one or more first criteria are not satisfied, the electronic device forgoes moving the second content item closer to the third content item.

Additionally or alternatively to one or more of the embodiments disclosed above, in some embodiments, the electronic device detects, at 1410, via the one or more input devices, termination of the first input. Additionally or alternatively to one or more of the embodiments disclosed above, in some embodiments, in response to detecting the termination of the first input, the electronic device moves, at 1412, the second content item to its original position in the XR environment prior to the first input.

It should be understood that the particular order in which the operations in FIG. 14 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIG. 2) or application specific chips. Further, the operations described above with reference to FIG. 14 are, optionally, implemented by components depicted in FIG. 2.

Figure 15:
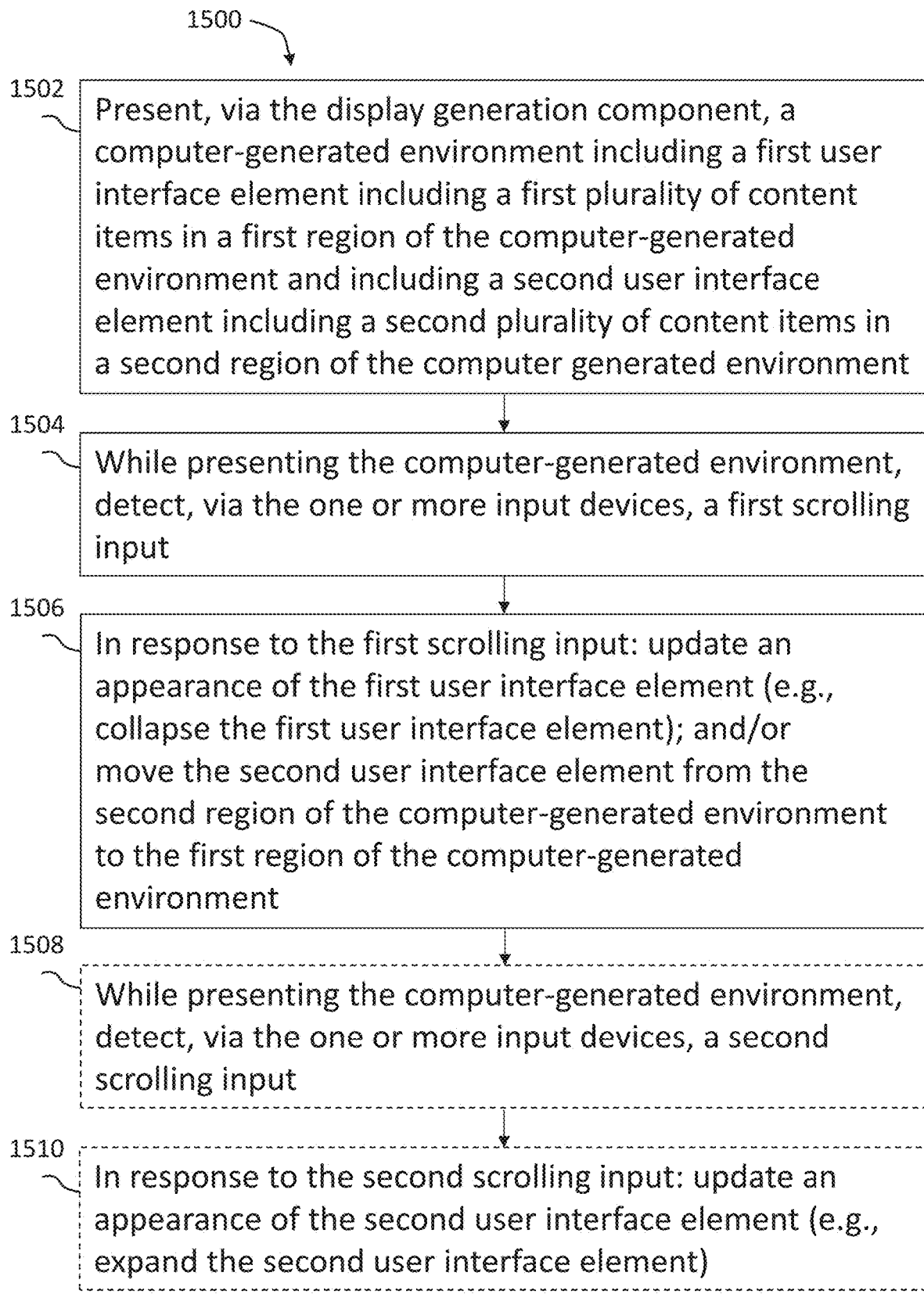
FIG. 15 illustrates an example process for a content application in an XR environment in accordance with some embodiments of the disclosure.

FIG. 15 illustrates an example process 1500 for a content application in an XR environment in accordance with some embodiments of the disclosure. Process 1500 is optionally performed at an electronic device such as device 100 or device 200, when scrolling the content browsing user interface described above with reference to FIGS. 9A-9C, for example. Some operations in process 1500 are optionally combined and/or optionally omitted. The order of some operations in process 1500 is optionally changed, in some embodiments.

In some embodiments, process 1500 is performed at an electronic device in communication with a display generation component and one or more input devices. In some embodiments, at 1502, the electronic device presents, via the display generation component, an XR environment including a first user interface element including a first plurality of content items in a first region of the XR environment and including a second user interface element including a second plurality of content items in a second region of the XR environment. In some embodiments, while presenting the XR environment, the electronic device detects, at 1504, via the one or more input devices, a first scrolling input. In some embodiments, in response to the first scrolling input, the electronic device, at 1506, updates an appearance of the first user interface element and/or moves the second user interface element from the second region of the XR environment to the first region of the XR environment.

Additionally or alternatively to one or more of the embodiments disclosed above, in some embodiments, updating the appearance of the first user interface element comprises displacing the first user interface element within the first region. Additionally or alternatively to one or more of the embodiments disclosed above, in some embodiments, updating the appearance of the first user interface element comprises collapsing the first user interface element and displaying fewer of the first plurality of content items in the first user interface than displayed within the first user interface element prior to the first scrolling input. Additionally or alternatively to one or more of the embodiments disclosed above, in some embodiments, updating the appearance of the first user interface element comprises displacing the first user interface element from the first region to a third region, the second region and the third region disposed on opposite sides of the first region.

Additionally or alternatively to one or more of the embodiments disclosed above, in some embodiments, while presenting the XR environment, the electronic device detects, at 1508, via the one or more input devices, a second scrolling input (e.g., subsequent to the first scrolling input). In some embodiments, in response to the second scrolling input, the electronic device, at 1510, updates an appearance of the second user interface element. Additionally or alternatively to one or more of the embodiments disclosed above, in some embodiments, updating the appearance of the second user interface element comprises displacing the second user interface element within the first region. Additionally or alternatively to one or more of the embodiments disclosed above, in some embodiments, updating the appearance of the second user interface element comprises expanding the second user interface element in the first region and displaying more content items than of the second plurality of content items in the second user interface than displayed within the second user interface element prior to the second scrolling input.

Additionally or alternatively to one or more of the embodiments disclosed above, in some embodiments, the first region is at a first depth with the XR environment and the second region is at a second depth within the XR environment, different form the first depth. Additionally or alternatively to one or more of the embodiments disclosed above, in some embodiments, the first region is at a first depth with the XR environment and the second region and the third region are at a second depth within the XR environment, different form the first depth.

Additionally or alternatively to one or more of the embodiments disclosed above, in some embodiments, an appearance (e.g., size, depth, orientation, brightness, fading, focus, etc.) of content items and/or user interface elements displayed in the first region is different from an appearance of content items and/or user interface elements displayed in the second region or third region.

It should be understood that the particular order in which the operations in FIG. 15 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIG. 2) or application specific chips. Further, the operations described above with reference to FIG. 15 are, optionally, implemented by components depicted in FIG. 2.

Figure 16:
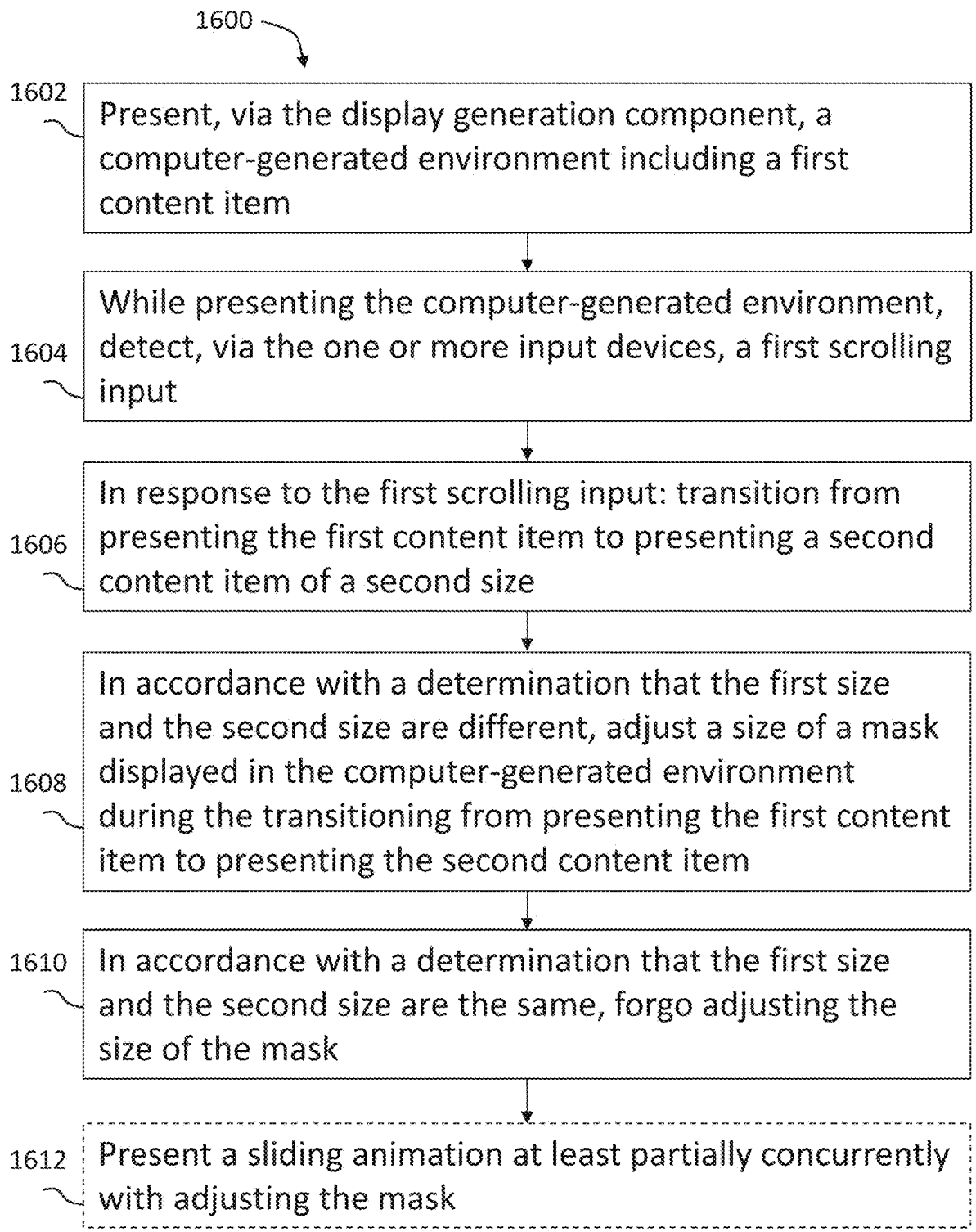
FIG. 16 illustrates an example process for a content application in an XR environment in accordance with some embodiments of the disclosure.

FIG. 16 illustrates an example process 1600 for a content application in an XR environment in accordance with some embodiments of the disclosure. Process 1600 is optionally performed at an electronic device such as device 100 or device 200, when scrolling the content browsing user interface described above with reference to FIGS. 10A-10D, for example. Some operations in process 1600 are optionally combined and/or optionally omitted. The order of some operations in process 1600 is optionally changed, in some embodiments.

In some embodiments, process 1600 is performed at an electronic device in communication with a display generation component and one or more input devices. In some embodiments, at 1602, the electronic device presents, via the display generation component, an XR environment including a first content item. In some embodiments, while presenting the XR environment, the electronic device detects, at 1604, via the one or more input devices, a first scrolling input. In some embodiments, in response to the first scrolling input, the electronic device, at 1606, transitions from presenting the first content item to presenting a second content item of a second size. In some embodiments, in accordance with a determination that the first size and the second size are different, the electronic device, at 1608, adjusts a size of a mask displayed in the XR environment during the transitioning from presenting the first content item to presenting the second content item. In some embodiments, in accordance with a determination that the first size and the second size are the same, the electronic device, at 1610, forgoes adjusting the size of the mask during the transition.

Additionally or alternatively to one or more of the embodiments disclosed above, in some embodiments, a combined size of the mask and the first content item before transitioning from presenting the first content item to presenting the second content item is the same as a combined size of the mask and the second content item after transitioning from presenting the first content item to presenting the second content item. Additionally or alternatively to one or more of the embodiments disclosed above, in some embodiments, adjusting the mask comprises growing or shrinking the mask on opposite sides of the display of the first and/or second content items.

Additionally or alternatively to one or more of the embodiments disclosed above, in some embodiments, transitioning from presenting the first content item to presenting the second content item comprises a sliding animation. Additionally or alternatively to one or more of the embodiments disclosed above, in some embodiments, the electronic device, at 1612, presents the sliding animation at least partially concurrently with adjusting the mask.

Additionally or alternatively to one or more of the embodiments disclosed above, in some embodiments, while presenting the XR environment, the electronic device detects, via the one or more input devices, a second scrolling input. In some embodiments, in response to the second scrolling input: the electronic device transitions from presenting the second content item to presenting a third content item of a third size. In some embodiments, in accordance with a determination that the second size and the third size are different, the electronic device adjusts the size of the mask displayed in the XR environment during the transitioning from presenting the second content item to presenting the third content item; and in accordance with a determination that the second size and the third size are the same, the electronic device forgoes adjusting the size of the mask.

It should be understood that the particular order in which the operations in FIG. 16 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIG. 2) or application specific chips. Further, the operations described above with reference to FIG. 16 are, optionally, implemented by components depicted in FIG. 2.

Figures 17A, 17B:
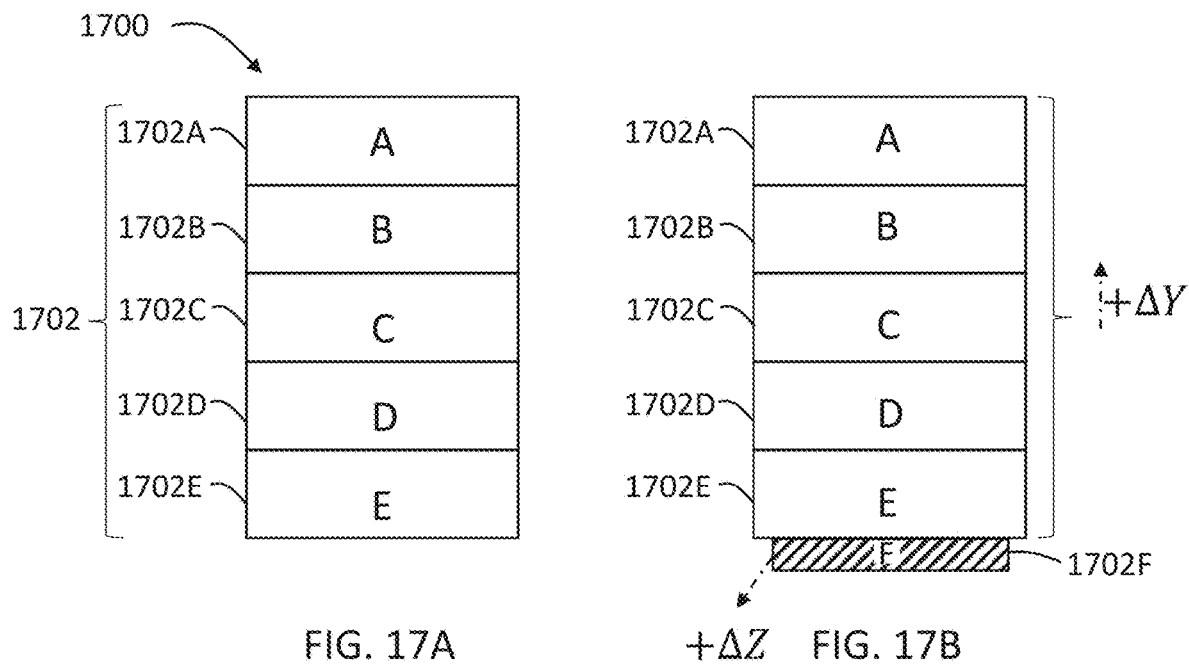
FIG. 17A-17D illustrate scrolling a list of content items in an XR environment according to some embodiments of the disclosure.
Figures 17C, 17D:
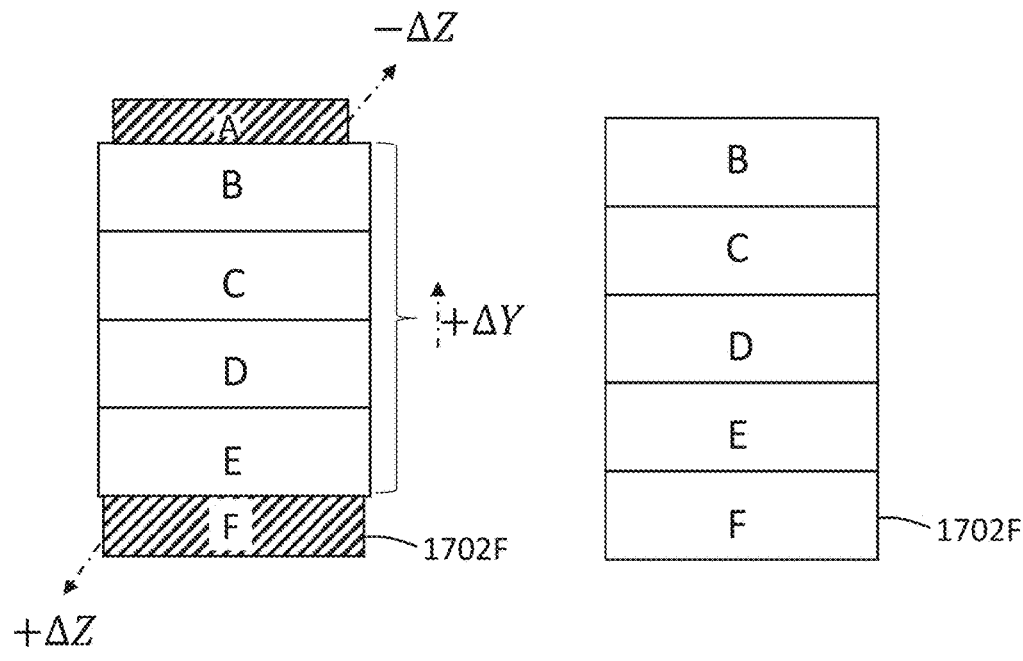

FIG. 17A-17D illustrate scrolling a list of content items according to some embodiments of the disclosure. FIGS. 17A-17D illustrate a list 1700 including a plurality of content items 1702 (e.g., content items 1702A-1702F when referencing the content items A-F shown in FIGS. 17A-17D). The content items can include text, photos, media, etc. In some embodiments, due to space constraints, some of the content items in the list are presented to a user at a given time and some of the content items in the list are not presented to the user. In some embodiments, a user input is used to scroll the plurality of content items. For example, a scroll input can be provided via a gesture (e.g., a swipe gesture by a finger or hand), via an affordance in the user interface (e.g., moving a slider or tapping scroll button), and/or gaze input (e.g., resting gaze on an edge of the grid for a threshold period of time). The scrolling input can cause some of the content items 1702 in list 1700 to be moved and/or replaced with other content items from list 1700 that are not initially presented in the display area designated for the list. For example, a list 1700 representing a column of content items 1702 can initially show a first representation of the list including a first plurality of content items (e.g., content items 1702A-1702E as shown in FIG. 17A). A scrolling input can be used to present a previously-hidden content item 1702F at the bottom of list 1700 and/or hide previously-presented content item 1702A from the top of list 1700 (e.g., cease presenting the topmost content item) in response to a scroll input, as illustrated in FIGS. 17B-17C. FIG. 17D illustrates a second representation of the list (e.g., including content items 1702B-1702F) presented to the user after the scrolling input.

In some embodiments, in order to improve the user experience, the content items 1702 in list 1700 can have properties of discrete objects (e.g., a 2D or 3D object) and/or can have properties of a group of objects (e.g., a 2D or 3D list of objects). For example, when presenting a previously-hidden content item (adding a content item) or hiding a previously-presented content item (removing a content item) from the presentation of the list, the added and/or removed content item can behave as a discrete object that fades in or out and/or moves backward or forward in depth within a 3D environment during the animation/transition. As another example, content items within the list that are not added or removed at a given moment time may move together in the direction of scrolling as one list element.

In some embodiments, to improve user experience, the list 1700 is presented without gaps between the content items. For example, content items 1720A-1702E in FIG. 17A can be presented without displaying other content of the three-dimensional environment behind list 1700 visible between the content items 1702 of list 1700. Presenting list 1700 without displaying content behind list 1700 can reduce density of different visual content seen by the user and reduce distraction for a user interacting with list 1700. In a similar manner, in some embodiments, content behind list 1700 in the three-dimensional environment is not displayed between the content items 1702 illustrated in FIGS. 17B-D. In some embodiments, content behind content items that are being added or removed may provide some visibility of the three-dimensional environment behind the content items that are being added or removed. In some embodiments, content in the three-dimensional environment behind content items that are being added or removed may fade in or fade out, but the content items block or otherwise occlude the content of the three-dimensional environment behind the content items that are being added or removed to reduce density/user-distraction.

In some embodiments, in response to the scrolling input, content items 1702 in list 1700 move in the direction corresponding to the scrolling input and a content item is added to the presentation of list using an animation. For example, as illustrated in FIG. 17B, in response to a scrolling input, the list of content items 1702A-1702E moves (e.g., as a contiguous representation of a list as represented by the curly brace and movement arrow) along the Y axis by an amount of $+\Delta Y$ and content item 1702F fades in from a position at a depth along the Z axis that is behind list 1700 in the three-dimensional environment relative to the user. In some embodiments, during the animation, content item 1702F can also move in along the Y axis along with the rest of the content items.

As the scrolling animation continues, content item 1702F can continue to fade in and move toward the user in depth along the Z axis (e.g., approaching the depth of the remaining content items in list 1700). In some embodiments, the content item 1702 at a depth further from the user appears smaller in size compared with content items 1702 in list 1700 due to the relative depth of content items from the user. For example, FIG. 17C illustrates a subsequent snapshot of the animation in which content item 1702F continues to move closer to the user (e.g., and thereby appears larger in size) and optionally fades in further relative to FIG. 17B, such that content item 1702F appears larger and/or clearer in the three-dimensional environment.

As the animation concludes, content item 1702F can be presented without any fade and at the same depth as the remaining content items in list 1700, as shown in FIG. 17D. In some embodiments, the fade in of a newly presented content item and the change in depth of the newly presented content item can provide an appearance of carousel-like movement of list 1700 for the newly presented content item.

In some embodiments, the fade in of a newly presented content item and the change in depth of the newly presented content item occurs coextensive in time during the animation. In some embodiments, the fade in of a newly presented content item and the change in depth of the newly presented content item can occur during portions of the animation, and optionally at least partially overlap (e.g., the fade in can begin before the change in depth and/or the fade in can be complete before the depth of the newly presented content item reaches the depth of the rest of the list). In some embodiments, the animation may omit the fade in or the change in depth. In some embodiments, the animation can additionally or alternatively include an increase in brightness and/or an increase in focus for content item 1702F. In some embodiments, the animation can additionally or alternatively include revealing more of the content item 1702F. For example, during the transition an increasing percentage of the area of content item 1702F as shown in FIG. 17D may be displayed (e.g., showing 25% of content of content item 1702F in FIG. 17B, 80% of the content in FIG. 17C and 100% of the content in FIG. 17D). In some embodiments, all of the content (e.g., 100% of the area) of content item 1702F is presented during the animation, but as content item 1702F increases in size all of the content of content item 1720F is displayed with a larger size to reflect the larger size of content item 1702F within the three-dimensional environment from the perspective of the user.

In some embodiments, in response to the scrolling input, a content item is hidden from the list (e.g., ceasing being presented as part of the list) using an animation. For example, as illustrated in FIG. 17C, in response to a scrolling input, content items 1702B-1702E continue to move (e.g., as a contiguous representation of a list as represented by the curly brace and movement arrow) along the Y axis by an amount of +ΔY and content item 1702A fades out from a depth of list 1700 to a position at a depth along the Z axis that is behind list 1700 in the three-dimensional environment relative to the user. In some embodiments, during the animation, content item 1702A can also move in along the Y axis along with the rest of the content items. As the scrolling animation continues, content item 1702A can continue to fade out and move away the user in depth along the Z axis. For example, FIG. 17C illustrates a snapshot of the animation in which content item 1702A moves further from the user (e.g., and thereby appears smaller in size compared to FIG. 17A-17B) and fades out relative to its appearance in FIGS. 17A-17B, such that content item 1702F appears smaller and/or less clear in the three-dimensional environment. As the animation concludes, content item 1702A can cease to be presented in list 1700, as shown in FIG. 17D. In some embodiments, the fade out and the change in depth of a content item being hidden from the list can provide an appearance of carousel-like movement.

In some embodiments, the fade out and the change in depth of a content item that ceases to be presented occurs coextensive in time during the animation. In some embodiments, the fade out and the change in depth of a content item that ceases to be presented can occur for portions of the animation, and optionally at least partially overlap (e.g., the fade out can begin and/or conclude after the change in depth). In some embodiments, the animation may omit the fade out or the change in depth. In some embodiments, the animation can additionally or alternatively include a decrease in brightness and/or a decrease in focus for content item 1702A. In some embodiments, the animation can additionally or alternatively include occluding more of the content item 1702A. For example, during the transition a decreasing percentage of the area of content item 1702A as shown in FIG. 17A may be displayed (e.g., showing 100% of the content of content item 1702A in FIG. 17A, 40% of content in FIG. 17C). In some embodiments, all of the content (e.g., 100% of the area) of content item 1702A is presented during the animation, but as content item 1702A decreases in size all of the content of content item 1720A is displayed with a smaller size to reflect the smaller size of content item 1702A within the three-dimensional environment from the perspective of the user.

Although FIGS. 17A-17D illustrate the animation of presenting content item 1702F beginning in FIG. 17B prior to the beginning of the animation of ceasing presenting content item 1702A in FIG. 17C, it should be understood that, in some embodiments, the animations can have different timing. In some embodiments, the animation of presenting content item 1702F and the animation of ceasing presenting content item 1702A can occur coextensive in time. In some embodiments, the animation of presenting content item 1702F begins after the animation of ceasing presenting content item 1702A. Although FIGS. 17A-17D illustrate the animation of presenting content item 1702F and the animation of ceasing presenting content item 1702A at least partially overlapping in FIG. 17C, it should be understood that, in some embodiments, the animations may not overlap in time.

It is understood that although FIGS. 17A-17D illustrate a scrolling operating in which one new content item is presented to the user and one content item ceases to be presented to the user, that the scrolling operation can including presenting or ceasing to present multiple content items. In some embodiments, the animations described above can be repeated (e.g., to add and remove a first pair of content items before adding and removing a second pair of content items). Additionally, it is understood that scrolling input in the opposite direction can cause the direction of the animations to be reversed (e.g., ceasing presenting of content item 1702F and presenting content item 1702A). Additionally, it is understood that although list 1700 is presented as a columnar list that similar techniques for scroll can be applied to a horizontal list using horizontal scrolling inputs, or other list types that may be oriented differently than a row or column orientation.

Although not shown in FIGS. 17A-17D, it should be understood that in some embodiments, an indication of additional content items is presented at the bottom edge and/or top edge of list 1700 to provide the user with information about whether there are additional content items to scroll to in the list and/or can provide some information about what these content items may be (e.g., because indication includes a visual representation of the content). In some embodiments, the absence of such an indication at the bottom edge and/or top edge of list 1700 provides a user with information about reaching the beginning or end of the list.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Further, although the forgoing description uses terms "first," "second," etc. to distinguish one element from another, these elements should not be limited by the terms. For example, a first criterion (or input or content item) could be termed a second criterion (or input or content item), a second criterion (or input or content item) could be termed a first criterion (or input or content item), etc., without departing from the scope of the various described embodiments. The first criterion (or input, or content item) and the second criterion (or input, or content item) are both criteria (or inputs or content items), but they are not the same criterion (or input, or content item).

The terminology used in the forgoing description of the various described embodiments is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The invention claimed is:

1. A method comprising:
at an electronic device in communication with a display and one or more input devices:
presenting, via the display, an XR environment including a first user interface element including a first plurality of content items in a first region of the XR environment and including a second user interface element including a second plurality of content items in a second region of the XR environment;
while presenting the XR environment, detecting, via the one or more input devices, a first scrolling input;
in response to the first scrolling input:
updating an appearance of the first user interface element; and
moving the second user interface element from the second region of the XR environment to the first region of the XR environment.

2. The method of claim 1, wherein updating the appearance of the first user interface element comprises displacing the first user interface element within the first region.

3. The method of claim 1, wherein updating the appearance of the first user interface element comprises collapsing the first user interface element and displaying fewer of the first plurality of content items in the first user interface element than displayed within the first user interface element prior to the first scrolling input.

4. The method of claim 1, wherein updating the appearance of the first user interface element comprises displacing the first user interface element from the first region to a third region, the second region and the third region disposed on opposite sides of the first region.

5. The method of claim 1, further comprising:
while presenting the XR environment, detecting, via the one or more input devices, a second scrolling input; and
in response to the second scrolling input:
updating an appearance of the second user interface element.

6. The method of claim 5, wherein updating the appearance of the second user interface element comprises displacing the second user interface element within the first region.

7. The method of claim 5, wherein updating the appearance of the second user interface element comprises expanding the second user interface element in the first region and displaying more content items than of the second plurality of content items in the second user interface element than displayed within the second user interface element prior to the second scrolling input.

8. The method of claim 1, wherein the first region is at a first depth with the XR environment and the second region is at a second depth within the XR environment, different form the first depth.

9. An electronic device comprising:
a display;
one or more input devices;
one or more processors configured for:
presenting, via the display, an XR environment including a first user interface element including a first plurality of content items in a first region of the XR environment and including a second user interface element including a second plurality of content items in a second region of the XR environment;
while presenting the XR environment, detecting, via the one or more input devices, a first scrolling input;
in response to the first scrolling input:
updating an appearance of the first user interface element; and
moving the second user interface element from the second region of the XR environment to the first region of the XR environment.

10. The electronic device of claim 9, wherein updating the appearance of the first user interface element comprises displacing the first user interface element within the first region.

11. The electronic device of claim 9, wherein updating the appearance of the first user interface element comprises collapsing the first user interface element and displaying fewer of the first plurality of content items in the first user interface element than displayed within the first user interface element prior to the first scrolling input.

12. The electronic device of claim 9, wherein updating the appearance of the first user interface element comprises displacing the first user interface element from the first region to a third region, the second region and the third region disposed on opposite sides of the first region.

13. The electronic device of claim 9, further comprising:
while presenting the XR environment, detecting, via the one or more input devices, a second scrolling input; and
in response to the second scrolling input:
updating an appearance of the second user interface element.

14. The electronic device of claim 13, wherein updating the appearance of the second user interface element comprises displacing the second user interface element within the first region.

15. The electronic device of claim 13, wherein updating the appearance of the second user interface element comprises expanding the second user interface element in the first region and displaying more content items than of the second plurality of content items in the second user interface element than displayed within the second user interface element prior to the second scrolling input.

16. The electronic device of claim 9, wherein the first region is at a first depth with the XR environment and the second region is at a second depth within the XR environment, different form the first depth.

17. A non-transitory computer readable storage medium storing instructions, which when executed by one or more processors of an electronic device including a display and one or more input devices, cause the electronic device to:
present, via the display, an XR environment including a first user interface element including a first plurality of content items in a first region of the XR environment and including a second user interface element including a second plurality of content items in a second region of the XR environment;
while presenting the XR environment, detect, via the one or more input devices, a first scrolling input;
in response to the first scrolling input:
update an appearance of the first user interface element; and
move the second user interface element from the second region of the XR environment to the first region of the XR environment.

18. The non-transitory computer readable storage medium of claim 17, wherein updating the appearance of the first user interface element comprises displacing the first user interface element within the first region.

19. The non-transitory computer readable storage medium of claim 17, wherein updating the appearance of the first user interface element comprises collapsing the first user interface element and displaying fewer of the first plurality of content items in the first user interface element than displayed within the first user interface element prior to the first scrolling input.

20. The non-transitory computer readable storage medium of claim 17, wherein updating the appearance of the first user interface element comprises displacing the first user interface element from the first region to a third region, the second region and the third region disposed on opposite sides of the first region.

* * * * *